(12) United States Patent (10) Patent No.: US 8,854,191 B2
Yamazaki et al. (45) Date of Patent: Oct. 7, 2014

(54) SEMICONDUCTOR DEVICE AND METHOD FOR OPERATING THE SAME

(75) Inventors: Shunpei Yamazaki, Tokyo (JP); Jun Koyama, Kanagawa (JP); Masato Ishii, Kanagawa (JP); Tomoaki Atsumi, Kanagawa (JP); Takeshi Osada, Kanagawa (JP); Takayuki Ikeda, Kanagawa (JP); Yoshiyuki Kurokawa, Kanagawa (JP); Yutaka Shionoiri, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1403 days.

(21) Appl. No.: 11/716,042

(22) Filed: Mar. 9, 2007

(65) Prior Publication Data

US 2007/0229228 A1 Oct. 4, 2007

(30) Foreign Application Priority Data

Mar. 10, 2006 (JP) .................................. 2006-066811

(51) Int. Cl.
*H04Q 5/22* (2006.01)
*G06K 19/07* (2006.01)

(52) U.S. Cl.
CPC ........ *G06K 19/0723* (2013.01); *G06K 19/0701* (2013.01); *G06K 19/0702* (2013.01)
USPC ................... 340/10.34; 340/539.3; 340/572.7

(58) Field of Classification Search
CPC ................... G06K 19/07749; G06K 19/0775; G06K 19/0723; G06K 19/07779; G06K 19/07775; G06K 19/0701; G06K 19/0702; G06K 19/077; G08B 13/2417; G08B 13/2437; G08B 13/2431; G08B 13/244; H01L 2924/14

USPC ................ 340/539.3, 572.7, 636.2, 644, 645, 340/693.1–693.4, 10.34; 455/343.1–343.6; 257/59, 72, 119, E51.003–E51.011
See application file for complete search history.

(56) References Cited

U.S. PATENT DOCUMENTS 5,859,873 A * 1/1999 Ritter ............................ 375/259
6,462,647 B1 * 10/2002 Roz ............................... 340/10.1
(Continued)

FOREIGN PATENT DOCUMENTS

EP 1134811 A 9/2001
GB 2292866 A * 3/1996 ............. G06K 19/07
(Continued)

OTHER PUBLICATIONS

International Search Report (Application No. PCT/JP2007/054605) dated Jun. 12, 2007.
(Continued)

*Primary Examiner* — Nabil Syed
*Assistant Examiner* — Nay Tun
(74) *Attorney, Agent, or Firm* — Eric J. Robinson; Robinson Intellectual Property Law Office, P.C.

(57) ABSTRACT

To provide a semiconductor device including an RFID which can transmit and receive individual information without checking of the remaining charge of a battery or a replacing operation of the battery in accordance with deterioration over time of the battery for driving, and can maintain an excellent state for transmission and reception of individual information even when power of a radio wave or an electromagnetic wave from outside is insufficient. A battery (also described as a secondary battery) is provided as a power supply for supplying power to the RFID. Then, when power which is obtained from a signal received from outside is larger than predetermined power, its surplus power is stored in the battery; and when the power which is obtained from the signal received from outside is smaller than the predetermined power, power which is obtained from the battery is used for the power for driving.

22 Claims, 31 Drawing Sheets

(56) References Cited

U.S. PATENT DOCUMENTS

| | | | |
|---|---|---|---|
| 6,489,883 B1 * | 12/2002 | Iiyama et al. | 340/5.1 |
| 6,837,438 B1 | 1/2005 | Takasugi et al. | |
| 6,906,347 B2 * | 6/2005 | Yamazaki et al. | 257/72 |
| 6,944,424 B2 * | 9/2005 | Heinrich et al. | 455/41.1 |
| 7,061,014 B2 | 6/2006 | Hosono et al. | |
| 7,064,346 B2 | 6/2006 | Kawasaki et al. | |
| 7,282,782 B2 | 10/2007 | Hoffman et al. | |
| 7,323,356 B2 | 1/2008 | Hosono et al. | |
| 7,674,650 B2 | 3/2010 | Akimoto et al. | |
| 2003/0132931 A1 * | 7/2003 | Kimura et al. | 345/212 |
| 2004/0145454 A1 | 7/2004 | Powell et al. | |
| 2006/0244107 A1 | 11/2006 | Sugihara et al. | |
| 2007/0108446 A1 | 5/2007 | Akimoto | |
| 2007/0152217 A1 * | 7/2007 | Lai et al. | 257/59 |
| 2007/0194379 A1 | 8/2007 | Hosono et al. | |

FOREIGN PATENT DOCUMENTS

| | | | | |
|---|---|---|---|---|
| JP | 05-251705 A | | 9/1993 | |
| JP | 11-345292 A | | 12/1999 | |
| JP | 2000-044236 A | | 2/2000 | |
| JP | 2000-090221 A | | 3/2000 | |
| JP | 2000-137779 | | 5/2000 | |
| JP | 2000-150900 A | | 5/2000 | |
| JP | 2001-014439 A | | 1/2001 | |
| JP | 2001-067446 | | 3/2001 | |
| JP | 2001067446 A | * | 3/2001 | G06K 19/07 |
| JP | 2002-076356 A | | 3/2002 | |
| JP | 2002-289859 A | | 10/2002 | |
| JP | 2005-033172 A | | 2/2005 | |
| JP | 2005-316724 | | 11/2005 | |
| JP | 2006-503376 | | 1/2006 | |
| WO | WO-03/040441 | | 5/2003 | |

OTHER PUBLICATIONS

Written Opinion (Application No. PCT/JP2007/054605) dated Jun. 12, 2007.

Li.C et al., "Modulated Structures of Homologous Compounds InMO3(ZnO)m (M=In,Ga; m=Integer) Described by Four-Dimensional Superspace Group,", Journal of Solid State Chemistry, 1998, vol. 139, pp. 347-355.

Nomura.K et al., "Carrier transport in transparent oxide semiconductor with intrinsic structural randomness probed using single-crystalline InGaO3(ZnO)5 films,", Appl. Phys. Lett. (Applied Physics Letters) , Sep. 13, 2004, vol. 85, No. 11, pp. 1993-1995.

Kamiya. T et al., "1a-F-5 Room temperature fabrication and carrier transport of amorphous semiconductor exhibiting large electron Hall mobilities > 10 cm2/Vs,", (The 65th Autumn Meeting, 2004) The Japan Society of Applied Physics, Sep. 1, 2004, No. 2, p. 791.

Nomura.K et al., "31a-ZA-6 Carrier Transport in Transparent Amorphous Oxide Semiconductor InGaZnO4,", (The 51st Spring Meeting,2004); The Japan Society of Applied Physics and Related Societies, Mar. 28, 2004, No. 2, p. 669.

Kimizuka.N et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3-ZnGa2O4-ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

* cited by examiner

PRIOR ART

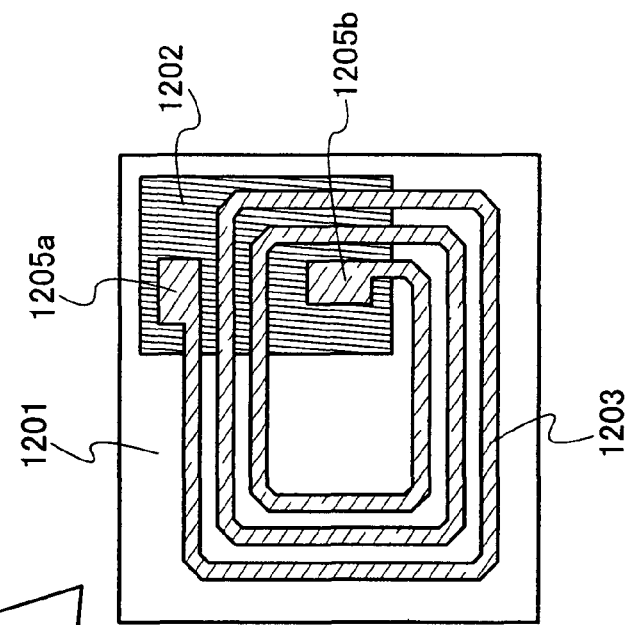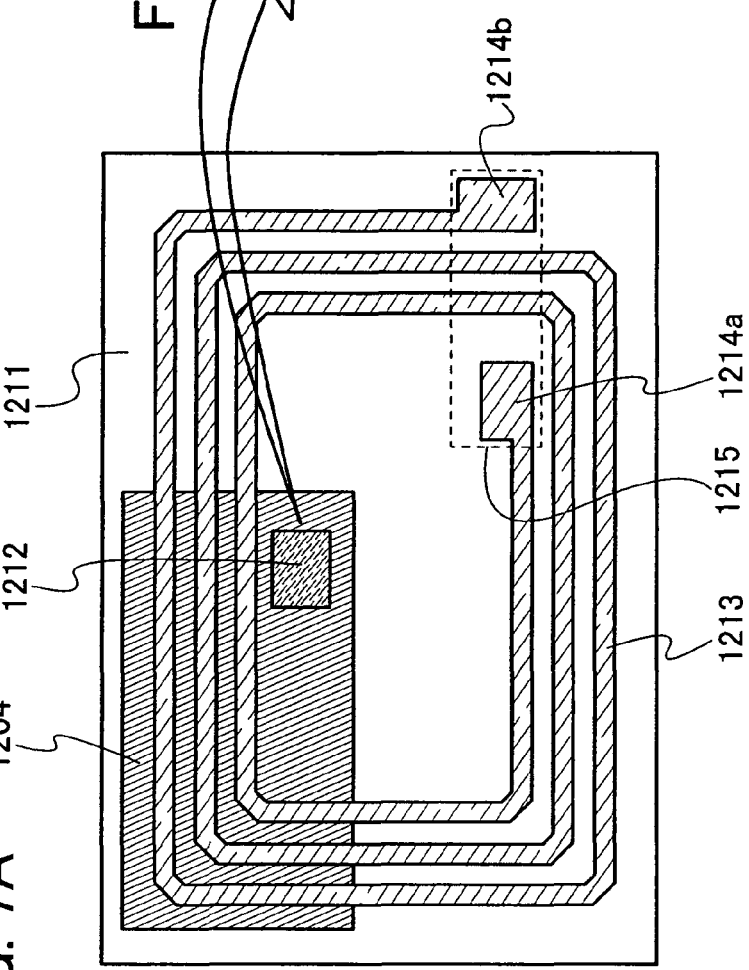

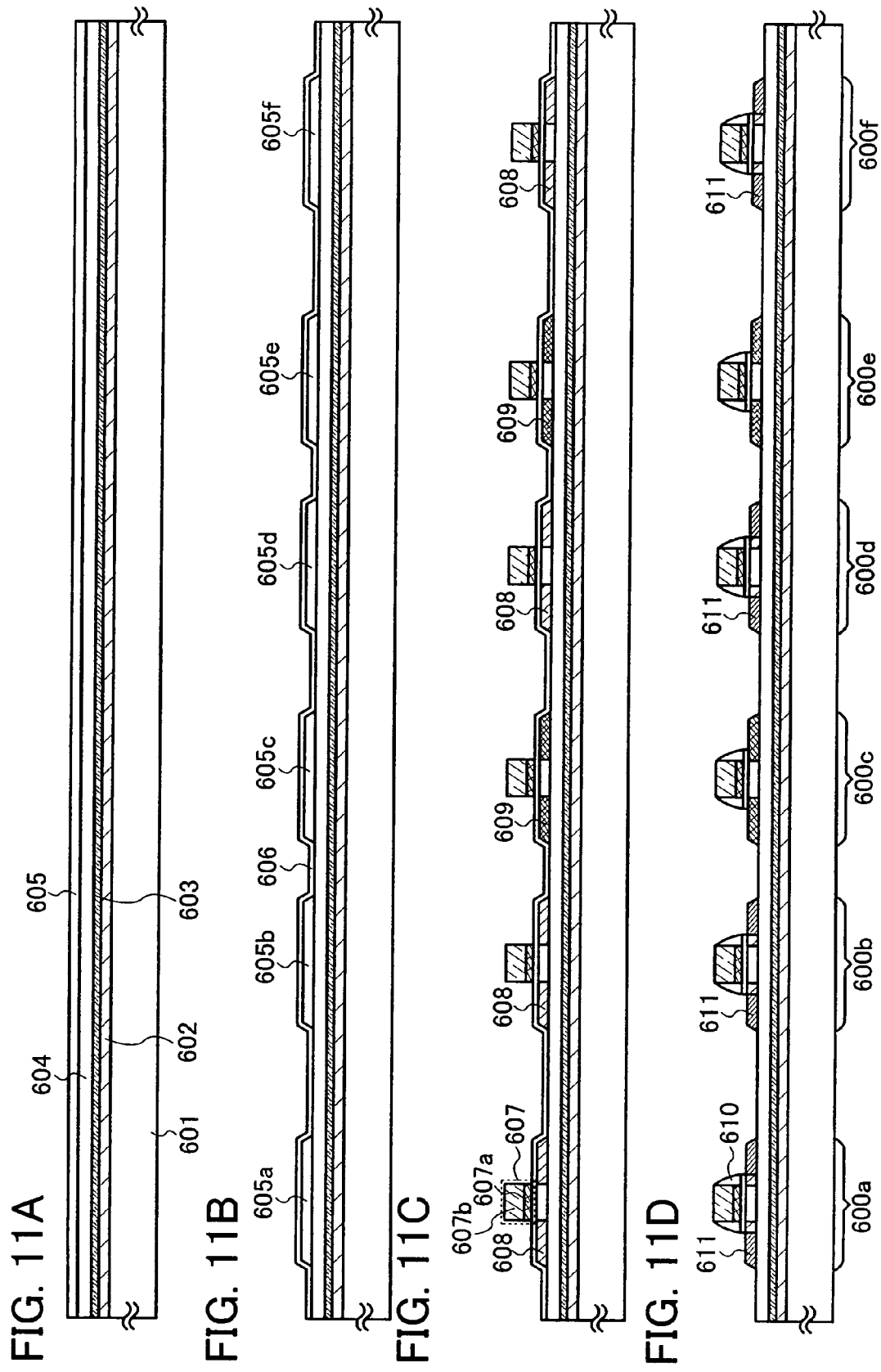

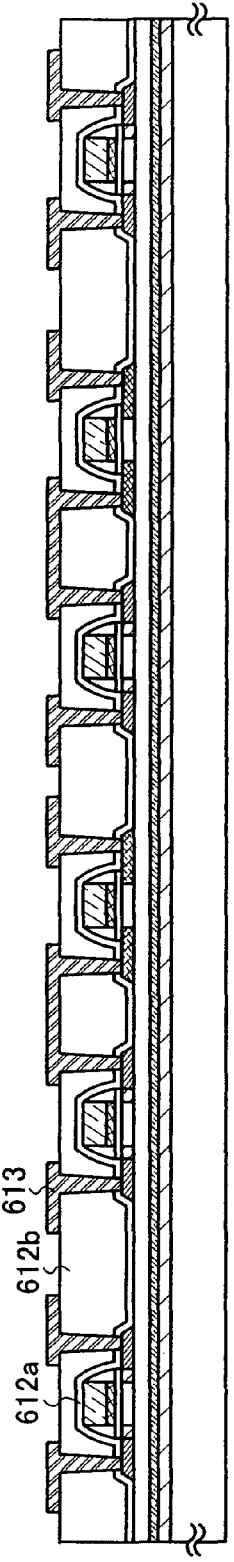
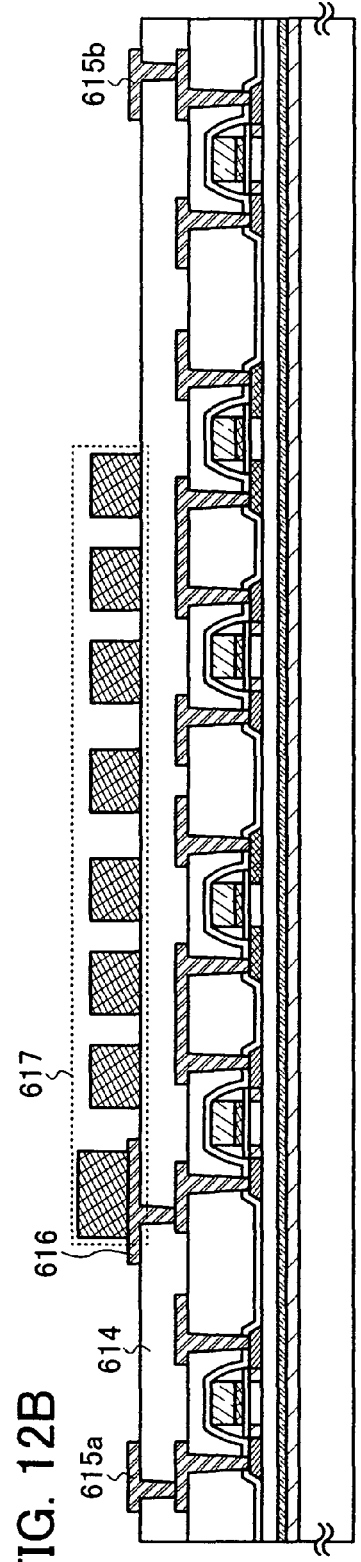
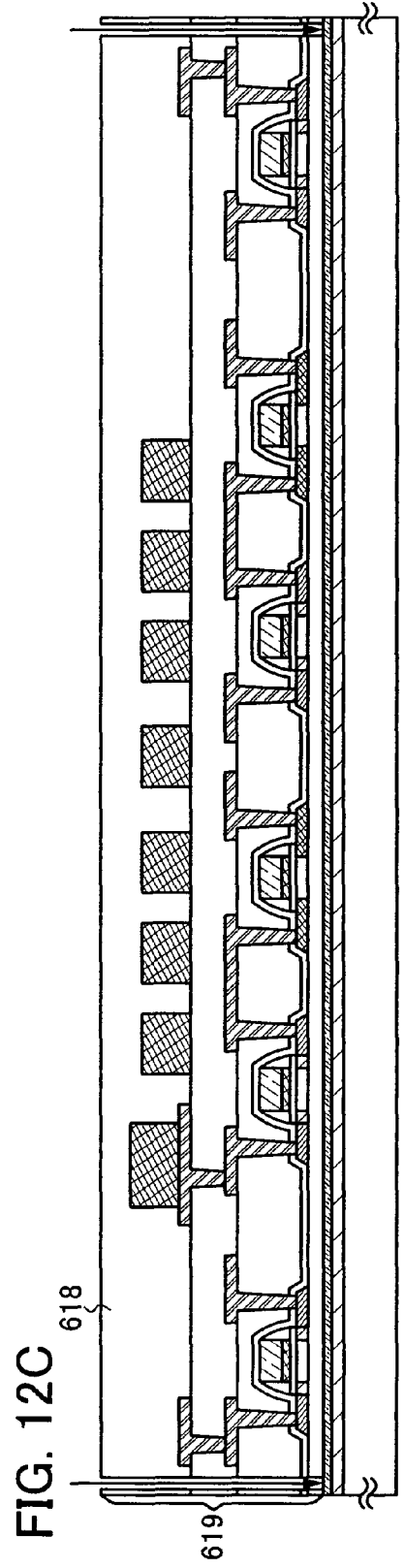
FIG. 12A
FIG. 12B
FIG. 12C

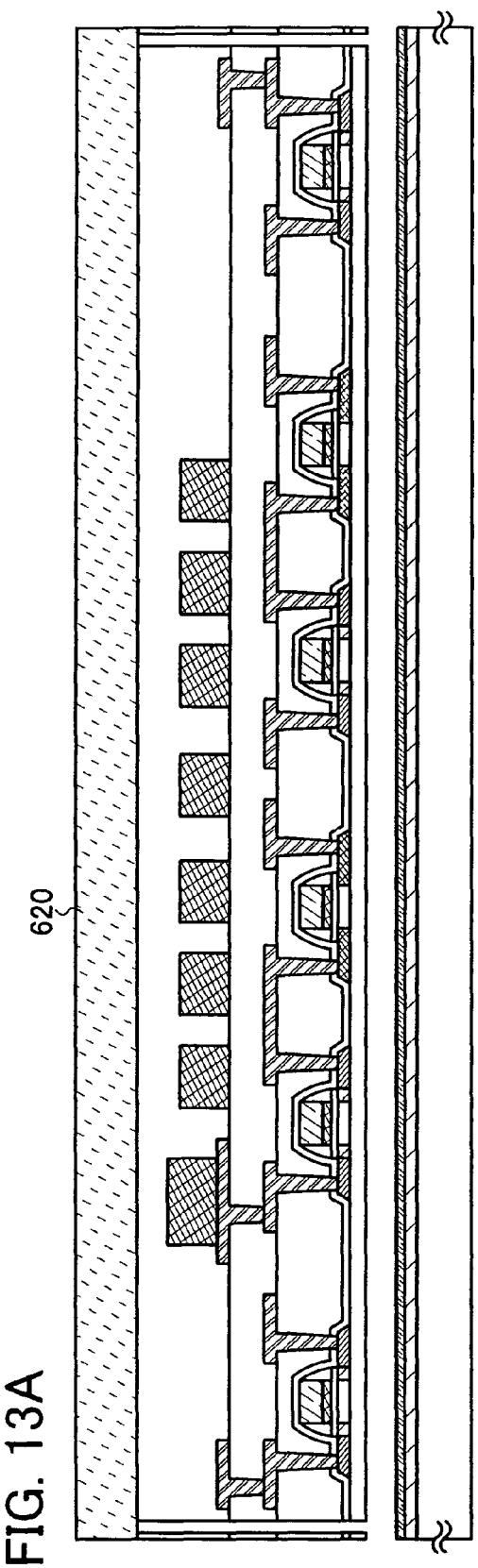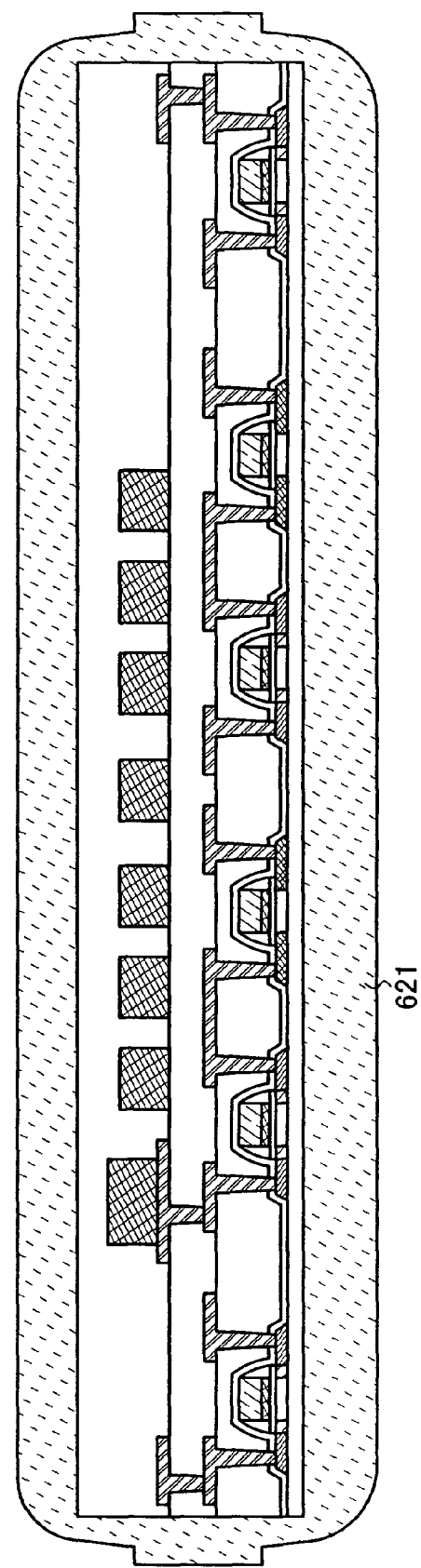
FIG. 13A
FIG. 13B

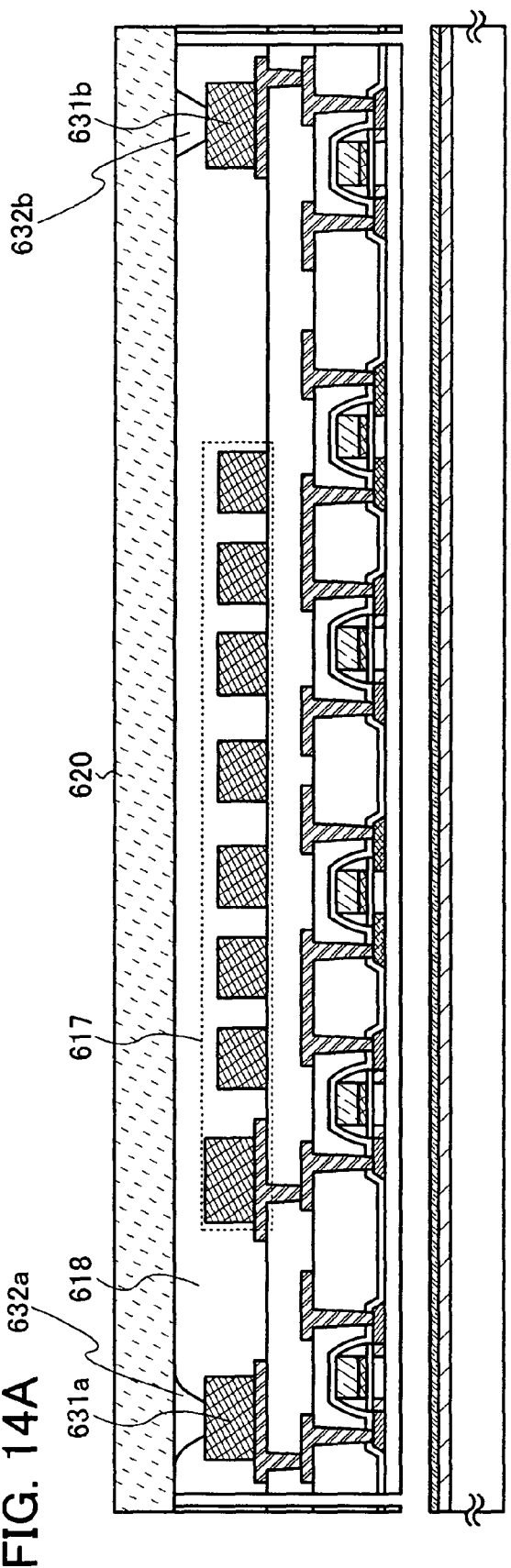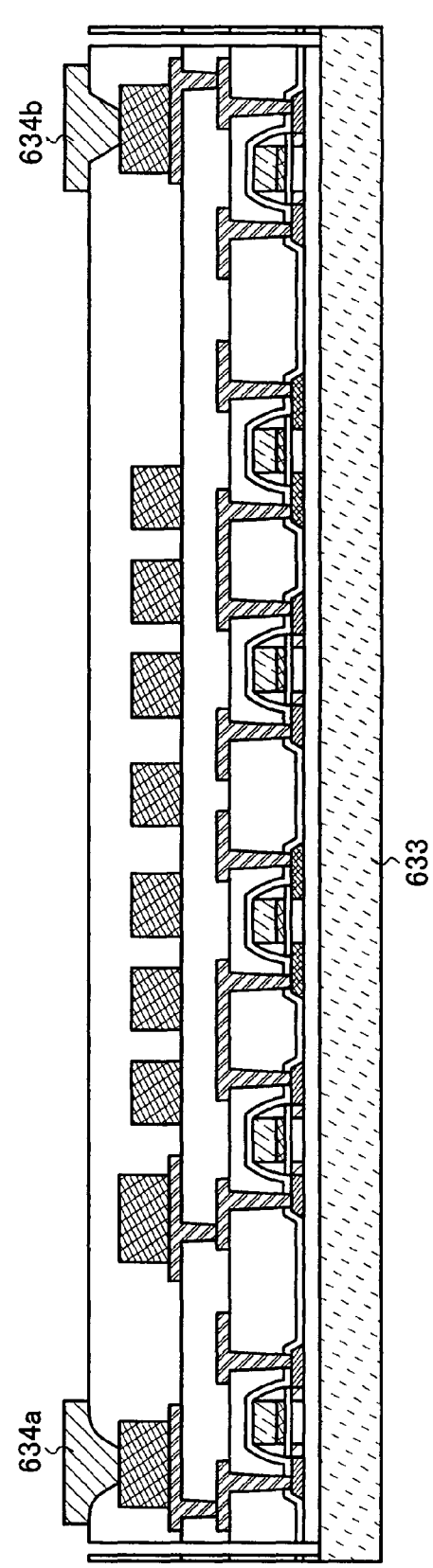

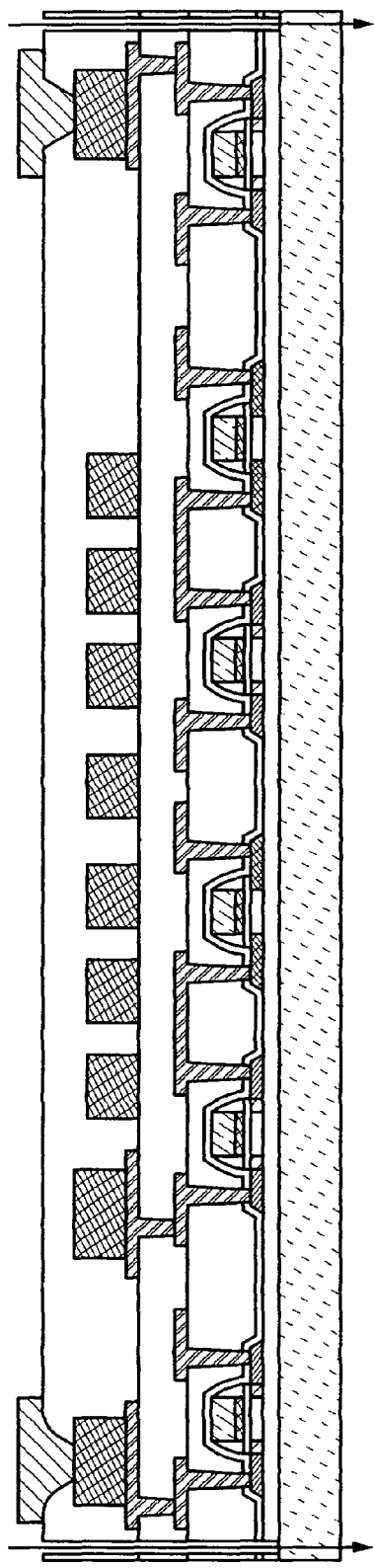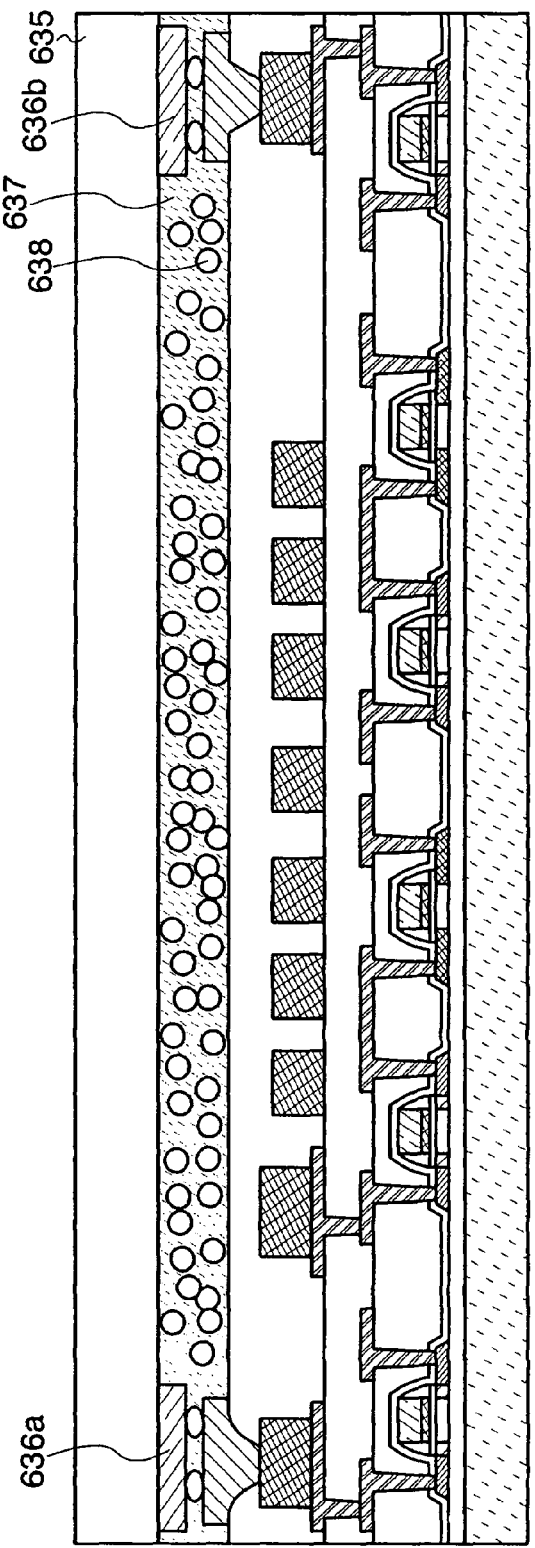
FIG. 15A
FIG. 15B

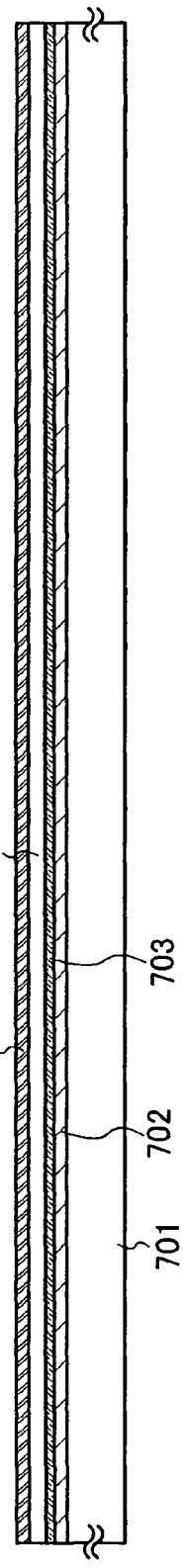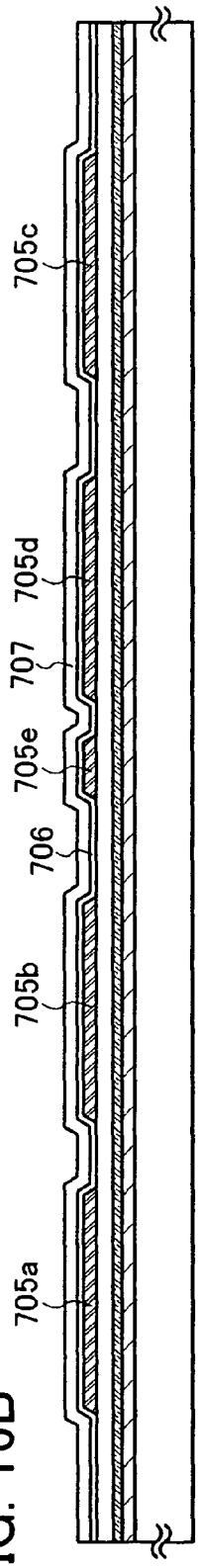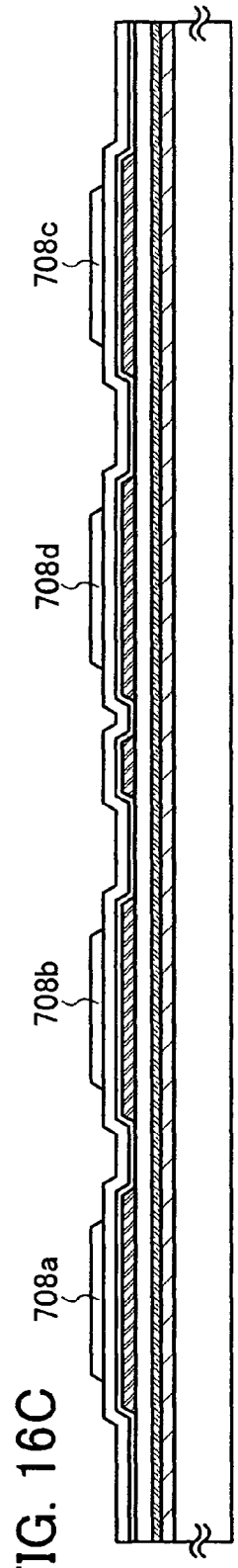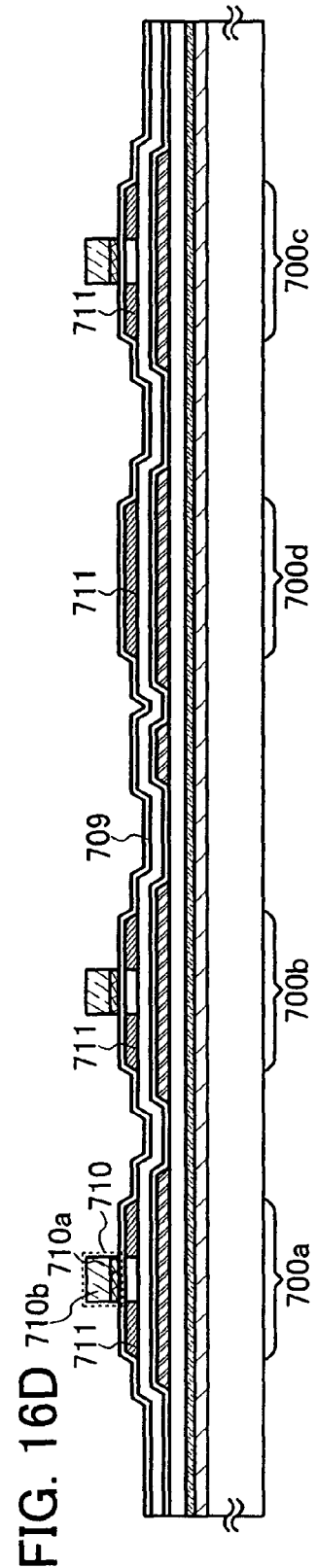

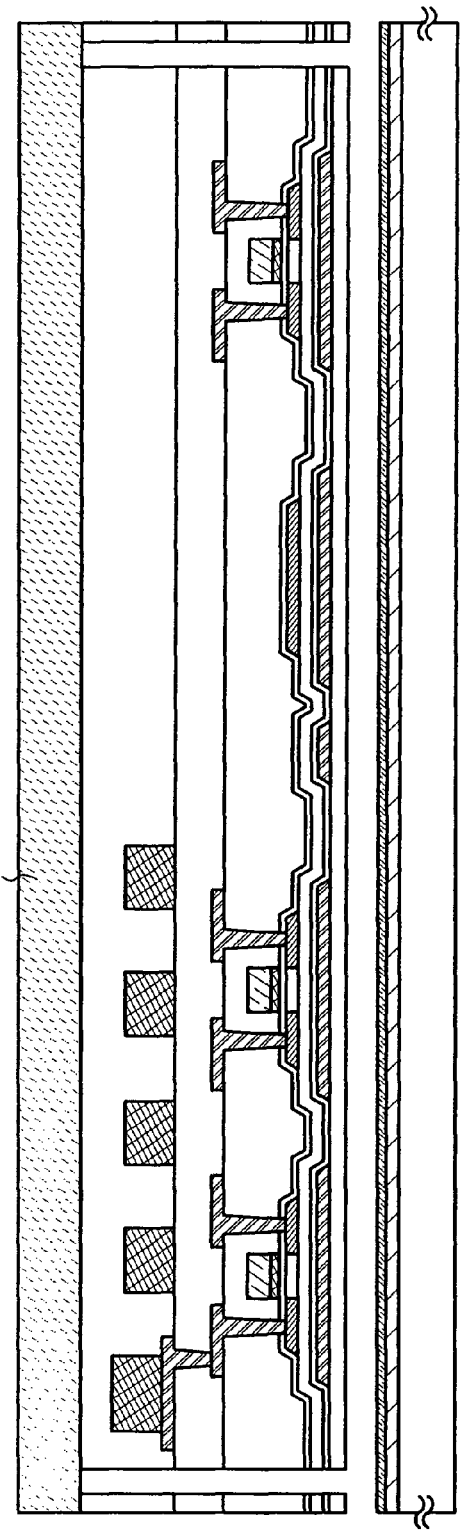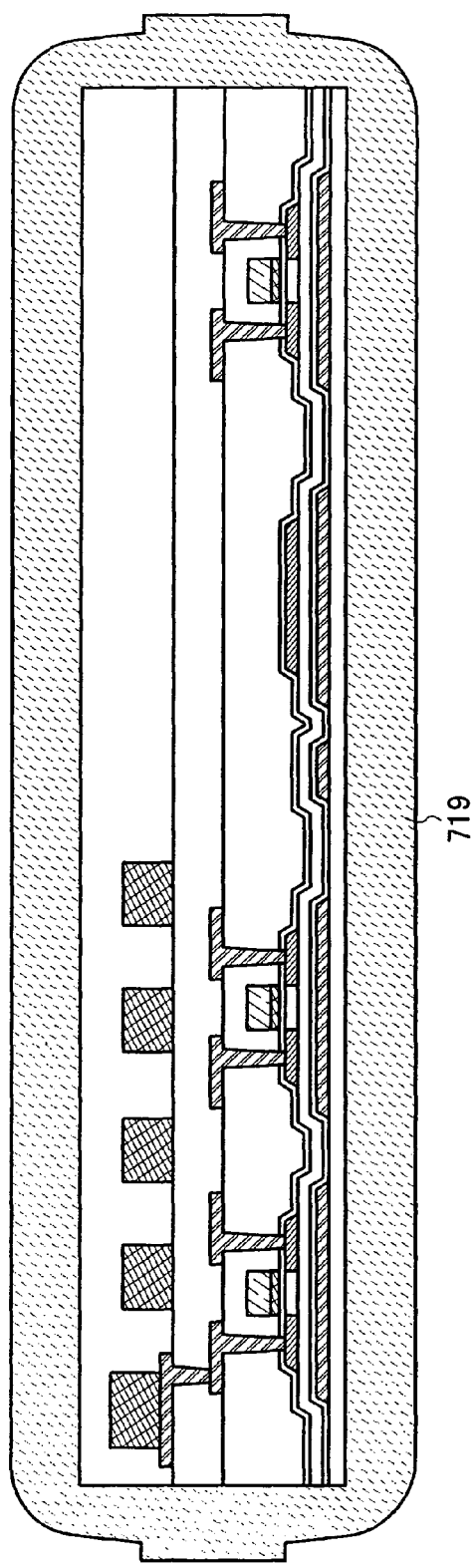

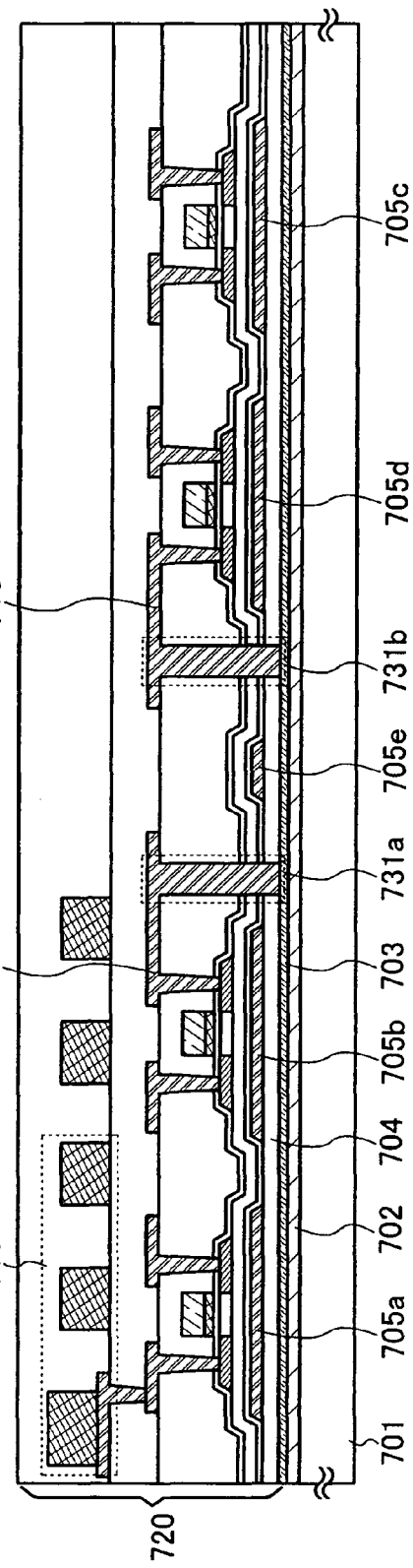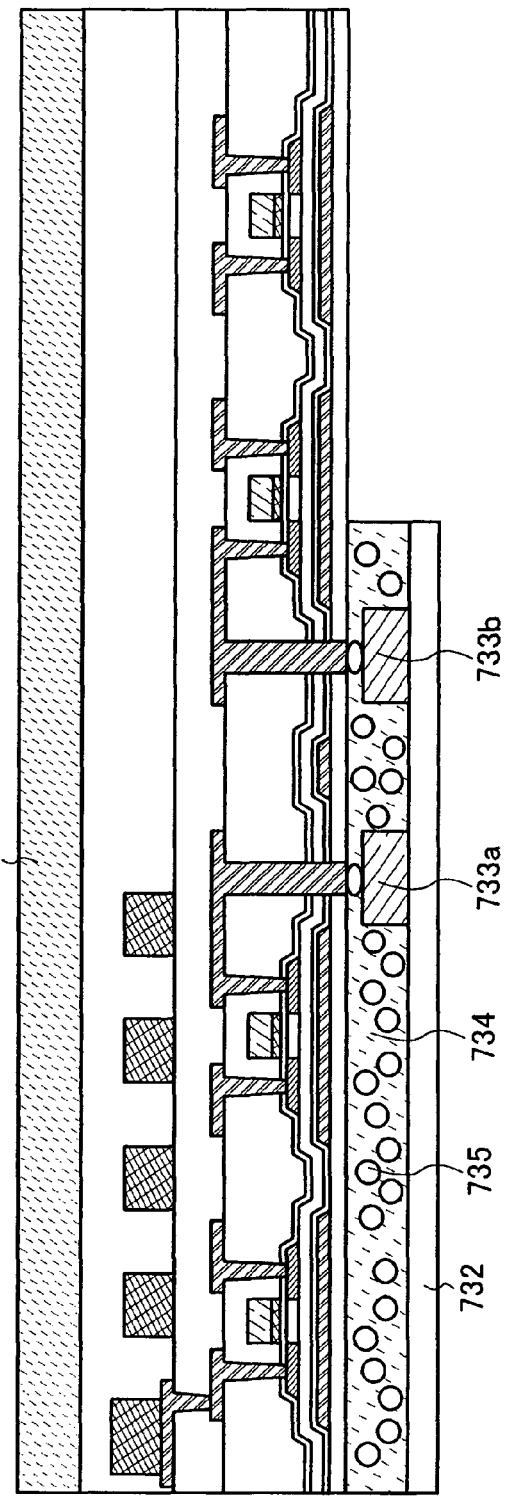

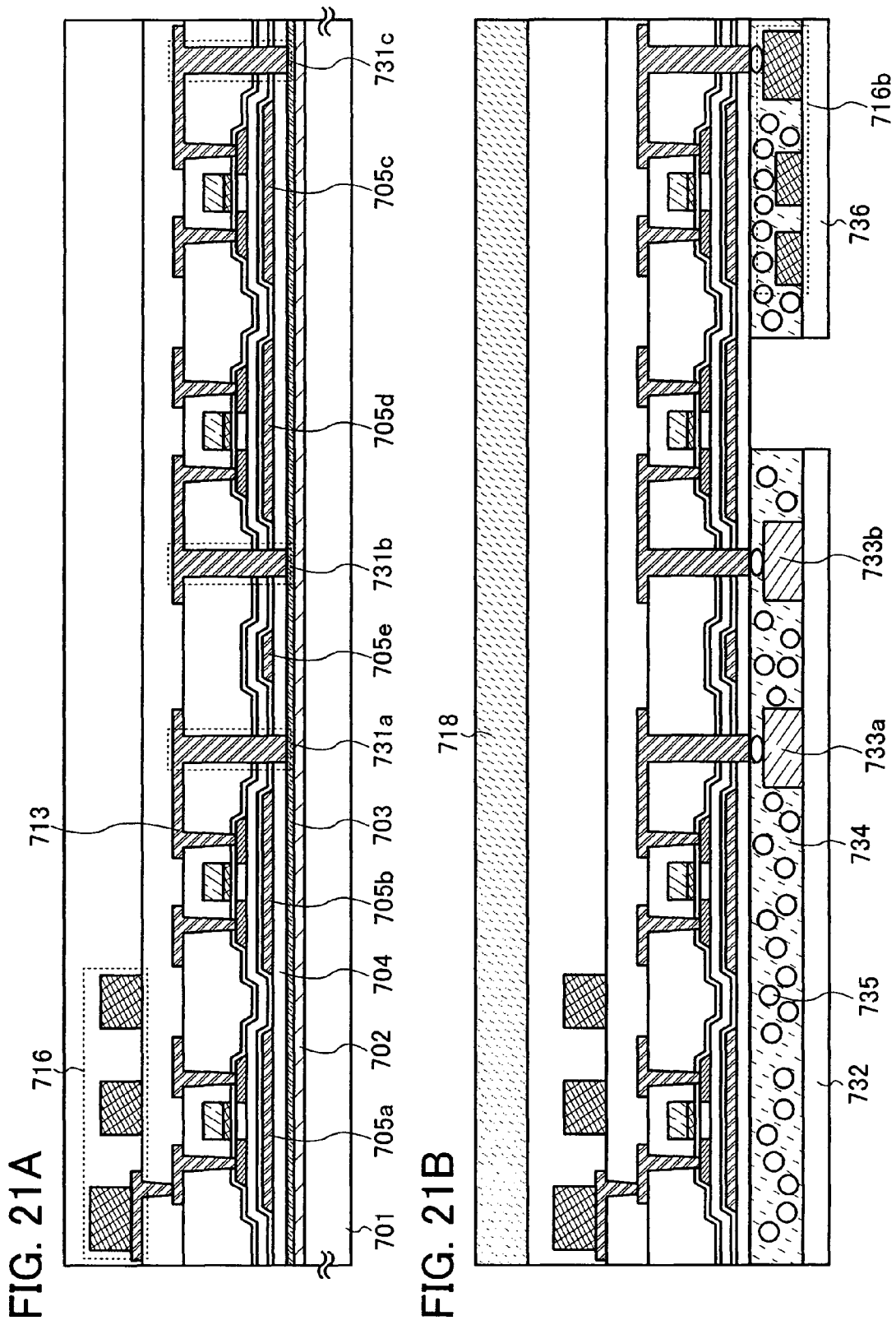

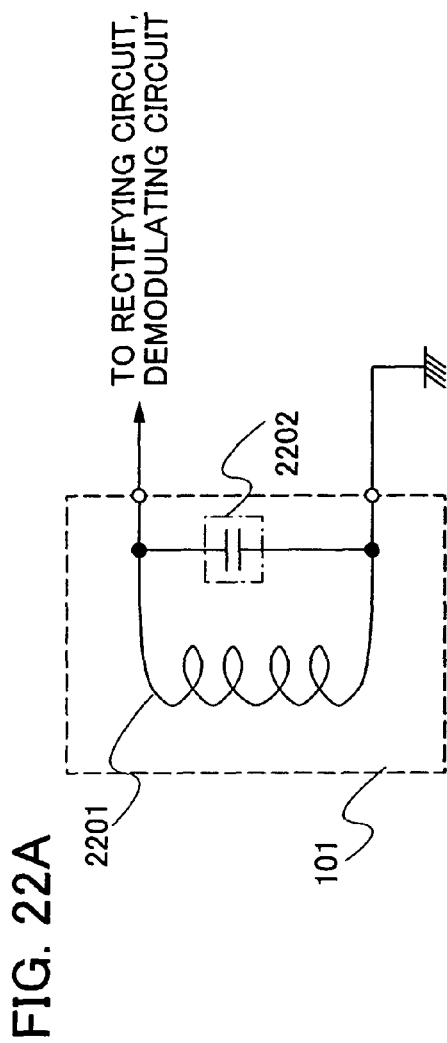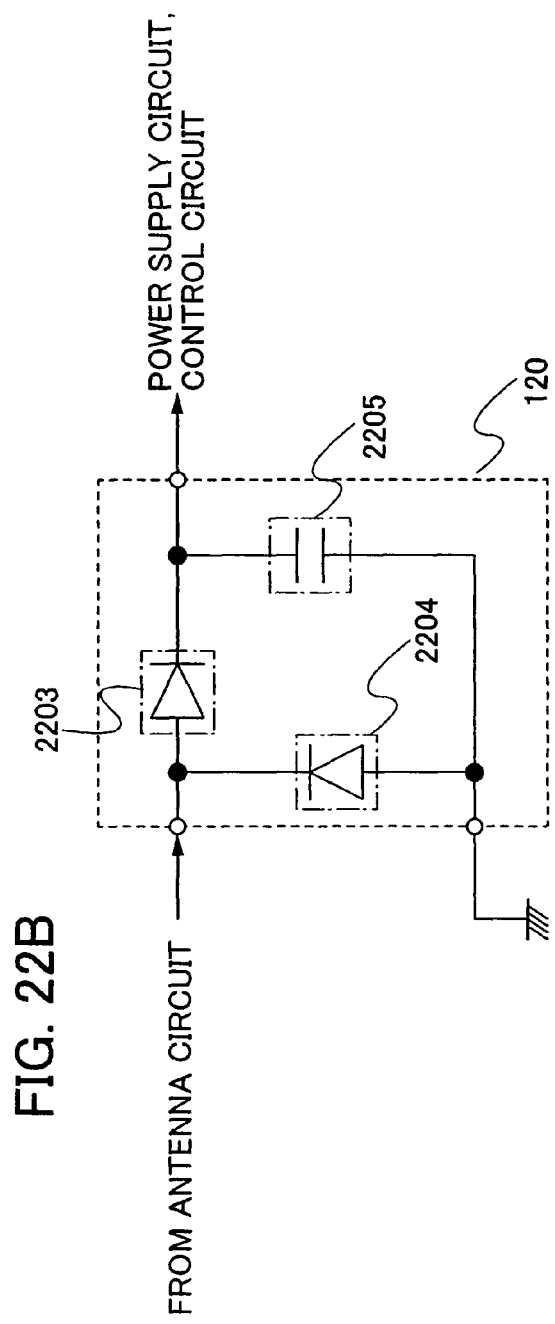

SEMICONDUCTOR DEVICE AND METHOD FOR OPERATING THE SAME

TECHNICAL FIELD

The present invention relates to a semiconductor device. In particular, the invention relates to a semiconductor device which transmits and receives data through radio waves and receives power. In addition, the invention relates to a method for operating it. Further, the invention relates to a communication system which uses a semiconductor device using radio waves, an antenna and a reader/writer for transmitting and receiving data to/from the semiconductor device, and an antenna and a battery for supplying power to the semiconductor device.

BACKGROUND ART

In recent years, an individual identification technique utilizing radio communication such as radio waves or an electromagnetic waves has attracted attention. In particular, as a semiconductor device which communicates data by radio communication, an individual identification technique utilizing an RFID (Radio Frequency IDentification) tag has attracted attention. An RFID tag (hereinafter described simply as an RFID) is also referred as an IC (Integrated Circuit) tag, an IC chip, an RF tag, a wireless tag, or an electronic tag. The individual identification technique utilizing the RFID has been useful for production, management, and the like of an individual object and an application to personal authentication has been expected.

The RFID is divided into two types, depending on whether a battery is incorporated or power is supplied from outside one of which is an active-type RFID which incorporates a battery, and the other of which is a passive-type RFID which is driven by utilizing power of radio waves or electromagnetic waves (carrier waves) from outside (with respect to an active-type RFID, see Reference 1: Japanese Published Patent Application No. 2005-316724, and with respect to a passive-type RFID, see Reference 2: Japanese Published Patent Application No. 2006-503376). Between the two, in an active-type RFID, a power supply for driving the RFID is incorporated and a battery is included as the power supply. In addition, in a passive-type RFID, a power supply for driving the RFID is generated by utilizing power of radio waves or electromagnetic waves (carrier waves) from outside, so that a structure without a battery is realized.

FIG. 3 shows a block diagram showing a specific structure of an active-type RFID. In an active-type RFID 300 in FIG. 3, a communication signal received by an antenna circuit 301 is input into a demodulating circuit 306 and an amplifier 307 in a signal processing circuit 302. Usually, the communication signal is transmitted by applying processing such as an ASK modulation or a PSK modulation of a carrier such as 13.56 MHz or 915 MHz. Here, FIG. 3 shows an example in which 13.56 MHz is used as the communication signal. In order to process a signal, a clock signal which is a reference signal is needed in FIG. 3, and here, the carrier of 13.56 MHz is used as the clock signal. The amplifier 307 amplifies the carrier of 13.56 MHz and supplies it to a logic circuit 308 as the clock signal. In addition, the communication signal to which the ASK modulation or the PSK modulation has been applied is demodulated in the demodulating circuit 306. The signal after demodulation is also transmitted to the logic circuit 308 to be analyzed. The signal analyzed in the logic circuit 308 is transmitted to a memory control circuit 309, and based on it, the memory control circuit 309 controls a memory circuit 310 and takes data stored in the memory circuit 310 to send it to the logic circuit 305. The data stored in the memory circuit 310 is encoded in the logic circuit 305 and then it is amplified in the amplifier 304, and a modulation circuit 303 modulates the signal. Here, a power supply in FIG. 3 is supplied by a battery 321 through a power supply circuit 320. The power supply circuit 320 supplies power to the amplifier 307, the demodulating circuit 306, the logic circuit 308, the memory control circuit 309, the memory circuit 310, the logic circuit 305, the amplifier 304, the modulation circuit 303, and the like. The active-type RFID operates in this manner.

FIG. 2 shows a block diagram showing a specific structure of a passive-type RFID. In a passive-type RFID 200 in FIG. 2, a communication signal received by an antenna circuit 201 is input into a demodulating circuit 206 and an amplifier 207 in a signal processing circuit 202. Usually, the communication signal is transmitted by applying processing such as an ASK modulation or a PSK modulation of a carrier such as 13.56 MHz or 915 MHz. Here, FIG. 2 shows an example in which 13.56 MHz is used as the communication signal. In order to process a signal, a clock signal which is a reference signal is needed in FIG. 2, and here, the carrier of 13.56 MHz is used as the clock signal. The amplifier 207 amplifies the carrier of 13.56 MHz and supplies it to a logic circuit 208 as the clock signal. In addition, the communication signal to which the ASK modulation or the PSK modulation has been applied is demodulated in the demodulating circuit 206. The signal after demodulation is also transmitted to the logic circuit 208 to be analyzed. The signal analyzed in the logic circuit 208 is transmitted to a memory control circuit 209, and based on it, the memory control circuit 209 controls a memory circuit 210 and takes data stored in the memory circuit 210 to send it to the logic circuit 205. The data stored in the memory circuit 210 is encoded in the logic circuit 205 and then it is amplified in the amplifier 204, and a modulation circuit 203 modulates the signal. On the other hand, the communication signal input into a rectifying circuit 220 is rectified and input into a power supply circuit 221. The power supply circuit 221 supplies power to the amplifier 207, the demodulating circuit 206, the logic circuit 208, the memory control circuit 209, the memory circuit 210, the logic circuit 205, the amplifier 204, the modulation circuit 203, and the like. The passive-type RFID operates in this manner.

DISCLOSURE OF INVENTION

However, as shown in FIG. 3, in the case of an active-type RFID having a battery for driving, the battery is consumed over time in accordance with the time for transmission and reception of individual information and the setting of intensity of a radio wave which is necessary for transmission and reception. Thus, there is a problem in that power which is necessary for transmission and reception of individual information cannot be finally obtained from the battery. Therefore, in order to sequentially use the active-type RFID having the battery for driving, there is a problem in that checking of the remaining charge of the battery or an operation of replacing the battery is needed.

In addition, as shown in FIG. 2, in the case of a passive-type RFID in which a power supply for driving is generated by utilizing power of a radio wave or an electromagnetic wave (a carrier wave) from outside, there is a problem in that transmission and reception of a signal from long distance and securing of power for transmitting a radio wave which is necessary for transmission and reception are difficult, so that an excellent state for transmission and reception is difficult to be realized. Therefore, in order to use the passive-type RFID in which the power supply for driving is generated by utilizing the power of the radio wave or the electromagnetic wave (the carrier wave) from outside, there is a problem in that the use of the semiconductor device is limited to short distance from an antenna of a reader/writer which is a unit for supplying power, in which supply of the power of the radio wave or the electromagnetic wave (the carrier wave) from outside is sufficient.

In view of the foregoing problems, it is an object of the invention to provide a semiconductor device including an RFID which can transmit and receive individual information without checking of the remaining charge of a battery or a replacing operation of the battery in accordance with deterioration over time of the battery for driving, and can maintain an excellent state for transmission and reception of individual information even when the power of the radio wave or the electromagnetic wave (the carrier wave) from outside is insufficient.

In order to solve the aforementioned problems, a battery (also described as a secondary battery) is provided as a power supply for supplying power to the RFID. Then, in the semiconductor device of the invention, the power supply for driving is generated by utilizing power of a signal received from outside; when power which is obtained from the signal received from outside is larger than predetermined power, its surplus power is stored in the battery; and when the power which is obtained from the signal received from outside is smaller than the predetermined power, power which is obtained from the battery is used for the power for driving.

A semiconductor device in accordance with one aspect of the invention includes a battery, a circuit which performs wireless transmission and reception of a signal, and a circuit which generates a predetermined voltage from power obtained from the signal. When power of the signal received is smaller than predetermined power, signal processing is performed by using a voltage which is generated from power obtained from the signal received and power output from the battery. When the power of the signal received is larger than the predetermined power, signal processing is performed by using a voltage which is generated from the power obtained from the signal received and the power is stored in the battery.

A semiconductor device in accordance with one aspect of the invention includes a receiving unit for receiving a signal, a signal processing unit which processes the signal received by the receiving unit and transmitting the signal, a transmitting unit for transmitting the signal generated by the signal processing unit, and a power storing unit which stores power supplied. The signal processing unit includes a power converting unit which converts the signal received by the receiving unit into direct current power, a voltage generating unit which generates a predetermined voltage from the power supplied, and a control unit which supplies power output from the power converting unit to the voltage generating unit and the battery when power converted by the power converting unit is larger than predetermined power, whereas the control unit supplies the power output from the power converting unit to the voltage generating unit and supplies power stored in the battery to the voltage generating unit when the power converted by the power converting unit is smaller than the predetermined power.

A semiconductor device in accordance with one aspect of the invention includes a first receiving unit for receiving a signal, a second receiving unit having a longer reception distance than the first receiving unit, a signal processing unit which processes the signal received by the first receiving unit and transmitting the signal, a first transmitting unit for transmitting the signal generated by the signal processing unit, a second transmitting unit which has a longer transmission distance than the first transmitting unit and transmits the signal received by the second receiving unit, and a power storing unit which stores power supplied. The signal processing unit includes a power converting unit which converts the signal received by the first receiving unit into direct current power, a voltage generating unit which generates a predetermined voltage from the power supplied, and a control unit which supplies power output from the power converting unit to the voltage generating unit and the battery when power converted by the power converting unit is larger than predetermined power, whereas the control unit supplies the power output from the power converting unit to the voltage generating unit and supplies power stored in the battery to the voltage generating unit when the power converted by the power converting unit is smaller than the predetermined power.

A semiconductor device in accordance with one aspect of the invention includes an antenna circuit which transmits and receives a signal, a signal processing unit which processes the signal received by the antenna circuit and transmitting the signal to the antenna circuit, and a battery which stores power supplied. The signal processing unit includes a rectifying circuit which rectifies the signal received by the antenna circuit and outputs direct current power, a power supply circuit which generates a predetermined voltage from the power supplied, and a control unit which supplies power output from the rectifying circuit to the power supply circuit and the battery when the power output from the rectifying circuit is larger than predetermined power, whereas supplies the power output from the rectifying circuit to the power supply circuit and supplies power stored in the battery to the power supply circuit when the power output from the rectifying circuit is smaller than the predetermined power.

A semiconductor device in accordance with one aspect of the invention includes a first antenna circuit which transmits and receives a signal, a second antenna circuit having longer transmission and reception distance than the first antenna circuit, a signal processing unit which supplies a signal for processing the signal received by the first antenna circuit and sending it to the first antenna circuit, and a battery which stores power supplied. The signal processing unit includes a rectifying circuit which rectifies the signals received by the antenna circuits and outputs direct current power, a power supply circuit which generates a predetermined voltage from the power supplied, and a control unit which supplies power output from the rectifying circuit to the power supply circuit and the battery when the power output from the rectifying circuit is larger than predetermined power, whereas the control unit supplies the power output from the rectifying circuit to the power supply circuit and supplies power stored in the battery to the power supply circuit when the power output from the rectifying circuit is smaller than the predetermined power.

A semiconductor device in accordance with one aspect of the invention has a structure in which the carrier frequency of the second antenna circuit tunes to the carrier frequency of the first antenna circuit in the aforementioned structure.

A semiconductor device in accordance with one aspect of the invention has a structure in which the first antenna circuit includes a first antenna and a first capacitor and the second antenna circuit includes a second antenna and a second capacitor in the aforementioned structure.

A semiconductor device in accordance with one aspect of the invention has a structure in which each of the first antenna and the second antenna is a coil obtained by winding a conductive wiring in the aforementioned structure.

A semiconductor device in accordance with one aspect of the invention has a structure in which the diameter of the coil in the second antenna is longer than the diameter of the coil in the first antenna in the aforementioned structure.

Note that a switch described in the invention can employ an electrical switch, or a mechanical switch, for example. That is, any element can be employed as long as it can control a current flow, and thus, a switch is not limited to a certain element. For example, it may be a transistor, a diode (e.g., a PN junction diode, a PIN diode, a Schottky diode, or a diode-connected transistor), or a logic circuit combining such elements. Therefore, in the case of employing a transistor as a switch, the polarity (conductivity type) of the transistor is not particularly limited to a certain type since it operates just as a switch. However, when off-current is preferred to be small, a transistor of the polarity with smaller off-current is preferably employed. A transistor provided with an LDD region, a transistor with a multi-gate structure, or the like is given as an example of a transistor with small off-current. In addition, it is preferable that an n-channel transistor be employed when a potential of a source terminal of the transistor which is operated as a switch is closer to a low-potential-side power supply (e.g., Vss, GND, or 0 V), while a p-channel transistor be employed when the potential of the source terminal is closer to a high-potential-side power supply (e.g., Vdd). This is because the absolute value of a gate-source voltage of the transistor can be increased, so that the transistor can easily function as the switch. Note that a CMOS switch may also be employed by using both n-channel and p-channel transistors. By employing the CMOS switch, the switch can be operated appropriately even in the case in which a condition is changed such that a voltage output through the switch (in other words, a voltage input into the switch) is higher or lower than a voltage of output side.

Note that in the invention, description 'being connected' includes a case where elements are electrically connected and a case where elements are directly connected. Accordingly, in the structures disclosed in the invention, another element which enables an electrical connection (e.g., a switch, a transistor, a capacitor, an inductor, a resistor, or a diode) may be interposed between elements having a predetermined connection relation. Alternatively, the elements may be directly connected and provided without interposing another element therebetween. In the case where elements are connected without interposing another element which enables an electrical connection therebetween and a direct connection is only included, description 'being directly connected' is employed. Note that description 'being electrically connected' includes the case where elements are electrically connected and the case where elements are directly connected.

Note that in the invention, various types of transistors can be applied to a transistor without limiting to a certain type. Accordingly, a thin film transistor (TFT) using a non-single crystalline semiconductor film typified by amorphous silicon or polycrystalline silicon, a transistor formed by using a semiconductor substrate or an SOI substrate, a MOS transistor, a junction transistor, a bipolar transistor, a transistor using a compound semiconductor such as ZnO or a-InGaZnO, a transistor using an organic semiconductor or a carbon nanotube, or other transistors can be applied. Note that a non-single crystalline semiconductor film may include hydrogen or halogen. In addition, various types of substrates can be employed as a substrate over which a transistor is formed without limiting to a certain type. Accordingly, for example, the transistor can be formed over a single crystalline substrate, an SOI substrate, a glass substrate, a quartz substrate, a plastic substrate, a paper substrate, a cellophane substrate, a stone substrate, or the like. In addition, a transistor is formed over one substrate, and then, the transistor may be transferred to another substrate.

The structure of a transistor can be various modes without limiting to a certain structure. For example, a multi-gate structure having two or more gate electrodes may be used. By using the multi-gate structure, off-current can be reduced and the withstand voltage can be increased to improve reliability of the transistor, or even if a drain-source voltage fluctuates when the transistor operates in a saturation region, flat characteristics can be provided without causing fluctuations of drain-source current very much. In addition, a structure where gate electrodes are formed above and below a channel may be used. By using the structure where gate electrodes are formed above and below the channel, a channel region is enlarged to increase the amount of current flowing therethrough, or a depletion layer can be easily formed to decrease the S value. In addition, a structure where a gate electrode is formed over a channel, a structure where a gate electrode is formed below a channel, a staggered structure, an inversely staggered structure, a structure where a channel region is divided into a plurality of regions and divided regions are connected in parallel or in series may be employed. A source electrode or a drain electrode may overlap with a channel (or a part of it). By employing the structure where the source electrode or the drain electrode may overlap with the channel (or the part of it), the case where an electric charge is accumulated in the part of the channel so that an operation becomes unstable can be prevented. In addition, a LDD (Lightly Doped Drain) region may be provided. By providing the LDD region, off-current can be reduced and the withstand voltage can be increased to improve reliability of the transistor, or even if a drain-source voltage fluctuates when the transistor operates in a saturation region, flat characteristics can be provided without causing fluctuations of drain-source current very much.

Note that as described above, various types of transistors may be employed as the transistor in the invention, and such transistors can be formed over various types of substrates. Accordingly, all of circuits may be formed over a glass substrate, a plastic substrate, a single crystalline substrate, an SOI substrate, or any other substrates. By forming all of the circuits over the same substrate, the number of component parts can be reduced to cut cost, or the number of connections to the circuit components can be reduced to improve reliability. Alternatively, parts of the circuits may be formed over one substrate and the other parts of the circuits may be formed over another substrate. That is, not all of the circuits are required to be formed over the same substrate. For example, parts of the circuits may be formed with transistors over a glass substrate and the other parts of the circuits may be formed over a single crystalline substrate (IC chip), so that the IC chip may be connected to the glass substrate by COG (Chip On Glass). Alternatively, the IC chip may be connected to the glass substrate by TAB (Tape Automated Bonding) or a printed wiring board. In this manner, by forming parts of the circuits over the same substrate, the number of component parts can be reduced to cut cost, or the number of connections to the circuit components can be reduced to improve the reliability. In addition, by forming a portion with a high driving voltage or a portion with high driving frequency which would consume large power over another substrate, increase of power consumption can be prevented.

In the invention, description that an object is "formed on" or "formed over" another object does not necessarily mean that the object is in direct contact with another object. The description includes the case where two objects are not in direct contact with each other, that is, the case where another object is sandwiched therebetween. Accordingly, for example, when it is described that a layer B is formed on (over) a layer A, it includes both of the case where the layer B is formed in direct contact with the layer A, and the case where another layer (e.g., a layer C or a layer D) is formed in direct contact with the layer A and the layer B is formed in direct contact with the layer C or D. Similarly, when it is described that an object is formed above another object, it does not necessarily mean that the object is in direct contact with another object, and another object may be sandwiched therebetween. Accordingly, for example, when it is described that a layer B is formed above a layer A, it includes both of the case where the layer B is formed in direct contact with the layer A, and the case where another layer (e.g., a layer C or a layer D) is formed in direct contact with the layer A and the layer B is formed in direct contact with the layer C or D. Similarly, when it is described that an object is formed below or under another object, it includes both of the case where the objects are in direct contact with each other, and the case where the objects are not in contact with each other.

A semiconductor device of the invention includes a battery. Therefore, unlike a conventional technique, shortage of power for transmission and reception of individual information in accordance with deterioration over time of the battery can be prevented. The battery can be charged by utilizing power of a radio wave or an electromagnetic wave from outside without being connected to a battery charger. Accordingly, the battery can be sequentially used without the need of checking of the remaining charge of the battery or an operation of replacing the battery unlike an active-type RFID. In addition, power for driving an RFID is always held in the battery so that sufficient power for driving the RFID can be obtained; therefore, communication distance from a reader/writer can be increased.

Note that in the invention, a semiconductor device means a device having a circuit including semiconductor elements (e.g., transistors or diodes). The semiconductor device may include all devices that can function by utilizing semiconductor characteristics. In addition, as the shape of the semiconductor device, any of a label-shape, a cylinder-shape, a card-shape, and a box-shape may be employed and various modes can be employed.

BRIEF DESCRIPTION OF DRAWINGS

In the accompanying drawings:

FIGS. 7A and 7B are diagrams each showing a structure of a semiconductor device of the invention;

FIGS. 11A to 11D are diagrams each showing a manufacturing step of a semiconductor device of the invention;

FIGS. 12A to 12C are diagrams each showing a manufacturing step of a semiconductor device of the invention;

FIGS. 13A and 13B are diagrams each showing a manufacturing step of a semiconductor device of the invention;

FIGS. 14A and 14B are diagrams each showing a manufacturing step of a semiconductor device of the invention;

FIGS. 15A and 15B are diagrams showing a manufacturing step of a semiconductor device of the invention;

FIGS. 16A to 16D are diagrams each showing a manufacturing step of a semiconductor device of the invention;

FIGS. 18A and 18B are diagrams each showing a manufacturing step of a semiconductor device of the invention;

FIGS. 20A and 20B are diagrams each showing a manufacturing step of a semiconductor device of the invention;

FIGS. 21A and 21B are diagrams each showing a manufacturing step of a semiconductor device of the invention;

FIG. 22A is a diagram showing an example an antenna circuit and FIG. 22B is a diagram showing an example of a rectifying circuit;

BEST MODE FOR CARRYING OUT THE INVENTION

Figure 1:
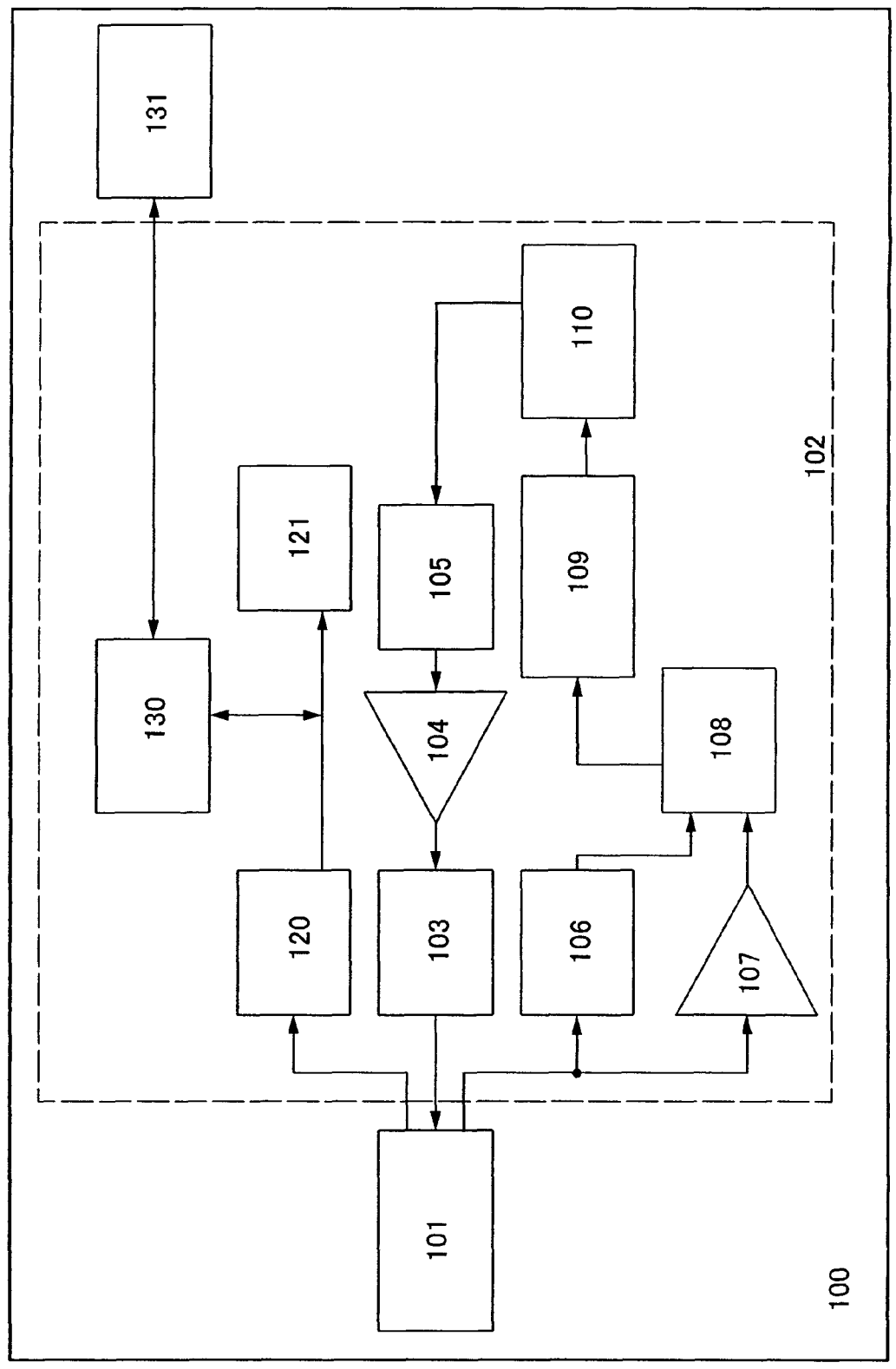
FIG. 1 is a diagram showing a structure of a semiconductor device of the invention.
Figure 2:
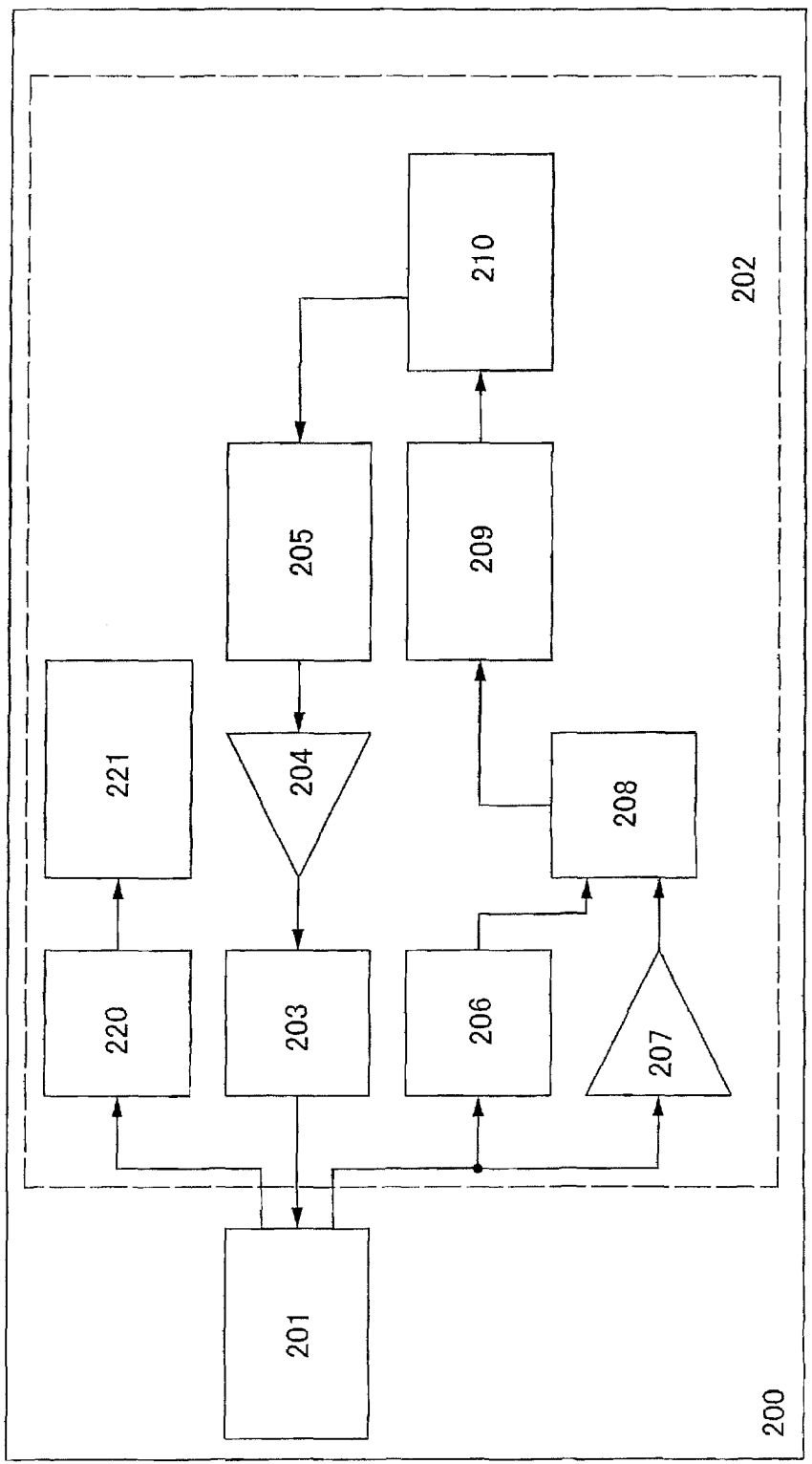
FIG. 2 is a diagram showing a structure of a passive-type semiconductor device.
Figure 3:
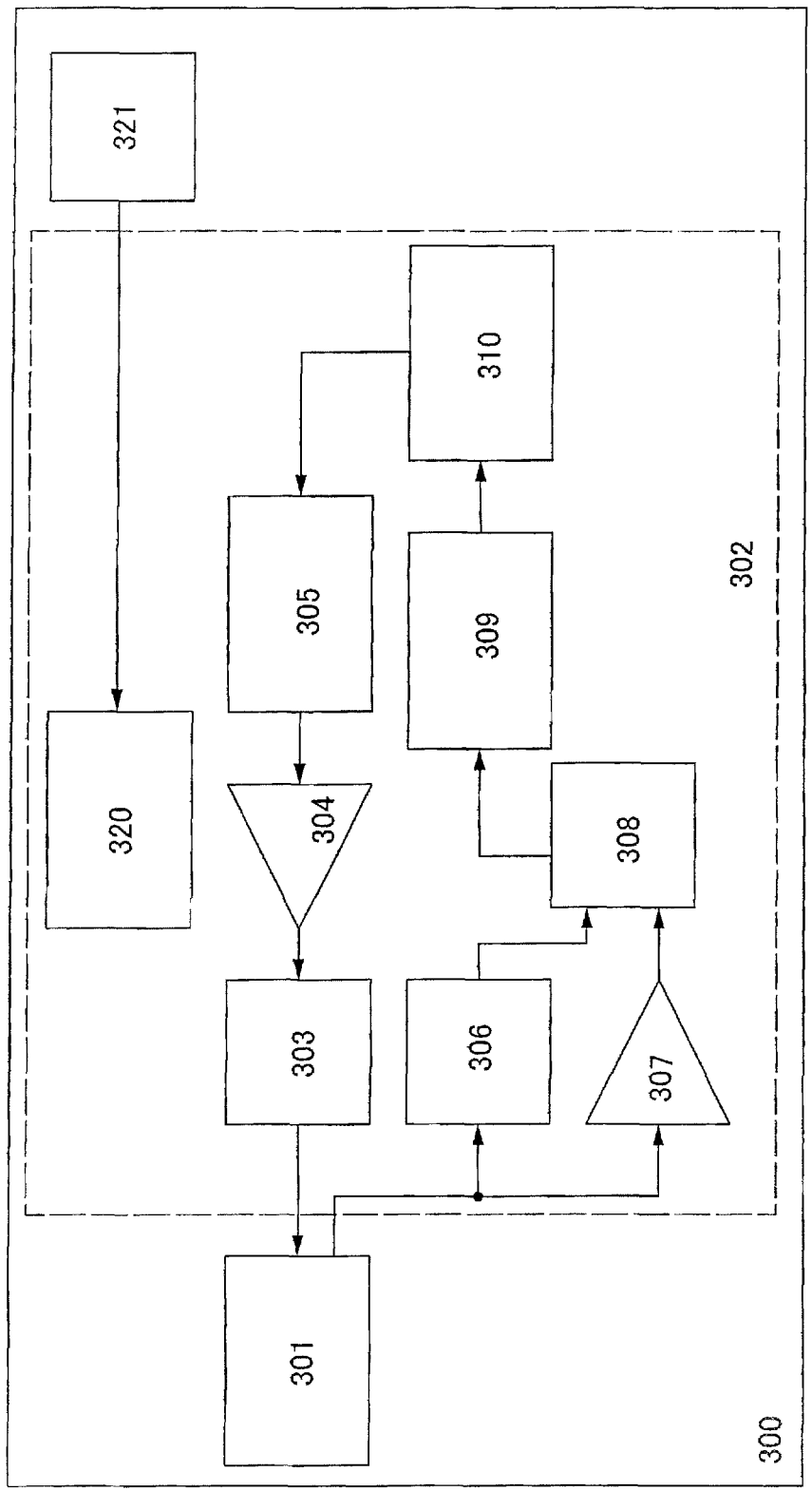
FIG. 3 is a diagram showing a structure of an active-type semiconductor device.

Hereinafter, the invention is described by way of embodiment modes with reference to the drawings. However, the invention can be implemented by various different ways and it will be understood that various changes and modifications will be apparent to those skilled in the art. Unless such changes and modifications depart from the spirit and the scope of the invention, they should be construed as being included therein. Therefore, the invention should not be construed as being limited to the description of embodiment modes. Note that in structures of the invention described below, reference numerals showing the same portions are used in common among different drawings.

Embodiment Mode 1

First, a schematic structure of a semiconductor device in accordance with Embodiment Mode 1 of the invention is briefly described.

The semiconductor device includes an antenna circuit, a signal processing circuit which processes a signal received by the antenna circuit, and a battery which stores power supplied.

The antenna circuit includes an antenna which receives a signal.

As the shape of the antenna in the antenna circuit, various types can be employed. For example, the shape such as a so-called dipole antenna, a loop antenna, a Yagi antenna, a patch antenna, or a minute antenna can be employed. In the case where the antenna is formed over the substrate as a transistor included in the signal processing circuit, the shape of the antenna is preferably a minute loop antenna, a minute dipole antenna, or the like.

In addition, the antenna circuit may include a unit for changing the frequency of the signal received. For example, when the shape of the antenna is a loop antenna, a resonance circuit may be formed by using an antenna coil which forms the antenna and a capacitor.

The signal processing circuit includes a power supply circuit which generates a predetermined voltage of the semiconductor device from the power supplied, and a rectifying circuit which rectifies the signal received by the antenna circuit to supply direct current power to the power supply circuit.

In addition, when power output from the rectifying circuit is sufficiently larger than power which is necessary for operating the signal processing circuit, the signal processing circuit stores surplus power of the power output from the rectifying circuit in the battery. When the power output from the rectifying circuit is insufficient for operating the signal processing circuit, the signal processing circuit includes a control unit which supplies power from the battery to the power supply circuit.

As the battery, a battery such as a lithium ion battery, a lithium secondary battery, a nickel metal hydride battery, a nickel cadmium battery, or an organic radical battery can be used; however, the invention is not limited to this. Alternatively, a capacitor having high capacity or the like may be used.

The control unit can be realized by connecting the battery to the rectifying circuit through a control circuit. By connecting the battery, the surplus power is stored in the battery and power is supplied from the battery to the power supply circuit when power output from the rectifying circuit is decreased.

An operation of the control circuit is described as follows.

The control circuit compares a voltage output from the battery and a voltage output from the rectifying circuit. When the voltage output from the rectifying circuit is sufficiently higher than the voltage output from the battery, the control circuit connects the rectifying circuit and the battery. Power output from the rectifying circuit at this time is supplied to both of the battery and the power supply circuit and the surplus power is stored in the battery.

When the voltage output from the rectifying circuit is not sufficiently higher than the voltage output from the battery, the control circuit connects the power supply circuit and the battery. At this time, when the voltage output from the rectifying circuit is higher than the voltage output from the battery, the power output from the rectifying circuit is supplied to the power supply circuit, and no charging of the battery and no consumption of power of the battery are required. Then, when the voltage output from the rectifying circuit becomes lower than the voltage output from the battery, power is supplied from the battery to the power supply circuit.

That is, the control circuit controls a direction of a current in accordance with the voltage output from the rectifying circuit and the voltage output from the battery.

Next, a configurational example of the semiconductor device in accordance with Embodiment Mode 1 of the invention is described in detail with reference to a block diagram shown in FIG. 1.

The semiconductor device in accordance with Embodiment Mode 1 of the invention includes an antenna circuit 101, a signal processing circuit 102, and a battery 131.

The antenna circuit 101 includes an antenna coil 2201 and a capacitor 2202 as shown in FIG. 22A, for example, and the antenna circuit 101 may form a resonance circuit by using the antenna coil 2201 and the capacitor 2202.

The signal processing circuit 102 includes a modulation circuit 103, an amplifier 104, a logic circuit 105, a demodulating circuit 106, an amplifier 107, a logic circuit 108, a memory control circuit 109, a memory circuit 110, a rectifying circuit 120, a power supply circuit 121, and a control circuit 130.

The rectifying circuit 120 includes rectifying elements 2203 and 2204 and a capacitor 2205 as shown in FIG. 22B, for example, and half-wave rectifies an alternating current signal received by the antenna circuit 101 by using the rectifying elements 2203 and 2204 and smoothes the signal with the capacitor 2205. Then, a voltage output from the rectifying circuit 120 is supplied to the power supply circuit 121 and the control circuit 130.

Figure 4:
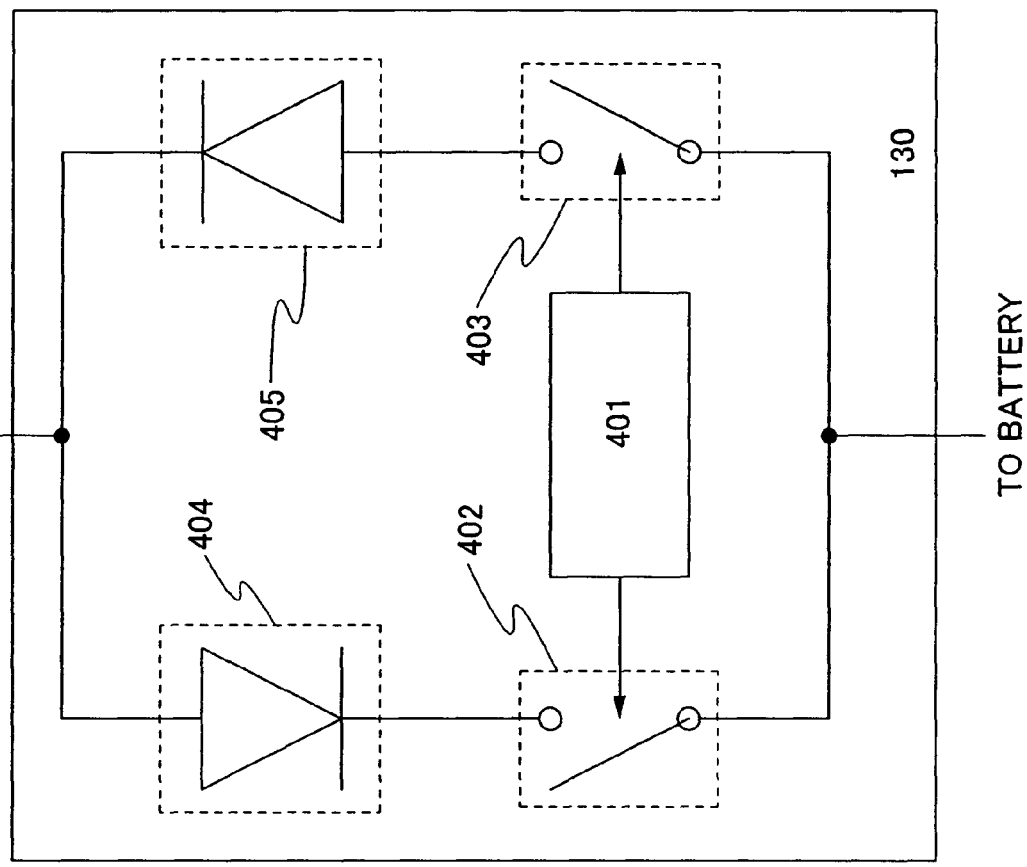
FIG. 4 is a diagram showing an example of a control circuit.

FIG. 4 shows an example of the control circuit 130.

The control circuit 130 includes rectifying elements 404 and 405, a voltage comparator 401, and switches 402 and 403.

The voltage comparator 401 compares a voltage output from a battery 131 and a voltage output from the rectifying circuit 120. When the voltage output from the rectifying circuit 120 is sufficiently higher than the voltage output from the battery 131, the voltage comparator 401 turns on the switch 402 and turns off the switch 403. Then, a current is supplied from the rectifying circuit 120 to the battery 131 through the rectifying element 404 and the switch 402. On the other hand, when the voltage output from the rectifying circuit 120 is not sufficiently higher than the voltage output from the battery 131, the voltage comparator 401 turns off the switch 402 and turns on the switch 403. At this time, when the voltage output from the rectifying circuit 120 is higher than the voltage output from the battery 131, a current is not supplied to the rectifying element 405; and when the voltage output from the rectifying circuit 120 is lower than the voltage output from the battery 131, a current is supplied from the battery 131 to the power supply circuit 121 through the switch 403 and the rectifying element 405.

The control circuit is not limited to the description in this embodiment mode and another method may be employed.

Figure 5:
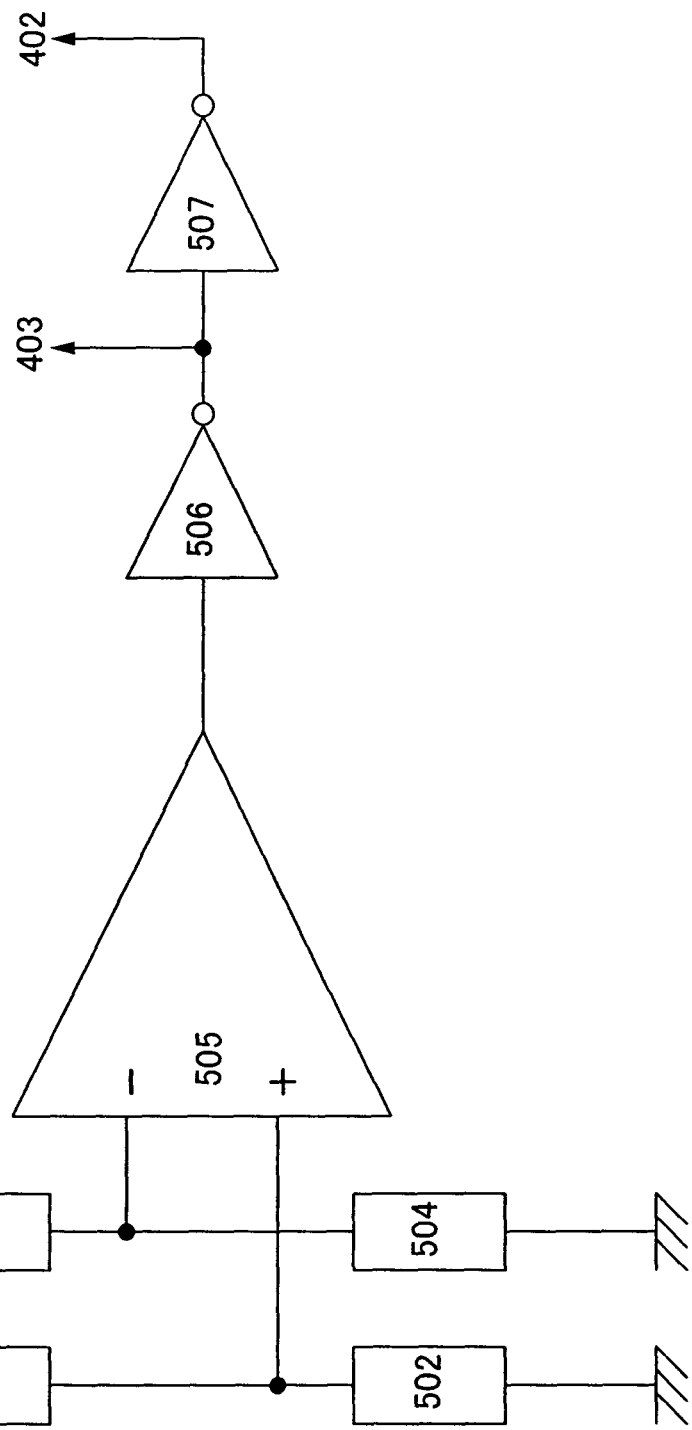
FIG. 5 is a diagram showing an example of a voltage comparator.

In addition, FIG. 5 shows an example of the voltage comparator 401.

The voltage comparator 401 resistance-divides the voltage output from the battery 131 by using resistors 501 and 502 and resistance-divides the voltage output from the rectifying circuit 120 by using resistors 503 and 504, and inputs each resistance-divided voltage into a comparator 505. Inverter-type buffer circuits 506 and 507 are connected in series to an output of the comparator 505. Then, the voltage comparator 401 inputs an output of the buffer circuit 506 into a control terminal of the switch 403 and inputs an output of the buffer circuit 507 into a control terminal of the switch 402, and controls on/off of the switches 402 and 403 in FIG. 4. Note that each of the switches 402 and 403 is turned on when a signal input into each of the control terminal thereof is at an H-level, and each of the switches 402 and 403 is turned off when the signal input into the control terminals thereof is at an L-level.

By resistance-dividing a voltage to regulate a voltage input into the comparator 505, the voltage comparator 401 can control when the switch 402 is turned on and the switch 403 is turned off in accordance with how much the voltage output from the rectifying circuit is higher than the voltage output from the battery.

The voltage comparator is not limited to the description in this embodiment mode and another method may be employed.

Signal processing of the semiconductor device in accordance with Embodiment Mode 1 of the invention is described as follows. A communication signal received by the antenna circuit 101 is input into the demodulating circuit 106 and the amplifier 107. Usually, the communication signal is transmitted by performing processing such as an ASK modulation or a PSK modulation of a carrier such as 13.56 MHz or 915 MHz.

FIG. 1 shows an example of the case where a communication signal of 13.56 MHz is used. In order to process a signal, a clock signal which is a reference signal is needed, and in this example, a carrier of 13.56 MHz is used as the clock signal. The amplifier 107 amplifies the carrier of 13.56 MHz and supplies it to the logic circuit 108 as the clock signal. In addition, the communication signal to which the ASK modulation or the PSK modulation has been applied is demodulated in the demodulating circuit 106. The signal after demodulation is also transmitted to the logic circuit 108 to be analyzed. The signal analyzed in the logic circuit 108 is transmitted to the memory control circuit 109, and based on it, the memory control circuit 109 controls the memory circuit 110. Then, the memory control circuit 109 takes out data stored in the memory circuit 110 to send it to the logic circuit 105. The data transmitted to the logic circuit 105 is encoded in the logic circuit 105 and then it is amplified in the amplifier 104, and a modulation circuit 103 modulates the signal. The semiconductor device in accordance with Embodiment Mode 1 of the invention operates in this manner.

Although the communication signal of 13.56 MHz is described here, the invention is not limited to 13.56 MHz. The invention can be realized by using another frequency such as 125 KHz, UHF frequency, or 2.45 GHz. In addition, the block structure can be realized with a structure other than the structure shown in FIG. 1.

Figure 6:
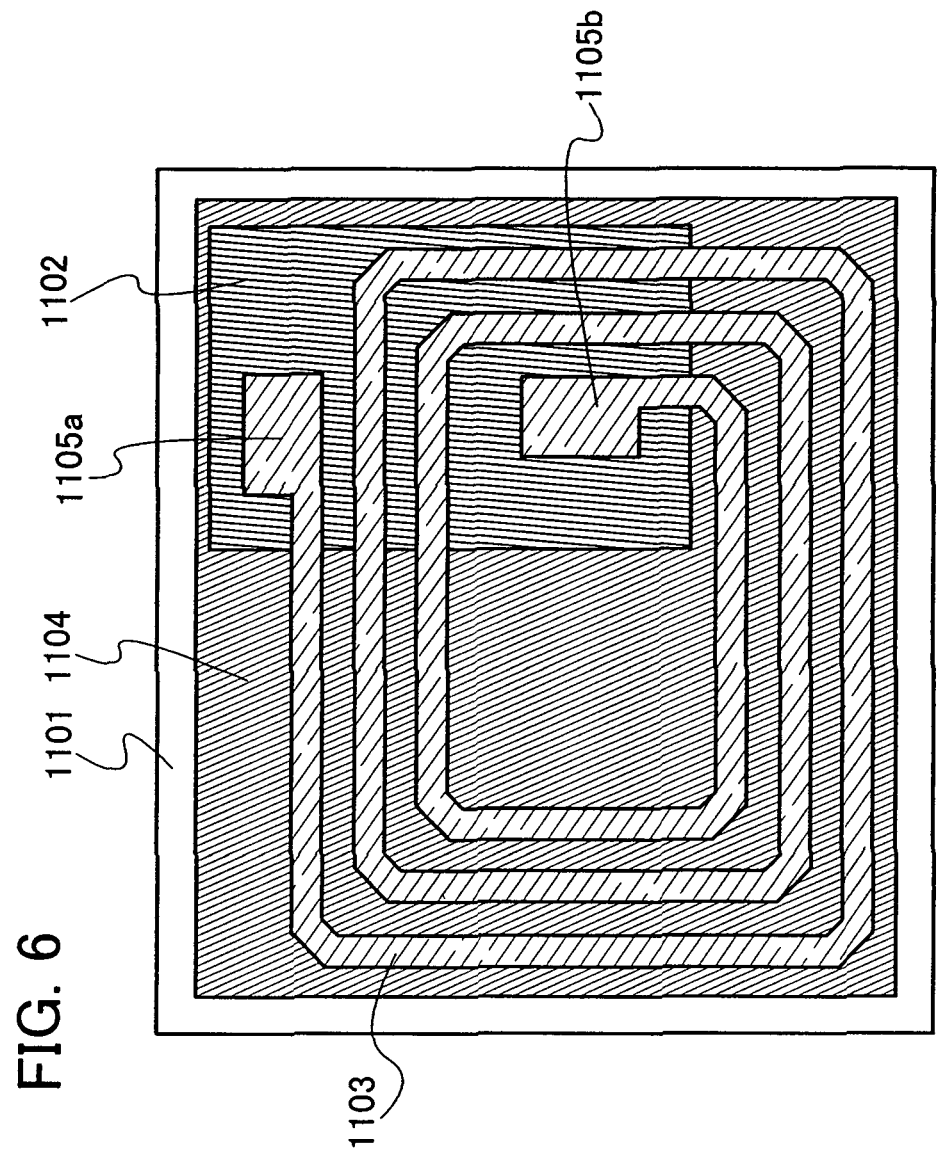
FIG. 6 is a diagram showing a structure of a semiconductor device of the invention.

Next, FIG. 6 shows a schematic diagram of the semiconductor device in accordance with Embodiment Mode 1 of the invention.

The semiconductor device includes a signal processing circuit 1102, an antenna 1103, and a battery 1104 in a base substrate 1101. The antenna 1103 has connecting terminals 1105a and 1105b. In the antenna 1103, each of the connecting terminals 1105a and 1105b is connected to the signal processing circuit 1102.

Note that a substrate over which the signal processing circuit 1102, the antenna 1103, and the battery 1104 are formed is not shown in FIG. 6.

The base substrate 1101 includes at least two sheets and these two sheets are attached together. A material such as paper or plastic can be used as the sheet.

Various types of transistors can be applied to a transistor included in the signal processing circuit 1102 without limiting to a certain type. Accordingly, a thin film transistor (TFT) using a non-single crystalline semiconductor film typified by amorphous silicon or polycrystalline silicon, a transistor formed by using a semiconductor substrate or an SOI substrate, a MOS transistor, a junction transistor, a bipolar transistor, a transistor using a compound semiconductor such as ZnO or a-InGaZnO, a transistor using an organic semiconductor or a carbon nanotube, or other transistors can be applied. Note that a non-single crystalline semiconductor film may include hydrogen or halogen. In addition, various types of substrates can be employed as a substrate over which the signal processing circuit 1102 is formed without limiting to a certain type. Accordingly, for example, the signal processing circuit 1102 can be formed over a single crystalline substrate, an SOI substrate, a glass substrate, a quartz substrate, a plastic substrate, a paper substrate, a cellophane substrate, a stone substrate, or the like. In addition, the signal processing circuit 1102 may be formed over one substrate, and then, the signal processing circuit 1102 may be transferred to another substrate.

As the shape of the antenna 1103, various types can be employed without limiting to the shape shown in the drawing. For example, the shape such as a so-called dipole antenna, a loop antenna, a Yagi antenna, a patch antenna, or a minute antenna can be employed. In the case where the antenna 1103 is formed over the same substrate as the transistor included in the signal processing circuit 1102, it is particularly preferable that the shape of the antenna be a minute loop antenna, a minute dipole antenna, or the like. The antenna 1103 may be formed over the same substrate as the signal processing circuit 1102, or may be formed over a substrate which is different from the substrate over which the signal processing circuit 1102 is formed. In addition, various types of substrates can be employed as a substrate over which the antenna 1103 is formed without limiting to a certain type. Accordingly, for example, the antenna 1103 can be formed over a single crystalline substrate, an SOI substrate, a glass substrate, a quartz substrate, a plastic substrate, a paper substrate, a cellophane substrate, a stone substrate, or the like. In the case where the antenna 1103 is formed over the same substrate as the signal processing circuit 1102, the antenna 1103 may be formed by depositing a conductive film by sputtering, CVD, spin coating, or the like and then patterning the conductive film; or the antenna 1103 may be formed by a droplet discharge method typified by an ink-jet method, a screen printing method, or the like. Also in the case where the antenna 1103 is formed over the substrate which is different from the substrate over which the signal processing circuit 1102 is formed, the antenna 1103 can be formed by the aforementioned methods; however, it is particularly preferable that the antenna 1103 be formed by the screen printing method. Note that patterning means processing of the shape of a film such as forming of patterns of the film by a photolithography technique (for example, forming of a contact hole in photosensitive acryl, processing of the shape of photosensitive acryl so as to be a spacer, and the like are included), or forming of a mask pattern by the photolithography technique and performing etching by using the mask pattern.

FIGS. 23A to 23E show specific examples of the shape of the antenna. Note that although a thing corresponding to the battery 1104 is not described here for simplicity, the battery is provided in the semiconductor device in accordance with Embodiment Mode 1 of the invention.

Figure 23A:
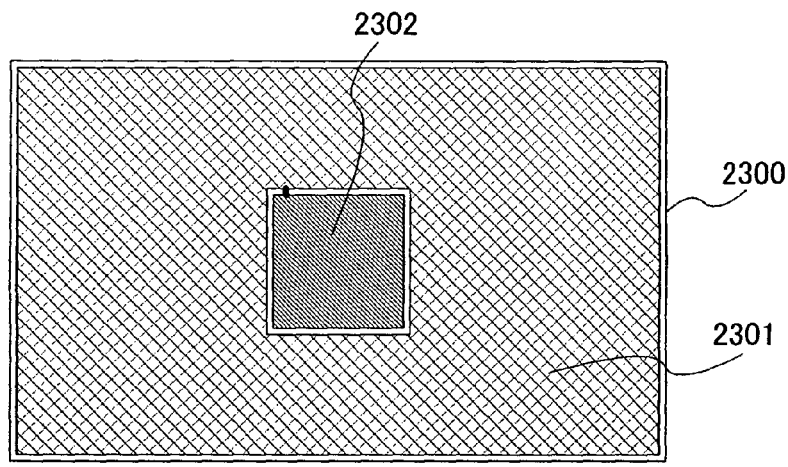
FIGS. 23A to 23E are diagrams showing examples of the shape of an antenna.

FIG. 23A shows an example where a surrounding region of a signal processing circuit is covered with a sheet of an antenna. An antenna 2301 and a signal processing circuit 2302 are included in a base substrate 2300. Although a structure where the surrounding region of the signal processing circuit 2302 is covered with the antenna 2301 is shown in the drawing, a structure where the entire surface is covered with the antenna and the signal processing circuit 2302 is provided over it may also be employed.

Figure 23B:
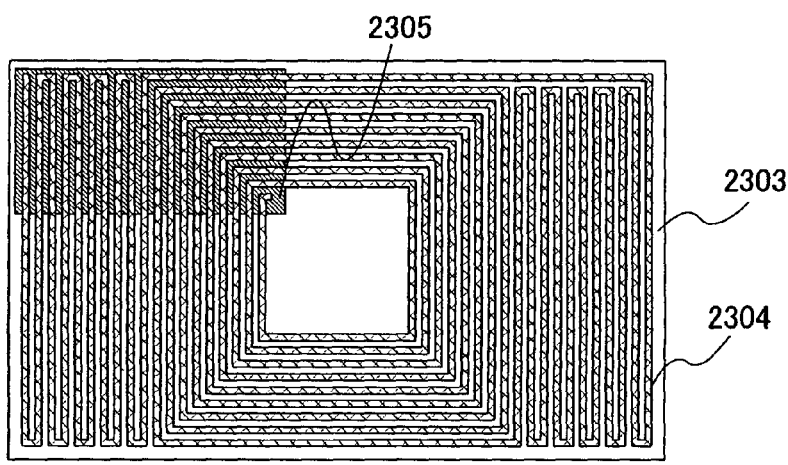

FIG. 23B shows an example where a thin antenna is arranged so as to go around a surrounding region of a signal processing circuit. An antenna 2304 and a signal processing circuit 2305 are included in a base substrate 2303. A wiring of the antenna is just an example so that the invention is not limited to this.

Figure 23C:
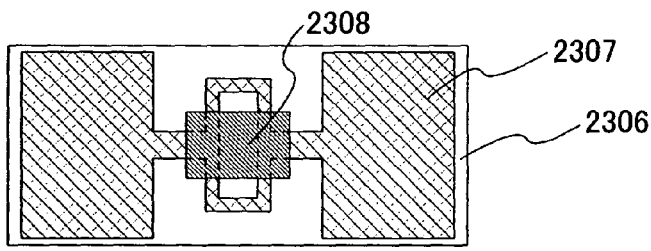

FIG. 23C shows a high frequency antenna. An antenna 2307 and a signal processing circuit 2308 are included in a base substrate 2306.

Figure 23D:
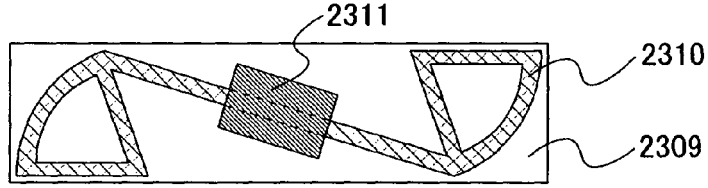

FIG. 23D shows an omnidirectional antenna (which can receive signals from any direction). An antenna 2310 and a signal processing circuit 2311 are included in a base substrate 2309.

Figure 23E:
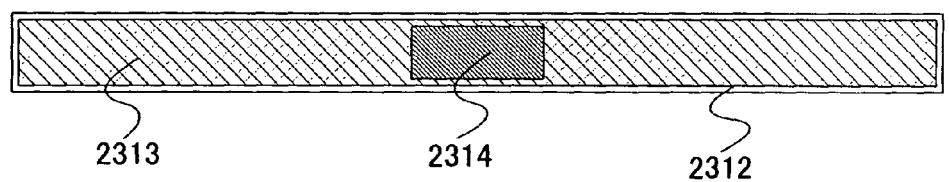

FIG. 23E shows an antenna which is extended to be a stick form. An antenna 2313 and a signal processing circuit 2314 are included in a base substrate 2312.

The antenna may be formed over the same substrate as the signal processing circuit, or may be formed over a substrate which is different from the substrate over which the signal processing circuit is formed. Note that the substrate over which the signal processing circuit is formed and the antenna can be connected by a known method. For example, the substrate over which the signal processing circuit is formed and the antenna may be connected by using wire bonding connection or bump connection, or a method where the entire surface of the substrate over which the signal processing circuit is formed in a chip form is used as an electrode and the electrode is attached to the antenna may be employed. In this method, the substrate over which the signal processing circuit is formed and the antenna can be connected by using an ACF (Anisotropic Conductive Film).

Appropriate length which is necessary for an antenna varies depending on frequency used for reception. In general, a length of one-integer of a wavelength may be employed. For example, in the case where frequency is 2.45 GHz, the antenna may be formed with a length of about 60 mm (one-half of a wavelength) or about 30 mm (one-quarter of the wavelength).

As the battery 1104, a secondary battery such as a lithium ion battery, a lithium secondary battery, a nickel metal hydride battery, a nickel cadmium battery, an organic radical battery, a lead storage battery, an air secondary battery, a nickel zinc battery, or a silver zinc battery can be used; however, the invention is not limited to this. Alternatively, a capacitor having high capacity or the like may be used. In particular, since a lithium ion battery or a lithium secondary battery has high charging and discharging capacity, a battery provided in the semiconductor device in accordance with Embodiment Mode 1 of the invention can be made smaller by applying it thereto. Note that by forming an active material or an electrolyte of the lithium ion battery by sputtering, the battery 1104 may be formed over the same substrate as the signal processing circuit 1102, or may be formed over the same substrate as the antenna 1103. By forming the battery 1104 over the same substrate as the signal processing circuit 1102 or the antenna 1103, a yield is improved. In a metal lithium battery, transition metal oxide containing a lithium ion, metal oxide, metal sulfide, an iron-based compound, a conducting polymer, an organic sulfur-based compound, or the like is employed as a positive electrode active material; lithium (an alloy) is employed as a negative electrode active material; and organic-based dielectric fluid, an polymer electrolyte, or the like is employed as an electrolyte. Therefore, by using the metal lithium battery, the battery 1104 having higher charging and discharging capacity can be provided.

Note that the structure of the semiconductor device in accordance with Embodiment Mode 1 of the invention is not limited to the structure shown in FIG. 6. That is, in FIG. 6, a structure where the signal processing circuit 1102 is formed between the antenna 1103 and the battery 1104, which is seen from a cross section, is shown; however, the battery 1104 may be formed between the antenna 1103 and the signal processing circuit 1102, or the antenna 1103 may be formed between the battery 1104 and the signal processing circuit 1102. In addition, an area ratio of the antenna 1103, the battery 1104, and the signal processing circuit 1102 is not limited to the ratio shown in FIG. 6. That is, in the semiconductor device in accordance with Embodiment Mode 1 of the invention, a positional relationship among the antenna 1103, the battery 1104, and the signal processing circuit 1102 is not limited when each layer is seen in the cross-sectional view. In addition, the antenna 1103 and the signal processing circuit 1102 may be formed over different substrates, or the antenna 1103, the signal processing circuit 1102, and the battery 1104 may be formed over the same substrate.

Figure 8A:
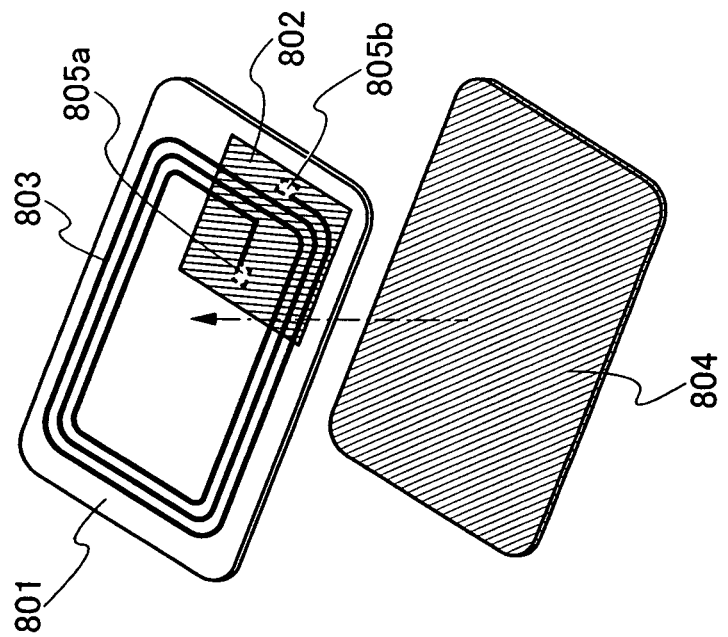
FIGS. 8A and 8B are diagrams each showing a structure of a semiconductor device of the invention.
Figure 8B:
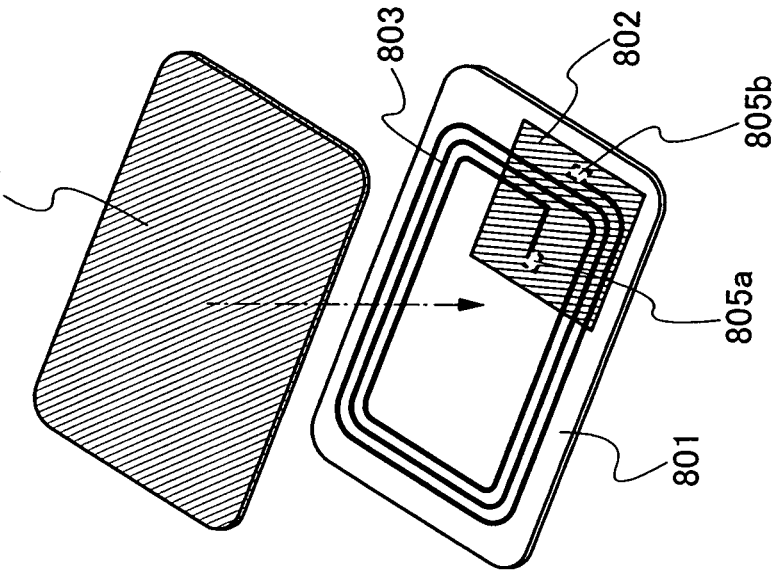

As shown in FIG. 8A, a signal processing circuit 802 and an antenna 803 may be formed over a substrate 801, and a battery 804 may be attached to a surface side of the substrate 801 over which the signal processing circuit 802 and the antenna 803 are formed. Alternatively, as shown in FIG. 8B, the battery 804 may be attached to a surface side of the substrate 801 which is opposite to the surface side of the substrate 801 over which the signal processing circuit 802 and the antenna 803 are formed. Note that each of connecting terminals 805a and 805b of the antenna 803 is connected to the signal processing circuit 802.

Figure 9A:
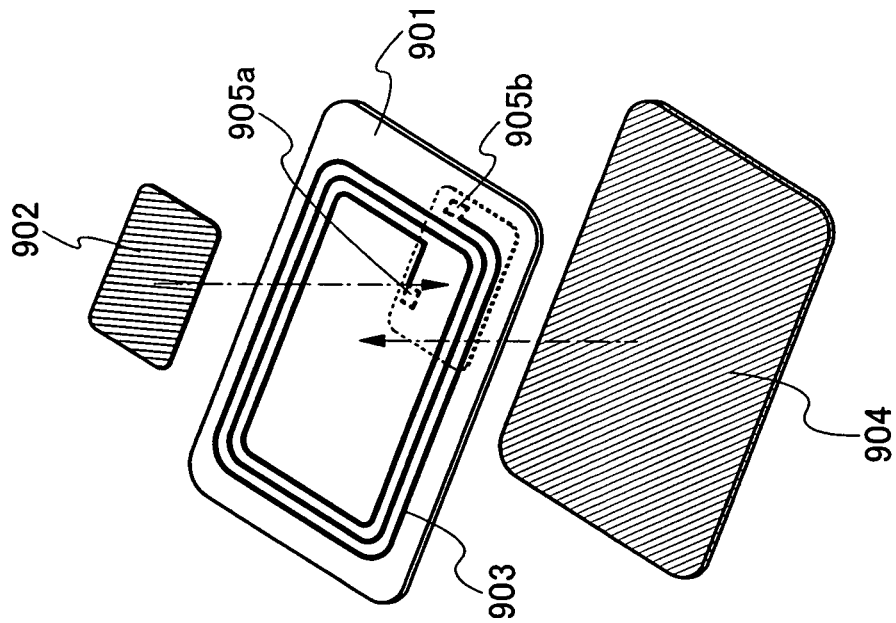
FIGS. 9A and 9B are diagrams each showing a structure of a semiconductor device of the invention.
Figure 9B:
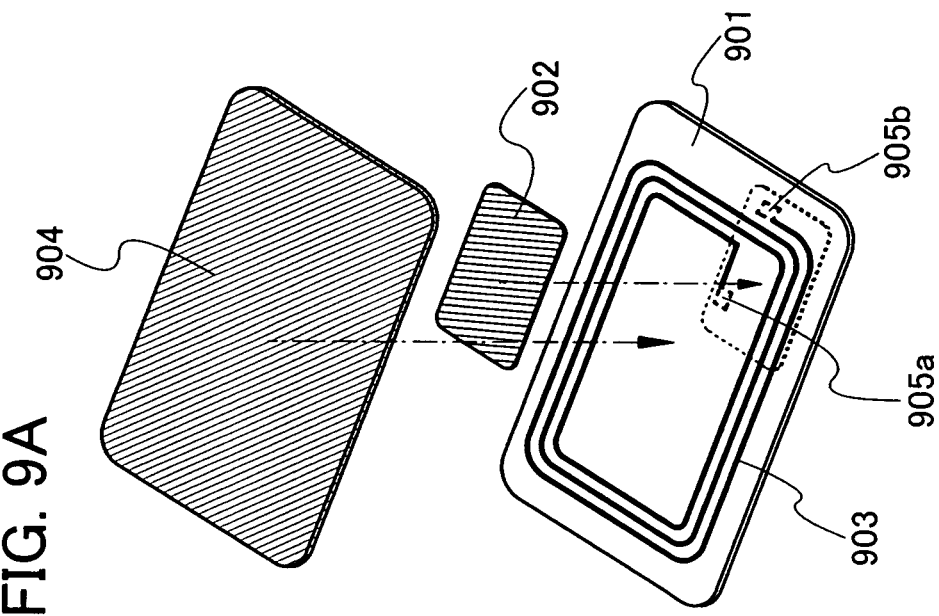

In addition, as shown in FIG. 9A, a substrate 902 over which a signal processing circuit is formed may be attached to a surface side of a substrate 901 over which an antenna 903 is formed, and further, a battery 904 may be attached thereto. Note that at this time, when the area of the battery 904 is smaller than the area of the substrate 901, the battery 904 may be formed so as not to overlap with the substrate 902 over which the signal processing circuit is formed. If the battery 904 overlaps with the substrate 902 over which the signal processing circuit is formed, it is preferable to attach the battery 904 onto the substrate 902 over which the signal processing circuit is formed because the signal processing circuit and connecting terminals 905a and 905b are easily connected and the substrate 902 over which the signal processing circuit is formed and the battery 904 are easily connected. Further, as shown in FIG. 9B, a substrate 902 over which a signal processing circuit is formed may be attached to the surface side of the substrate 901 over which the antenna 903 is formed, and further, the battery 904 may be attached to an opposite surface side.

By employing the semiconductor device in accordance with Embodiment Mode 1 of the invention, replacing of the battery is not needed because the battery which stores power is used. In addition, since power can be supplied from the battery to the signal processing circuit even when a signal received is weakened, communication can be performed by operating the semiconductor device. That is, since communication can be performed with a weak signal, communication distance can be increased and stable communication can be performed.

Further, since power can be automatically stored in the battery when a signal received is strong, charging can be performed even if a user does not intentionally perform an operation of charging. Needless to say, when power stored in the battery is decreased, the user can intentionally perform the operation of charging easily.

Embodiment Mode 2

In a semiconductor device in accordance with Embodiment Mode 2 of the invention, a structure in which the semiconductor device in accordance with Embodiment Mode 1 of the invention is provided with a so-called booster antenna is shown.

First, a schematic structure of the semiconductor device in accordance with Embodiment Mode 2 of the invention is briefly described.

The semiconductor device includes an antenna circuit, a signal processing circuit which processes a signal received by the antenna circuit, and a battery which stores power supplied.

Note that the antenna circuit includes a first antenna portion and a second antenna portion. The first antenna portion includes a first antenna coil and the second antenna portion includes a second antenna coil having a longer outside diameter than that of the first antenna coil. The transmission and reception frequency of the first antenna portion tunes to the transmission and reception frequency of the second antenna portion. An antenna coil means an antenna having a loop antenna shape, which is a circularly arranged conductive wiring. The antenna coil includes a conductive wiring which is wound multiple times.

In addition, the antenna circuit may include a capacitor. A resonance circuit may be formed by using the antenna and the capacitor. That is, a capacitor may be connected to each of the first antenna portion and the second antenna portion, so that each of the first antenna portion and the second antenna portion may form a resonance circuit with the capacitor. In that case, the resonance frequency of a first resonance circuit which is formed by using the first antenna coil and a first capacitor tunes to the resonance frequency of a second resonance circuit which is formed by using the second antenna coil and a second capacitor.

The first antenna coil is connected to the signal processing circuit and the second antenna coil is arranged such that a medial axis of the first antenna coil is positioned in a loop of a conductive wiring of the second antenna coil. It is preferable that the first antenna coil and the second antenna coil be arranged such that their medial axes correspond to each other.

Since the resonance frequency of the first antenna portion tunes to the resonance frequency of the second antenna portion, when a signal is received by the second antenna portion and a magnetic field is generated, dielectric electromotive force is generated in the first antenna portion by mutual induction. In this manner, a signal is received mainly by the first antenna portion when communication distance is shorter and the signal is received mainly by the second antenna portion when the communication distance becomes longer, so that the dielectric electromotive force can be efficiently obtained.

The signal processing circuit includes a power supply circuit which generates a predetermined voltage of the semiconductor device from power supplied, and a rectifying circuit which rectifies the dielectric electromotive force generated by the signal received by the first antenna portion to supply direct current power to the power supply circuit. In addition, when a voltage output from the rectifying circuit is sufficiently higher than a voltage output from the battery, the signal processing circuit stores surplus power in the power output from the rectifying circuit in the battery. When the voltage output from the rectifying circuit is lower than the voltage output from the battery, the signal processing circuit includes a control unit which supplies power from the battery to the power supply circuit.

As the battery, a battery such as a lithium ion battery, a nickel metal hydride battery, a nickel cadmium battery, or an organic radical battery can be used; however, the invention is not limited to this. Alternatively, a capacitor having high capacity or the like may be used.

The control unit can be realized by connecting the battery to the rectifying circuit through a control circuit. By connecting the battery, the surplus power is stored in the battery and power is supplied from the battery to the power supply circuit when the power output from the rectifying circuit is decreased.

An operation of the control circuit is described as follows.

The control circuit compares the voltage output from the battery and the voltage output from the rectifying circuit. When the voltage output from the rectifying circuit is sufficiently higher than the voltage output from the battery, the control circuit supplies the power out put from the rectifying circuit to both of the battery and the power supply circuit. That is the surplus power is stored in the battery.

When the voltage output from the rectifying circuit becomes lower than the voltage output from the battery, the control circuit supplies a current from the battery to the power supply circuit. The control circuit controls a direction of the current in accordance with the voltage output from the rectifying circuit and the voltage output from the battery.

The semiconductor device in accordance with Embodiment Mode 2 of the invention can increase the communication distance. In addition, since electromotive force is increased and the power output from the rectifying circuit is increased, the surplus power which is stored in the battery can be obtained easily.

Next, FIGS. 7A and 7B each show a schematic diagram of the semiconductor device in accordance with Embodiment Mode 2 of the invention.

The semiconductor device includes a chip 1212, a booster antenna 1213, a battery 1204, and capacitance 1215 in a base substrate 1211. The booster antenna 1213 has capacitance connecting terminals 1214a and 1214b. In the booster antenna 1213, each of the connecting terminals 1214a and 1214b is connected to the capacitance 1215.

Note that a substrate over which the booster antenna 1213 and the battery 1204 are formed is not shown in FIG. 7A.

The base substrate 1211 includes at least two sheets and these two sheets are attached together. A material such as paper or plastic can be used as the sheet.

As shown in FIG. 7B, the chip 1212 includes a signal processing circuit 1202 and a chip antenna 1203 which are formed over a substrate 1201, and each of connecting terminals 1205a and 1205b of the chip antenna 1203 is connected to the signal processing circuit 1202.

Various types of transistors can be applied to a transistor included in the signal processing circuit 1202 without limiting to a certain type. Accordingly, a thin film transistor (TFF) using a non-single crystalline semiconductor film typified by amorphous silicon or polycrystalline silicon, a transistor formed by using a semiconductor substrate or an SOI substrate, a MOS transistor, a junction transistor, a bipolar transistor, a transistor using a compound semiconductor such as ZnO or a-InGaZnO, a transistor using an organic semiconductor or a carbon nanotube, or other transistors can be applied. Note that a non-single crystalline semiconductor film may include hydrogen or halogen. In addition, various types of substrates can be employed as a substrate over which the signal processing circuit 1202 is formed without limiting to a certain type. Accordingly, for example, the signal processing circuit 1202 can be formed over a single crystalline substrate, an SOI substrate, a glass substrate, a quartz substrate, a plastic substrate, a paper substrate, a cellophane substrate, a stone substrate, or the like. In addition, the signal processing circuit 1202 may be formed over one substrate, and then, the signal processing circuit 1202 may be transferred to another substrate.

As the shapes of the booster antenna 1213 and the chip antenna 1203, various types can be employed as long as the transmission and reception frequency tunes to without limiting to the shapes shown in the drawing. It is preferable that the shape of the antenna of the booster antenna 1213 be a loop antenna and the shape of the antenna of the chip antenna 1203 be a minute loop antenna. The chip antenna 1203 is formed over the same substrate 1201 as the signal processing circuit 1202. Accordingly, the chip antenna 1203 may be formed by depositing a conductive film by sputtering, CVD, spin coating, or the like and then patterning the conductive film; or the antenna 1203 may be formed by the droplet discharge typified by the ink-jet method, the screen printing method, or the like. Various types of substrates can be employed as a substrate over which the booster antenna 1213 is formed without limiting to a certain type. Accordingly, for example, the booster antenna 1213 can be formed over a single crystalline substrate, an SOI substrate, a glass substrate, a quartz substrate, a plastic substrate, a paper substrate, a cellophane substrate, a stone substrate, or the like. Therefore, the booster antenna 1213 may be formed by depositing a conductive film by sputtering, CVD, spin coating, or the like and then patterning the conductive film; or the booster antenna 1213 may be formed by the droplet discharge method typified by the ink-jet method, the screen printing method, or the like. It is preferable that the booster antenna 1213 be formed by the screen printing method.

As the battery 1204, a secondary battery such as a lithium ion battery, a lithium secondary battery, a nickel metal hydride battery, a nickel cadmium battery, an organic radical battery, a lead storage battery, an air secondary battery, a nickel zinc battery, or a silver zinc battery can be used; however, the invention is not limited to this. Alternatively, a capacitor having high capacity or the like may be used. In particular, since a lithium ion battery or a lithium secondary battery has high charging and discharging capacity, a battery provided in the semiconductor device in accordance with Embodiment Mode 2 of the invention can be made smaller by applying it thereto. Note that by forming an active material or an electrolyte of the lithium ion battery by sputtering, the battery 1204 may be formed over the substrate over which the booster antenna 1213 is formed. By forming the battery 1104 over the substrate over which the booster antenna 1213 is formed, a yield is improved. In a metal lithium battery, transition metal oxide containing a lithium ion, metal oxide, metal sulfide, an iron-based compound, a conducting polymer, an organic sulfur-based compound, or the like is employed as a positive electrode active material; lithium (an alloy) is employed as a negative electrode active material; and organic-based dielectric fluid, an polymer electrolyte, or the like is employed as an electrolyte. Therefore, by using the metal lithium battery, the battery 1204 having higher charging and discharging capacity can be provided.

Note that the structure of the semiconductor device in accordance with Embodiment Mode 2 of the invention is not limited to the structure shown in FIG. 7A. That is, in FIG. 7A, a structure where the booster antenna 1213 and the chip 1212 are arranged at least on one side of the battery 1204, which is seen from a cross section view; however, the battery 1204 may be formed between the booster antenna 1213 and the chip 1212, the chip 1212 may be formed between the booster antenna 1213 and the battery 1204, or the booster antenna 1213 may be formed between the battery 1204 and the chip 1212. In addition, an area ratio of the booster antenna 1213, the battery 1204, and the chip 1212 is not limited to the ratio shown in FIG. 7A. That is, in the semiconductor device in accordance with Embodiment Mode 2 of the invention, a positional relationship among the booster antenna 1213, the battery 1204, and the chip 1212 is not limited when each layer is seen in the cross-sectional view. In addition, the booster antenna 1213 and the battery 1204 may be attached together, or the booster antenna 1213 and the battery 1204 may be formed over the same substrate.

Figure 10A:
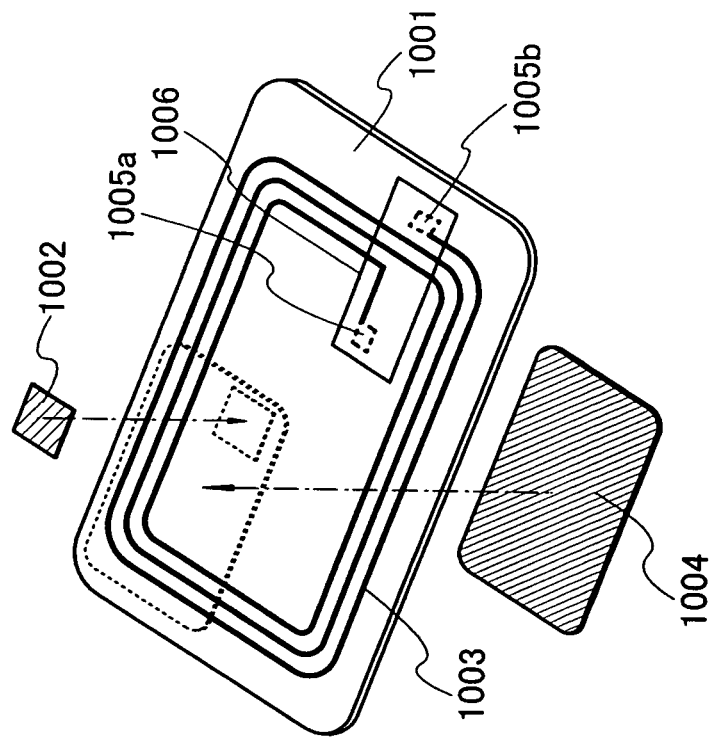
FIGS. 10A and 10B are diagrams each showing a structure of a semiconductor device of the invention.
Figure 10B:
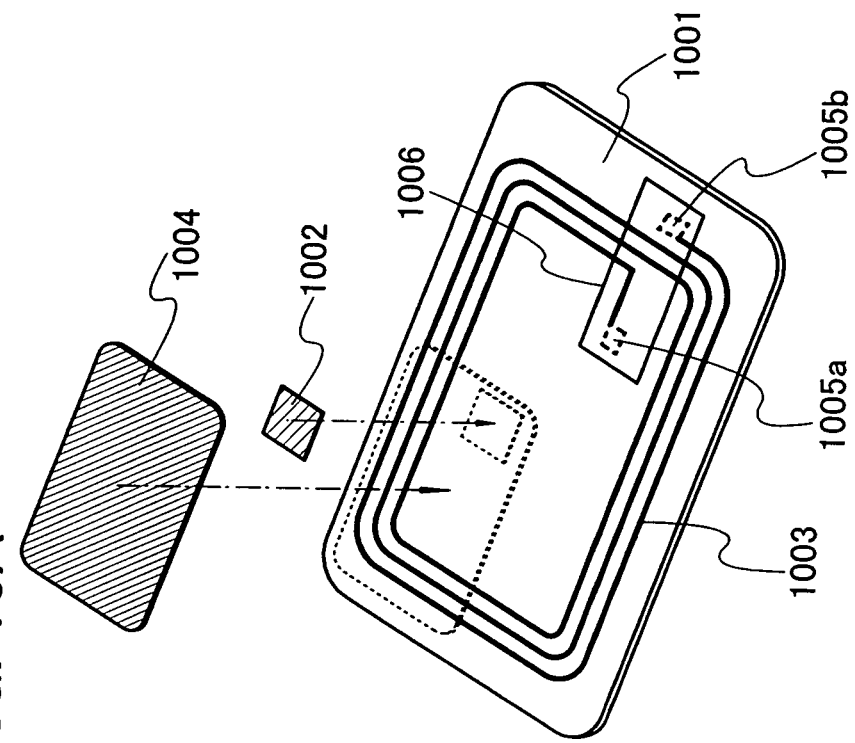

In addition, as shown in FIG. 10A, a booster antenna 1003 is formed over a substrate 1001, and each of capacitance connecting terminals 1005a and 1005b of the booster antenna 1003 is connected to capacitance 1006. A chip 1002 is attached to a surface side of the substrate 1001 over which the booster antenna 1003 is formed, and further, a battery 1004 may be attached thereto. Note that at this time, when the area of the battery 1004 is much smaller than the area of the substrate 1001, the battery 1004 and the chip 1002 may be formed so as not to overlap with each other; however, since a signal processing circuit in the chip 1002 and the battery 1004 can be easily connected, it is preferable that the battery 1004 be attached over the chip 1002. Further, as shown in FIG. 10B, the chip 1002 may be attached to the surface side of the substrate 1001 over which the booster antenna 1003 is formed, and further, the battery 1004 may be attached to an opposite surface side.

By employing the semiconductor device in accordance with Embodiment Mode 2 of the invention, replacing of the battery is not needed because the battery which stores power is used. In addition, since power can be supplied from the battery to the signal processing circuit even when a signal received is weakened, communication can be performed by operating the semiconductor device. That is, since communication can be performed even with a weak signal, communication distance can be increased and stable communication can be performed.

Further, since power can be automatically stored in the battery when the signal received is strong, charging can be performed even if a user does not intentionally perform an operation of charging. Needless to say, when the power stored in the battery is decreased, the user can intentionally perform the operation of charging easily.

Furthermore, since the semiconductor device in accordance with Embodiment Mode 2 of the invention is provided with the booster antenna, communication distance can be increased and charging of the battery can be efficiently performed.

Since the booster antenna and the chip antenna performs communication by an electromagnetic coupling method in the semiconductor device in accordance with Embodiment Mode 2 of the invention, there is no poor connection which would be caused by attachment of the chip to an external connecting antenna in a semiconductor device which performs transmission and reception by the external connecting antenna. Accordingly, by employing the structure of the semiconductor device in accordance with Embodiment Mode 2 of the invention, productivity of the semiconductor device is improved.

Embodiment Mode 3

In this embodiment mode, an example of a manufacturing method of the semiconductor device shown in the aforementioned embodiment modes is described with reference to the drawings.

First, a release layer 603 is formed over one surface of a substrate 601 with an insulating film 602 interposed therebetween. Sequentially, an insulating film 604 functioning as a base film and a semiconductor film 605 (e.g., a film including amorphous silicon) are stacked (see FIG. 11A). Note that the insulating film 602, the release layer 603, the insulating film 604, and the amorphous semiconductor film 605 can be sequentially formed.

The substrate 601 is selected from a glass substrate, a quartz substrate, a metal substrate (e.g., a ceramic substrate or a stainless steel substrate), a semiconductor substrate such as a silicon substrate, or the like. In addition, a substrate made of polyethylene terephthalate (PET), polyethylene naphthalate (PEN), polyether sulfone (PES), acryl, or the like can be selected as a plastic substrate. Note that the release layer 603 is provided over the entire surface of the substrate 601 with the insulating film 602 interposed therebetween; however, if needed, the release layer 603 may be selectively provided by photolithography after the release layer 603 is formed over the entire surface of the substrate 601.

The insulating film 602 and the insulating film 604 are formed by using an insulating material such as silicon oxide, silicon nitride, silicon oxynitride ($SiO_xN_y$) (x>y>0), or silicon nitride oxide ($SiN_xO_y$) (x>y>0) by CVD, sputtering, or the like. For example, in the case where each of the insulating films 602 and 604 is formed to have a two-layer structure, a silicon nitride oxide film may be formed as a first layer, and a silicon oxynitride film may be formed as a second layer. Alternatively, a silicon nitride film may be formed as the first layer and a silicon oxide film may be formed as the second layer. The insulating film 602 functions as a blocking layer which prevents an impurity element from being mixed into the release layer 603 or an element formed thereover from the substrate 601. The insulating film 604 functions as a blocking layer which prevents an impurity element from being mixed into an element formed over the release layer 603 from the substrate 601 and the release layer 603. By forming the insulating films 602 and 604 which function as the blocking layers, the case can be prevented in which alkaline metal such as Na or alkaline earth metal from the substrate 601 and an impurity element included in the release layer 603 adversely affect the element formed over the release layer 603. Note that in the case where quartz is used as the substrate 601, the insulating films 602 and 604 may be omitted.

A metal film, a stacked-structure of a metal film and a metal oxide film, or the like can be employed as the release layer 603. The metal film is formed of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or an alloy material or a compound material which includes any of these elements as a main component, and has a single-layer structure or a stacked-layer structure. In addition, these materials can be formed by using sputtering, various kinds of CVD such as plasma CVD, or the like. In order to obtain the stacked-structure of the metal film and the metal oxide film, plasma treatment under oxygen atmosphere or $N_2O$ atmosphere is performed or thermal treatment under oxygen atmosphere or $N_2O$ atmosphere is performed after the aforementioned metal film is formed, and thus oxide or oxynitride of the metal film can be provided on a surface of the metal film. For example, in the case of providing a tungsten film by sputtering, CVD, or the like as the metal film, plasma treatment is performed to the tungsten film so that a metal oxide film which is formed of tungsten oxide can be provided on a surface of the tungsten film. In this case, tungsten oxide is denoted by $WO_x$, where x is 2 to 3. There are cases where x is 2 ($WO_2$), x is 2.5 ($W_2O_5$), x is 2.75 ($W_4O_{11}$), x is 3 ($WO_3$), and the like. In forming tungsten oxide, a value of x is not limited to the aforementioned examples, and thus, which kind of oxide is to be formed may be determined based on the etching rate or the like. In addition, for example, after forming a metal film (e.g., tungsten), metal oxide may be formed over the metal film (e.g., tungsten oxide may be formed over tungsten) at the same time as an insulating film of silicon oxide ($SiO_2$) or the like is formed over the metal film by sputtering. Further, high-density plasma treatment may be performed as plasma treatment. Metal nitride or metal oxynitride may be used in addition to the metal oxide film. In this case, plasma treatment or thermal treatment may be performed to the metal film under nitrogen atmosphere or nitrogen and oxygen atmosphere.

The amorphous semiconductor film 605 is formed to have a thickness of 25 to 200 nm (preferably, 30 to 150 nm) by sputtering, LPCVD, plasma CVD, or the like.

Next, the amorphous semiconductor film 605 is irradiated with a laser beam to be crystallized. Note that the amorphous semiconductor film 605 may be crystallized by a method in which laser beam irradiation is combined with thermal crystallization using a RTA or an annealing furnace or thermal crystallization using a metal element which promotes crystallization. After that, a crystalline semiconductor film obtained is etched into a desired shape to form crystalline semiconductor films 605a to 605f, and a gate insulating film 606 is formed so as to cover the crystalline semiconductor films 605a to 605f (see FIG. 11B).

The gate insulating film 606 is formed by using an insulating material such as silicon oxide, silicon nitride, silicon oxynitride ($SiO_xN_y$) (x>y>0), or silicon nitride oxide ($SiN_xO_y$) (x>y>0) by CVD, sputtering, or the like. For example, in the case where the gate insulating film 606 is formed to have a two-layer structure, a silicon nitride oxide film may be formed as a first layer, and a silicon oxynitride film may be formed as a second layer. Alternatively, a silicon nitride film may be formed as the first layer and a silicon oxide film may be formed as the second layer.

An example of manufacturing steps of the crystalline semiconductor films 605a to 605f is briefly described below. First, an amorphous semiconductor film having a film thickness of 50 to 60 nm is formed by plasma CVD. Next, a crystalline semiconductor film is formed by performing dehydrogenation treatment (500° C., 1 hour) and thermal crystallization treatment (550° C., 4 hours) to the amorphous semiconductor film after a solution including nickel which is a metal element for promoting crystallization is held over the amorphous semiconductor film. After that, the crystalline semiconductor films 605a to 605f are formed by being irradiated with a laser beam and using photolithography. Note that the amorphous semiconductor film may also be crystallized only by irradiation with a laser beam without performing thermal crystallization using a metal element which promotes crystallization.

As a laser oscillator which is used for crystallization, a continuous wave laser beam (a CW laser beam) or a pulsed laser beam can be used. As a laser beam which can be used here, laser beams which are emitted from one or a plurality of laser beams from a gas laser such as an Ar laser, a Kr laser, or an excimer laser, a laser using a medium in which one or a plurality of elements of Nd, Yb, Cr, Ti, Ho, Er, Tm, and Ta is added as a dopnat into single crystals of YAG, $YVO_4$, forsterite ($Mg_2SiO_4$), $YAlO_3$, or $GdVO_4$, or polycrystals (ceramic) of YAG, $Y_2O_3$, $YVO_4$, $YAlO_3$, or $GdVO_4$, a glass laser, a ruby laser, an alexandrite laser, a Ti:sapphire laser, a copper vapor laser, or a gold vapor laser can be given. By laser beam irradiation with a fundamental wave of such laser beam and a second harmonic wave to a fourth harmonic wave of the fundamental wave of such laser beam, a crystal having a large particle size can be obtained. For example, a second harmonic wave (532 nm) or a third harmonic wave (355 nm) of an Nd:YVO$_4$ laser (having a fundamental wave of 1064 nm) can be used. At this time, power density of the laser is required to be about 0.01 to 100 MW/cm$^2$ (preferably, 0.1 to 10 MW/cm$^2$). Irradiation is performed by setting the scan speed at about 10 to 2000 cm/sec. Note that the using a medium in which one or a plurality of elements of Nd, Yb, Cr, Ti, Ho, Er, Tm, and Ta is added as a dopnat into single crystals of YAG, YVO$_4$, forsterite (Mg$_2$SiO$_4$), YAlO$_3$, or GdVO$_4$, or polycrystals (ceramic) of YAG, Y$_2$O$_3$, YVO$_4$, YAlO$_3$, or GdVO$_4$, an Ar ion laser, or the Ti:sapphire laser can be continuously oscillated, and can also be pulsed oscillated with a repetition rate of 10 MHz or more by performing a Q-switch operation, mode locking, or the like. When the laser beam is emitted with the repetition rate of 10 MHz or more, a semiconductor film is irradiated with the next pulse during the period in which the semiconductor film is melted by the laser beam and solidified. Accordingly, a solid-fluid interface can be continuously moved in the semiconductor film so that crystal grains which have grown continuously in the scan direction can be obtained, unlike the case of using a pulsed laser with a low repetition rate.

In addition, the gate insulating film 606 may be formed by performing the aforementioned high-density plasma treatment to the semiconductor films 605a to 605f and oxidizing or nitriding surfaces thereof. For example, the gate insulating film 606 is formed by plasma treatment with a mixed gas of noble gas such as He, Ar, Kr, or Xe, and oxygen, nitrogen oxide (NO$_2$), ammonia, nitrogen, or hydrogen. By performing excitation of plasma in this case with introduction of a microwave, plasma with a low electron temperature and high density can be generated. By oxygen radical (there is the case in which OH radical is included) or nitrogen radical (there is the case in which NH radical is included), the surface of the semiconductor films 605a to 605f can be oxidized or nitrided.

By such treatment using high-density plasma, an insulating film of 1 to 20 nm, typically, 5 to 10 nm is formed over the semiconductor film. Since reaction in this case is solid-phase reaction, interface state density between the insulating film and the semiconductor films can be extremely lowered. Since such plasma treatment directly oxidizes (or nitrides) the semiconductor films (crystalline silicon or polycrystalline silicon), variation in the thickness of the insulating film which is formed can be extremely reduced, ideally. In addition, since oxidization is not strongly performed in the crystal grain boundary of crystalline silicon, an extremely preferable state is obtained. That is, by solid-phase oxidizing the surface of the semiconductor film by plasma treatment shown here, an insulating film with excellent uniformity and low interface state density can be formed without unusual oxidizing reaction in the crystal grain boundary.

Only an insulating film formed by high-density plasma treatment may be used for the gate insulating film, or an insulating film such as silicon oxide, silicon oxynitride, or silicon nitride may be deposited to be stacked thereover by CVD utilizing plasma or thermal reaction. In any case, in a transistor which is formed to include an insulating film formed by high-density plasma treatment in a part or all of a gate insulating film, characteristic variation can be reduced.

In addition, in the semiconductor films 605a to 605f which are obtained by scanning in one direction to be crystallized while the semiconductor films are irradiated with a continuous wave laser or laser beam which is emitted with a repetition rate of 10 MHz or more, characteristics such that crystals grow in a scan direction of the beam exist. A transistor is arranged by adjusting the scan direction to a channel length direction (a direction in which a carrier flows when a channel forming region is formed) and the gate insulating layer is combined with it, and thus, a thin film transistor (a TFT) with little characteristic variation and high field effect mobility can be obtained.

Next, a first conductive film and a second conductive film are stacked over the gate insulating film 606. Here, the first conductive film is formed to have a thickness of 20 to 100 nm by CVD, sputtering, or the like. The second conductive film is formed to have a thickness of 100 to 400 nm. The first conductive film and the second conductive film are formed of an element selected from tantalum (Ta), tungsten (W), titanium (Ti), molybdenum (Mo), aluminum (Al), copper (Cu), chrome (Cr), niobium (Nb), and the like, or an alloy material or a compound material which includes any of these elements as a main component. Alternatively, the first conductive film and the second conductive film are formed of a semiconductor material typified by polycrystalline silicon doped with an impurity element such as phosphorus. As an example of a combination of the first conductive film and the second conductive film, a tantalum nitride film and a tungsten film, a tungsten nitride film and a tungsten film, a molybdenum nitride film and a molybdenum film, or the like can be given. Since tungsten and tantalum nitride have high thermal resistance, thermal treatment aimed at thermal activation can be performed after the first conductive film and the second conductive film are formed. In addition, in the case of a three-layer structure, a stacked-layer structure of a molybdenum film, an aluminum film, and a molybdenum film may be employed.

Next, a resist mask is formed by photolithography and a gate electrode 607 is formed above each of the semiconductor films 605a to 605f by performing etching for forming the gate electrode and a gate line. Here, an example in which a stacked-layer structure of a first conductive film 607a and a second conductive film 607b is provided as the gate electrode 607 is shown.

Next, the semiconductor films 605a to 605f are doped with an impurity element which imparts n-type conductivity with low concentration by using the gate electrode as a mask by ion doping or ion implantation, and then, the resist mask is selectively formed by photolithography and the semiconductor films 605a to 605f are doped with an impurity element which imparts p-type conductivity with high concentration. As an impurity element which imparts n-type conductivity, phosphorus (P), arsenic (As), or the like can be used. As an impurity element which imparts p-type conductivity, boron (B), aluminum (Al), gallium (Ga), or the like can be used. Here, phosphorus (P) is used as the impurity element which imparts n-type conductivity, and phosphorus (P) is selectively introduced into the semiconductor films 605a to 605f so as to be included therein with a concentration of $1\times10^{15}$ to $1\times10^{19}$/cm$^3$ to form an impurity region 608 having n-type conductivity. Further, boron (B) is used as the impurity element which imparts p-type conductivity, and boron (B) is selectively introduced into the semiconductor films 605c and 605e so as to be included therein with a concentration of $1\times10^{19}$ to $1\times10^{20}$/cm$^3$ to form an impurity region 609 which imparts p-type conductivity (see FIG. 11C).

Sequentially, a gate insulating film is formed so as to cover the semiconductor film 606 and the gate electrode 607. The insulating film is formed with a single-layer structure or a stacked-layer structure of a film including an inorganic material such as silicon, silicon oxide, or silicon nitride, or a film including an organic material such as an organic resin by plasma CVD, sputtering, or the like. Next, the insulating film is selectively etched by anisotropic etching which is based on a perpendicular direction to form an insulating film 610 (also described as a sidewall) which is in contact with a side of the gate electrode 607. The insulating film 610 is used as a doping mask when a LDD (Lightly Doped Drain) region is formed.

Sequentially, the semiconductor films 605a, 605b, 605d, and 605f are doped with an impurity element which imparts n-type conductivity with high concentration by using the resist mask, which is formed by photolithography as well as gate electrode 607 and the insulating film 610 as masks, and an impurity region 611 having n-type conductivity is formed. Here, phosphorus (P) is used as the impurity element which imparts n-type conductivity, and phosphorus (P) is selectively introduced into the semiconductor films 605a, 605b, 605d, and 605f so as to be included therein with a concentration of $1 \times 10^{19}$ to $1 \times 10^{20}/cm^3$ to form the impurity region 611, the concentration of n-type impurity element of which is higher than that of the impurity region 608.

By the aforementioned steps, n-channel thin film transistors 600a, 600b, 600d, and 600f and p-channel thin film transistors 600c and 600e are formed (see FIG. 11D).

In the n-channel thin film transistor 600a, a channel forming region is formed in a region of the semiconductor film 605a which overlaps with the gate electrode 607; the impurity region 611 forming a source region or a drain region is formed in a region of the semiconductor film 605a which does not overlap with the gate electrode 607 and the insulating film 610; and a low concentration impurity region (LDD region) is formed in a region of the semiconductor film 605a which overlaps with the insulating film 607 and between the channel forming region and the impurity region 611. Similarly, in each of the n-channel thin film transistors 600b, 600d, and 600f, a channel forming region, a low concentration impurity region, and the impurity region 611 are formed.

In the p-channel thin film transistor 600c, a channel forming region is formed in a region of the semiconductor film 605c which overlaps with the gate electrode 607 and the impurity region 609 forming a source region or a drain region is formed in a region of the semiconductor film 605a which does not overlap with the gate electrode 607. Similarly, in the p-channel thin film transistor 600e, a channel forming region and an impurity region 609 are formed. Note that although an LDD region is not provided in each of the p-channel thin film transistors 600c and 600e here, an LDD region may be provided in each of the p-channel thin film transistors 600c and 600e or a structure in which an LDD region is not provided in each of the n-channel thin film transistors 600a, 600b, 600d, and 600f may also be employed.

An insulating film is formed to have a single-layer structure or a stacked-layer structure so as to cover the semiconductor films 605a to 605f and the gate electrode 607, and conductive films 613 which are electrically connected to the impurity regions 609 and 611 forming the source regions or the drain regions of the thin film transistors 600a to 600f are formed over the insulating film (see FIG. 12A). The insulating film is formed to have the single-layer structure or the stacked-layer structure using an inorganic material such as silicon oxide or silicon nitride, an organic material such as polyimide, polyamide, benzocyclobutene, acryl, or epoxy, a siloxane material, or the like by CVD, sputtering, SOG, a droplet discharge method, a screen printing method, or the like. The insulating film is formed to have a two-layer structure, and a silicon nitride oxide film is formed as a first-layer insulating film 612a and a silicon oxynitride film is formed as a second-layer insulating film 612b. In addition, the conductive films 613 can form the source regions or the drain regions of the thin film transistors 600a to 600f.

Note that thermal treatment aimed at recovery of crystallinity of the semiconductor films, activation of the impurity element which has been added into the semiconductor films, or hydrogenation of the semiconductor films may be performed before the insulating films 612a and 612b are formed or after one or a plurality of thin films of the insulating films 612a and 612b are formed. Thermal anneal, laser anneal, RTA, or the like may be applied to thermal treatment.

The conductive film 613 is formed of an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), and neodymium (Nd), or an alloy material or a compound material which includes any of these elements as a main component, and has a single-layer structure or a stacked-layer structure. An alloy material which includes aluminum as a main component corresponds to a material which includes aluminum as a main component and includes nickel, or an alloy material which includes aluminum as a main component and includes nickel and one or both of carbon and silicon, for example. As the conductive film 613, a stacked-layer structure of a barrier film, an aluminum silicon (Al—Si) film, and a barrier film or a stacked-layer structure of a barrier film, an aluminum silicon (Al—Si) film, a titanium nitride film, and a barrier film may be employed, for example. Note that the barrier film corresponds to a thin film formed of titanium, titanium nitride, molybdenum, or molybdenum nitride. Since aluminum and aluminum silicon have low resistance values and are inexpensive, aluminum and aluminum silicon are suitable for a material for forming the conductive film 613. In addition, by providing the barrier films in an upper layer and a lower layer, generation of a hillock of aluminum or aluminum silicon can be prevented. Further, by forming a barrier film with titanium which is an element having a high reducing property, even when a thin natural oxide film is formed over the crystalline semiconductor films, the natural oxide film can be chemically reduced and an excellent contact with the crystalline semiconductor films can be obtained.

Next, an insulating film 614 is formed so as to cover the conductive films 613, and conductive films 615a and 615b which are each electrically connected to the conductive film 613 forming the source regions or the drain regions of the thin film transistors 600a to 600f are formed over the insulating film 614. In addition, a conductive film 616 which is electrically connected to the conductive film 613 forming the source region or the drain region of the thin film transistor 600b is formed. Note that the conductive films 615a and 615b and the conductive film 616 may be formed by using the same material and at the same time. The conductive films 615a and 615b and the conductive film 616 can be formed with any of the materials described for the conductive film 613.

Sequentially, a conductive film 617 functioning as an antenna is formed so as to be electrically connected to the conductive film 616 (see FIG. 11B).

The insulating film 614 can be provided to have a single-layer structure or a stacked-layer structure formed of an insulating film including oxygen or nitrogen such as silicon oxide ($SiO_x$), silicon nitride ($SiN_x$), silicon oxynitride ($SiO_xN_y$) (x>y), or silicon nitride oxide ($SiN_yO_x$) (x>y), a film including carbon such as DLC (diamond like carbon), an organic material such as epoxy, polyimide, polyamide, polyvinyl phenol, benzocyclobutene, or acryl, or a siloxane material such as a siloxane resin. Note that the siloxane material corresponds to a material including a Si—O—Si bond. Siloxane has a skeletal structure with the bond of silicon (Si) and oxygen (O). As a substituent, an organic group including at least hydrogen (e.g., an alkyl group or aromatic hydrocarbon) is used. As the substituent, a fluoro group can also be used. Alternatively, as the substituent, the organic group including at least hydrogen and the fluoro group may be used.

The conductive film 617 is formed of a conductive material by using CVD, sputtering, a printing method such as a screen printing method or a gravure printing method, a droplet discharge method, a dispenser method, a metal plating method, or the like. The conductive material is formed of an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material which includes any of these elements as a main component, and has a single-layer structure or a stacked-layer structure.

For example, in the case of forming the conductive film 617 functioning as the antenna by using the screen printing method, the conductive layer 617 can be provided by selectively printing a conductive paste where a conductive particle having a particle size of several nm to several ten μm is dissolved or dispersed in an organic resin. As the conductive particle, metal particles of one or more of silver (Ag), gold (Au), copper (Cu), nickel (Ni), platinum (Pt), palladium (Pd), tantalum (Ta), molybdenum (Mo), titanium (Ti), and the like, a fine particle of silver halide, or a dispersing nano particle can be used. In addition, as the organic resin included in the conductive paste, one or more selected from organic resins functioning as a binder, a solvent, a dispersive agent, and a coating member of the metal particles can be used. Typically, an organic resin such as an epoxy resin or a silicon resin can be given as an example of the organic resin included in the conductive paste. Further, in forming the conductive film, baking is preferably performed after the conductive paste is pushed out. For example, in the case of using a fine particle which includes silver as a main component (for example, a particle size is equal to or greater than 1 nm and equal to or less than 100 nm) as a material for the conductive paste, the conductive film can be obtained by baking it with temperatures in the range of 150 to 300° C. to cure. Further, a fine particle which includes solder or lead-free solder as a main component may also be used. In this case, it is preferable that a fine particle having a particle size of 20 μm or less be used. Solder or lead-free solder has an advantage such as low cost.

In addition, the conductive films 615a and 615b can function as wirings which are electrically connected to the battery included in the semiconductor device in this embodiment mode in a later step. In addition, when the conductive film 617 functioning as the antenna is formed, a conductive film may be separately formed so as to be electrically connected to the conductive films 615a and 615b so that the conductive film is utilized as a wiring connected to the battery.

Next, after forming an insulating film 618 so as to cover the conductive film 617, a layer which includes the thin film transistors 600a to 600f, the conductive film 617, and the like (hereinafter described as an element forming layer 619) is peeled off the substrate 601. Here, the element forming layer 619 can be peeled off the substrate 601 by using physical force after an opening portion is formed in a region excluding the thin film transistors 600a to 600f by laser beam irradiation (e.g., UV light) (see FIG. 12C). Alternatively, before peeling the element forming layer 619 off the substrate 601, the release layer 603 may be selectively removed by introducing an etching agent into the opening portion formed. Gas or liquid including halogen fluoride or an interhalogen compound is used as the etching agent. For example, chlorine fluoride ($ClF_3$) is used as the gas including halogen fluoride. Then, the element forming layer 619 is in the condition that it is peeled off the substrate 601. Note that the release layer 603 may be partially kept without being removed entirely. Therefore, consumption of the etching agent can be suppressed and a processing time which is necessary for removing the release layer 603 can be shortened. In addition, the element forming layer 619 can be held over the substrate 601 even after the release layer 603 is peeled off the substrate 601. Further, by recycling the substrate 601 from which the element forming layer 619 is peeled, cost can be reduced.

The insulating film 618 can be provided to have a single-layer structure or a stacked-layer structure formed of an insulating film including oxygen or nitrogen such as silicon oxide ($SiO_x$), silicon nitride ($SiN_x$), silicon oxynitride ($SiO_xN_y$) (x>y), or silicon nitride oxide ($SiN_yO_x$) (x>y), a film including carbon such as DLC (Diamond Like Carbon), an organic material such as epoxy, polyimide, polyamide, polyvinyl phenol, benzocyclobutene, or acryl, or a siloxane material such as a siloxane resin.

In this embodiment mode, after forming an opening portion in the element forming layer 619 by laser light irradiation, a first sheet material 620 is attached to one surface of the element forming layer 619 (a surface in which the insulating film 618 is exposed), and then, the element forming layer 619 is peeled off the substrate 601 (see FIG. 13A).

Next, a second sheet material 621 is attached to the other surface of the element forming layer 619 (a surface which is exposed by the peeling) by performing one or both of thermal treatment and pressure treatment (see FIG. 13B). As the first sheet material 620 and the second sheet material 621, a hot melt film or the like can be used.

As each of the first sheet material 620 and the second sheet material 621, each film to which countermeasures against static electricity is applied in order to prevent static electricity or the like (hereinafter described as an anitistatic film) can also be used. A film in which an antistatic material is dispersed in a resin, a film to which an antistatic material is attached, and the like can be given as examples of the antistatic film. As a film in which an antistatic material is provided, a film in which an antistatic material is provided on one surface may be employed, or a film in which an antistatic material is provided on opposite surfaces may be employed. In addition, the film in which the antistatic material is provided on one surface, a surface in which the antistatic material is provided may be attached to the element forming layer 619 so as to be inside of the film, or may be attached to the element forming layer 619 so as to be outside of the film. Note that the antistatic material may be provided on the entire surface or a part of the surface. Here, as the antistatic material, metal, indium tin oxide (ITO), and a surface active agent such as an ampholytic surface active agent, a cationic surface active agent, or a nonionic surface active agent can be used. Alternatively, as the antistatic material, a resin material including a cross-linking polymer which has a carboxyl group and quaternary ammonium base as a side chain or the like can also be used. By attaching these materials to the film, kneading these materials into the film, or applying these materials to the film, the antistatic film can be completed. By sealing the element forming layer 619 with the antistatic film, the case where a semiconductor element is adversely affected by static electricity or the like from outside can be prevented when the semiconductor device is handled as a product.

Note that although the battery is formed to be connected to the conductive films 615a and 615b, the battery may be connected to the conductive films 615a and 615b before the element forming layer 619 is peeled off the substrate 601 (in the stage of FIG. 12B or FIG. 12C); the battery may be connected to the conductive films 615a and 615b after the element forming layer 619 is peeled off the substrate 601 (in the stage of FIG. 13A); or the battery may be connected to the conductive films 615a and 615b after the element forming layer 619 is sealed with the first sheet material 620 and the second sheet material 621 (in the stage of FIG. 13B). An example of forming the element forming layer 619 and the battery so that they are connected to each other is described below with reference to FIGS. 14A and 14B, and FIGS. 15A and 15B.

In FIG. 12B, conductive films 631a and 631b which are electrically connected to the conductive films 615a and 615b respectively are formed at the same time as the conductive film 617 functioning as the antenna is formed. Sequentially, after the insulating film 618 is formed so as to cover the conductive film 617, and the conductive films 631a and 631b, opening portions 632a and 632b are formed in the insulating film 618 so that surfaces of the conductive films 631a and 631b are exposed. Then, after forming the opening portion in the element forming layer 619 by laser light irradiation, the first sheet material 620 is attached to one surface of the element forming layer 619 (the surface in which the insulating film 618 is exposed), and then, the element forming layer 619 is peeled off the substrate 601 (see FIG. 14A).

Next, after attaching the second sheet material 621 to the other surface of the element forming layer 619 (the surface which is exposed by the peeling), the element forming layer 619 is peeled off the substrate 601. Accordingly, here, a sheet material having weak adhesive strength is used as the first sheet material 620. Sequentially, conductive films 634a and 634b which are electrically connected to the conductive films 631a and 631b respectively through the opening portions 632a and 632b are selectively formed (see FIG. 14B).

Each of the conductive films 634a and 634b is formed of a conductive material by using CVD, sputtering, the printing method such as a screen printing method or a gravure printing method, a droplet discharge method, a dispenser method, a metal plating method, or the like. The conductive material is formed of an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material which includes any of these elements as a main component, and has a single-layer structure or a stacked-layer structure.

Note that, here, although an example is shown in which the conductive films 634a and 634b are formed after the element forming layer 619 is peeled off the substrate 601, the element forming layer 619 may be peeled off the substrate 601 after the conductive films 634a and 634b are formed.

Next, in the case where a plurality of elements are formed over the substrate, the element forming layer 619 is cut into each element (see FIG. 15A). Cutting can be performed by using a laser irradiation device, a dicing device, a scribe device, or the like. Here, the plurality of elements formed over one substrate are separated respectively by laser beam irradiation.

Next, the separated elements are electrically connected to connecting terminals of the battery (see FIG. 15B). Here, the conductive films 634a and 634b provided in the element forming layer 619 are connected to conductive films 636a and 636b which are connecting terminals of the battery, respectively. Here, for the connection between the conductive film 634a and the conductive film 636a or a connection between the conductive film 634b and the conductive film 636b, the case is shown in which the conductive film 634a and the conductive film 636a or the conductive film 634b and the conductive film 636b are electrically connected by pressure bonding with a material having adhesive properties such as an ACF (Anisotropic Conductive Film) or an ACP (Anisotropic Conductive Paste). Here, an example is shown in which the conductive film 634a and the conductive film 636a or the conductive film 634b and the conductive film 636b are con-nected by using a conductive particle 638 included in a resin 637 having adhesive properties. In addition, the conductive film 634a and the conductive film 636a or the conductive film 634b and the conductive film 636b can be connected by using a conductive adhesive agent such as a silver paste, a copper paste, or a carbon paste, a solder junction, or the like.

In the case where the battery is larger than the elements, a plurality of elements are formed over one substrate as shown in FIGS. 14A and 14B, and FIGS. 15A and 15B and the elements are connected to the battery after separation, so that the number of elements formed over one substrate can be increased, and thus, the semiconductor device can be manufactured at lower cost.

After that, the battery may be connected to a booster antenna as shown the aforementioned embodiment mode.

Note that this embodiment mode can be freely combined with any of the aforementioned embodiment modes and implemented.

Embodiment Mode 4

In this embodiment mode, an example of a semiconductor device which is different from those shown in the aforementioned embodiment modes and a manufacturing method thereof are described with reference to the drawings.

First, a release layer 703 is formed over one surface of a substrate 701 with an insulating film 702 interposed therebetween. Sequentially, an insulating film 704 functioning as a base film and a conductive film 705 are stacked to be formed (see FIG. 16A). Note that the insulating film 702, the release layer 703, the insulating film 704, and the conductive film 705 can be sequentially formed.

The conductive film 705 is formed of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), an alloy material or a compound material which includes any of these elements as a main component, and has either a single-layer structure or a stacked-layer structure. In addition, these materials can be formed by using sputtering, various kinds of CVD such as plasma CVD, or the like.

Each of the substrate 701, the insulating film 702, the release layer 703, and the insulating film 704 can be formed by using any of the materials of the substrate 601, the insulating film 602, the release layer 603, and the insulating film 604 shown in the aforementioned embodiment mode.

Next, the conductive film 705 is selectively etched to form conductive films 705a to 705e, and insulating films 706 and 707 are stacked so as to cover the conductive films 705a to 705e (see FIG. 16B).

The insulating films 706 and 707 are formed by using an insulating material such as silicon oxide, silicon nitride, silicon oxynitride ($SiO_xN_y$) (x>y>0), or silicon nitride oxide ($SiN_xO_y$) (x>y>0) by CVD, sputtering, or the like. For example, the insulating film 706 can be formed by using silicon nitride oxide and the insulating film 707 can be formed by using silicon oxynitride. In addition, although an example in which the insulating film is provided with a two-layer structure, one of the insulating films 706 and 707 may be provided or an insulating film with a three or more-layer structure may be provided.

Next, semiconductor films 708a to 708d are selectively formed above the conductive films 705a to 705d (see FIG. 16C). Here, an amorphous semiconductor film (e.g., an amorphous silicon film) is formed over the insulating film 707 to have a thickness of 25 to 200 nm (preferably, 30 to 150 nm) by sputtering, LPCVD, plasma CVD, or the like, and the amorphous semiconductor film is selectively etched to form the semiconductor films 708a to 708d after the amorphous semiconductor film is crystallized. As materials of the semiconductor films, crystallization methods, and the like, the materials and methods shown in the aforementioned embodiment mode can be used. In addition, the insulating films 706 and 707, and the amorphous semiconductor film can be sequentially formed.

Figure 19A:
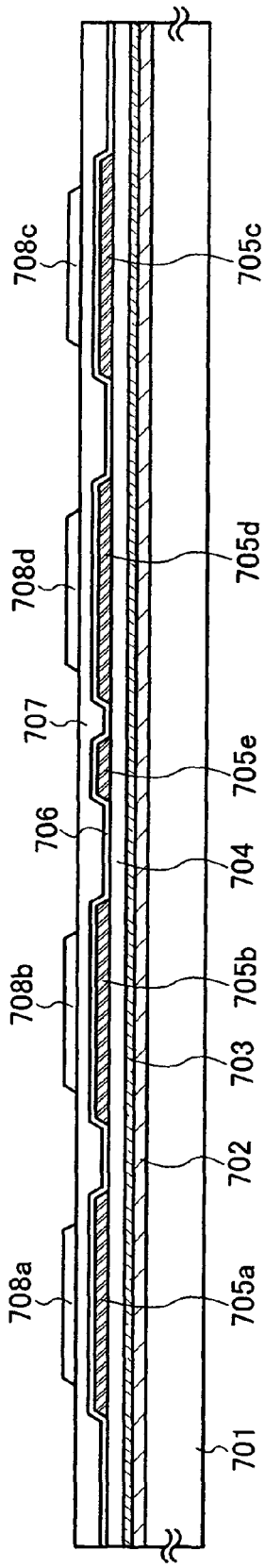
FIGS. 19A and 19B are diagrams each showing a manufacturing step of a semiconductor device of the invention.
Figure 19B:
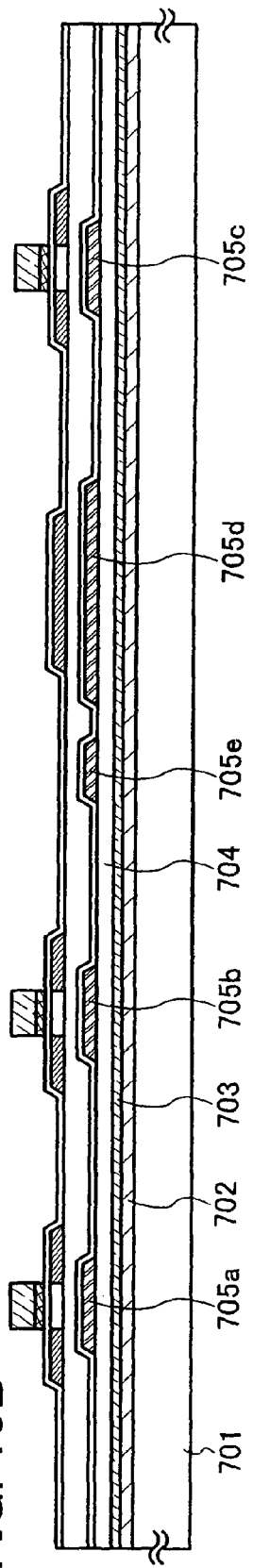

Note that in the case where a surface of the insulating film 707 has unevenness by the conductive films 705a to 705d, the insulating film 707 is preferably planarized to have a flat surface before the amorphous semiconductor film is formed over the insulating film 707. As planarization treatment, polishing such as CMP can be used. By performing polishing such as CMP, the semiconductor film can be formed over the insulating film 707, the surface of which is planarized as shown in FIG. 19, and thus, an adverse effect on the characteristics of elements can be reduced when the elements are formed by using the semiconductor films 708a to 708d.

Next, a gate insulating film 709 is formed so as to cover the semiconductor films 708a to 708d and a gate electrode 710 is selectively formed above the semiconductor films 708a to 708c, and then, the semiconductor films 708a to 708d are doped with an impurity element by using the gate electrode 710 as a mask to form an impurity region 711 (see FIG. 16D). As the impurity element, an impurity element which imparts n-type conductivity or p-type conductivity is doped. As an impurity element which imparts n-type conductivity, phosphorus (P), arsenic (As), or the like can be used. As an impurity element which imparts p-type conductivity, boron (B), aluminum (Al), gallium (Ga), or the like can be used. Here, phosphorus (P) which is an impurity element imparting n-type conductivity is introduced into the semiconductor films 708a to 708d so as to be included therein with a concentration of $1\times10^{19}$ to $1\times10^{20}/cm^3$ to form the impurity region 711 having n-type conductivity. Note that the invention is not limited to this; thus, an impurity element which imparts p-type conductivity may be introduced into the semiconductor films 708a and 708d to form the impurity region 711 having p-type conductivity, or the impurity element which imparts p-type conductivity may be selectively introduced into the semiconductor films 708a to 708d.

By the aforementioned steps, n-channel thin film transistors 700a to 700c and an element 700d functioning as a capacitor are formed (see FIG. 16D).

In the n-channel thin film transistor 700a, a channel forming region is formed in a region of the semiconductor film 708a which overlaps with the gate electrode 710, and the impurity region 711 forming a source region or a drain region is formed to be adjacent to the channel forming region, which does not overlap with the gate electrode 710. Similarly, in each of the n-channel thin film transistors 700b and 700c, a channel forming region and the impurity region 711 are formed.

In the element 700d, a capacitor is formed by a stacked-layer structure of the conductive film 705d, the insulating films 706 and 707, and a semiconductor film of the impurity region 711 doped with the impurity element.

Note that, here, although an example is shown in which the n-channel thin film transistors 700a to 700c are provided, p-channel thin film transistors may be provided or a structure in which a lightly doped drain region (LDD region) is provided in each of the semiconductor films 708a to 708c by providing an insulating film to be in contact with a side of the gate electrode 710 can be employed as shown in the aforementioned embodiment mode.

In addition, here, although an example is shown in which the conductive films 705a to 705c are formed to be larger than the semiconductor films 708a to 708c (the conductive films 705a to 705c are formed so as to overlap with the channel forming regions and the impurity regions 711 of the respective thin film transistors 700a to 700c), the invention is not limited to this. For example, the conductive films 705a to 705c may be provided so as to overlap with a part of the impurity regions 711 and the entire surface of the channel forming regions of the respective thin film transistors 700a to 700c (see FIG. 19A); the conductive films 705a to 705c may be provided so as to overlap with a part of the impurity regions 711 and a part of the channel forming regions of the respective thin film transistors 700a to 700c (see FIG. 19B); or the conductive films 705a to 705c may be provided so as to overlap with only a part of the channel forming regions of the respective thin film transistors 700a to 700c. In the case of providing the conductive films 705a to 705c in this manner, the insulating film 707 is preferably planarized by particularly performing polishing such as CMP.

Note that by providing the conductive films 705a to 705c, damage to the thin film transistors can be prevented; ESD (Electrostatic Discharge) can be prevented; a short-channel effect can be suppressed; the threshold voltage can be controlled; and the number of steps can be reduced.

That is, in the semiconductor device including the thin film transistors 700a to 700c, even when it is bent, bending in the channel forming region or the impurity region 711 of each of the thin film transistors 700a to 700c can be suppressed by the conductive films 705a to 705c provided so as to overlap with the channel forming region or the impurity region 711 of each of the thin film transistors 700a to 700c; thus, damage to the thin film transistors 700a to 700c can also be prevented.

Further, at the time of manufacturing the semiconductor device, the conductive films 705a to 705c become an escape or a diffusion region of electric charges so that local accumulation of the electric charges can be reduced and electric field concentration can be relieved, and thus, ESD can be prevented.

An adverse effect of a drain on a source is removed by the conductive films 705a to 705c in each of the thin film transistors 700a to 700c, so that the short-channel effect can be suppressed even when the channel length is shortened. That is, the short-channel effect caused by decrease in channel length (a phenomenon that the threshold voltage Vth of a transistor rapidly shifts and rising of a drain current in a sub threshold region becomes dull) which becomes problematic in accordance with miniaturization of the thin film transistors 700a to 700c can be suppressed.

In addition, the threshold voltage of each of the thin film transistors 700a to 700c can be controlled by potentials input into the conductive films 705a to 705c.

Figure 24A:
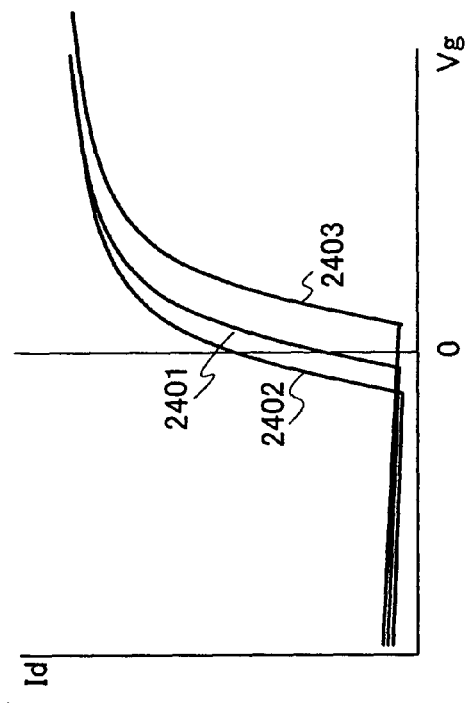
FIGS. 24A and 24B are graphs showing Id-Vg characteristics.
Figure 24B:
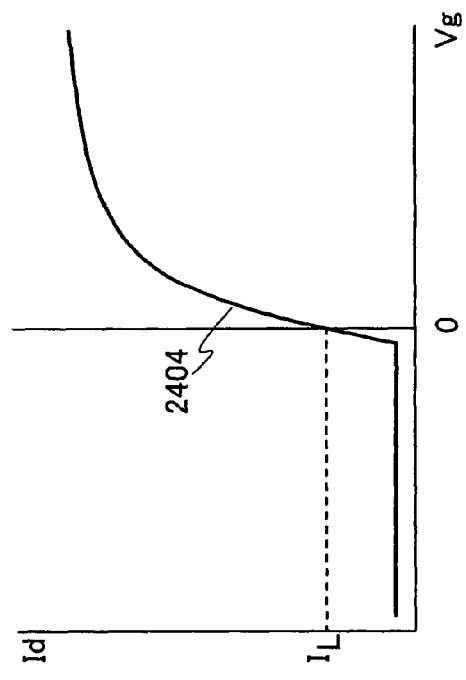

FIG. 24B is a graph showing a relation of a drain current with a gate voltage of an n-channel MOS transistor. Ideally, it is preferable that a drain current Id be sufficiently large in a region where a gate voltage Vg is positive and it is preferable that the drain current Id be 0 (V) in a region where the gate voltage Vg is 0 (V) or less. However, actually, as shown by a curve 2404, the drain current Id leaks by an amount of IL (mA) when the gate voltage Vg is 0 (V). Although a leak current of each transistor is not large, many transistors are provided in the semiconductor device; thus, by summing up a leak current of each transistor together, the leak current of the semiconductor device is not small at all. Such leak current will increase standby power consumption of the semiconductor device. That is, such leak current will increase consumption of power stored in a battery.

When a channel region of the transistor is slightly doped with impurities and the curve 2404 shown in FIG. 24B is shifted to the right, this leak current can be decreased. However, in that case, a current in the case where Vg is positive is also decreased, and thus, there is a problem in that frequency characteristics of a circuit is deteriorated.

In order to solve the aforementioned problem, gate electrodes are provided above and below a semiconductor film which forms the transistor. That is, when the transistor is seen from a cross section, the semiconductor film is located between a first gate electrode and a second gate electrode. Then, a logic signal is applied to the first gate electrode and a threshold voltage control signal is applied to the second gate electrode, so that the threshold voltage of the transistor which forms the semiconductor device is varied by a potential of the second gate electrode. In this embodiment mode, each of the conductive films 705a to 705c can be used for a second gate electrode of each of the thin film transistors 700a to 700c.

FIG. 24A shows Id-Vg characteristics of a transistor having the first gate electrode and the second gate electrode. Three kinds of curves 2401 to 2403 are shown in FIG. 24A and the curve 2402 shows the case in which a positive voltage is applied to the second gate electrode. In such case, the curve is shifted to the left and more current flows. In addition, the curve 2401 shows the case in which a voltage of 0 (V) is applied to the second gate electrode. Such case is the same as a conventional technique. The curve 2403 shows the case in which a negative voltage is applied to the second gate electrode. In such case, the curve is shifted to the right and the current hardly flows, so that a leak current is decreased. By providing a threshold control function to the semiconductor device in accordance with this embodiment mode and shifting the curves of the Id-Vg characteristics of the transistor in this manner, the leak current can be decreased.

By using the conductive film 705e which is formed at the same time as forming the conductive films 705a to 705c as the antenna, a conductive film 715 or a conductive film 716 which is formed in later description can be omitted.

Figure 17A:
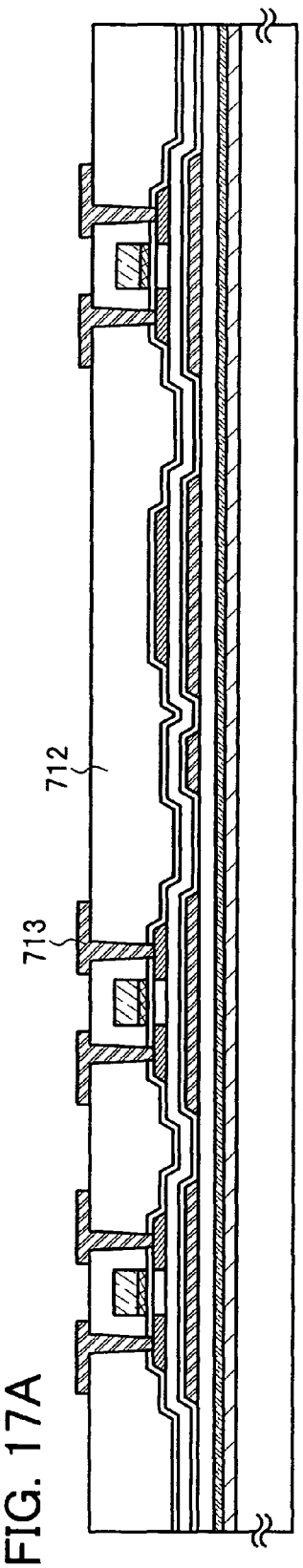
FIGS. 17A and 17B are diagrams each showing a manufacturing step of a semiconductor device of the invention.

Next, an insulating film 712 is formed so as to cover the thin film transistors 700a to 700c and the element 700d, and conductive films 713 which are electrically connected to the impurity regions 711 forming the source regions or the drain regions of the thin film transistors 700a to 700c are formed over the insulating film 712 (see FIG. 17A).

The insulating film 712 is formed to have a single-layer structure or a stacked-layer structure using an inorganic material such as silicon oxide or silicon nitride, an organic material such as polyimide, polyamide, benzocyclobutene, acryl, or epoxy, a siloxane material, or the like by CVD, sputtering, SOG, a droplet discharge method, a screen printing method, or the like.

The conductive films 713 can be formed by using any of the materials described for the conductive films 613 shown in the aforementioned embodiment mode.

Figure 17B:
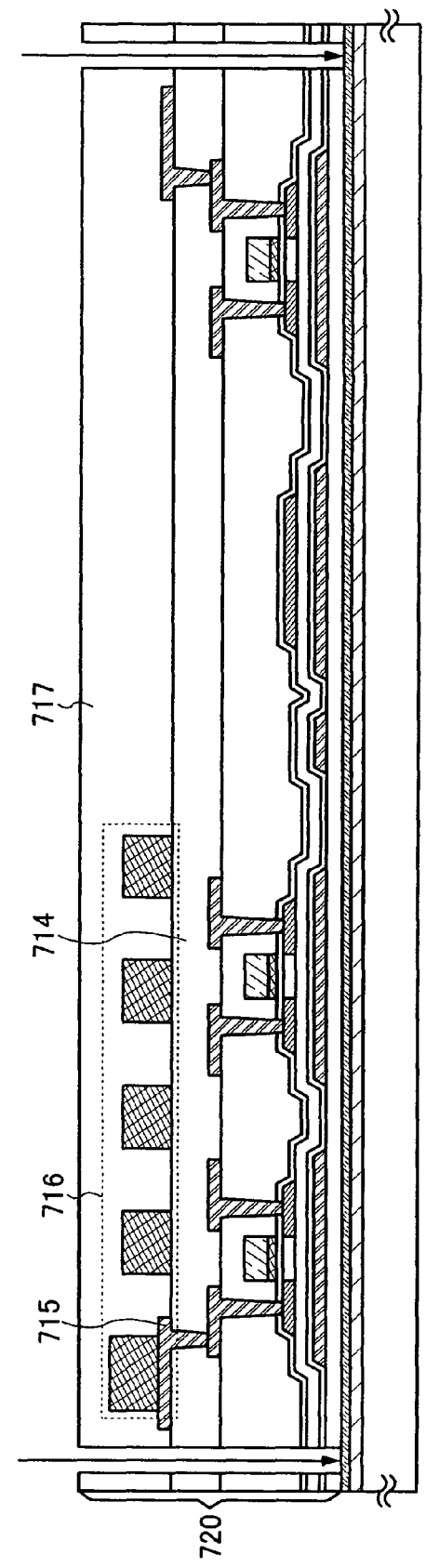

Next, an insulating film 714 is formed so as to cover the conductive films 713, and conductive films 715 which are electrically connected to the conductive films 713 forming the source regions or the drain regions of the thin film transistors 700a to 700c are formed over the insulating film 714, and then, a conductive film 716 functioning as an antenna is formed so as to be electrically connected to the conductive films 715 (see FIG. 17B).

Next, after forming an insulating film 717 so as to cover the conductive film 716, a layer which includes the thin film transistors 700a to 700c, the element 700d, and the conductive film 716, and the like (hereinafter described as an element forming layer 720) is peeled off the substrate 701. As a peeling method, any of the methods shown in the aforementioned embodiment mode can be used.

Here, after forming an opening portion in the element forming layer 720 by laser light irradiation, a first sheet material 718 is attached to one surface of the element forming layer 720 (a surface in which the insulating film 717 is exposed), and then, the element forming layer 720 is peeled off the substrate 701 (see FIG. 18A).

Next, a second sheet material 719 is attached to the other surface of the element forming layer 720 (a surface which is exposed by the peeling) by performing one or both of thermal treatment and pressure treatment. As the first sheet material 718 and the second sheet material 719, a hot melt film or the like can be used.

By the aforementioned steps, the semiconductor device can be manufactured (see FIG. 18B). Note that in this embodiment mode, the element 700d which forms the capacitor can be used as the battery. Alternatively, the battery may be provided separately from the element 700d. In this case, the battery can be provided by using any of the methods shown in the aforementioned embodiment mode.

Note that the semiconductor device shown in this embodiment mode is not limited to this. For example, a structure in which the conductive film 716 functioning as the battery or the antenna is provided below the thin film transistors 700a to 700c may be employed.

FIGS. 20A and 20B show an example in which the battery is provided below the thin film transistors 700a to 700c. Here, an example is shown in which a conductive film 731a is provided so as to be electrically connected to the conductive films 713 which function as the source electrode or the drain electrode of the thin film transistor 700b and the conductive film 731a and a conductive film 733a forming a connection wiring of the battery are connected below the element forming layer 720 (a surface exposed by peeling the element forming layer 720 off the substrate 701). In addition, here, an example is shown in which a thin film transistor is provided as a substitute for the element 700d which forms the capacitor and a conductive film 731b is provided so as to be electrically connected to the conductive films 713 which function as the source electrode or the drain electrode of the thin film transistor, and the conductive film 731b and a conductive film 733b forming a connection wiring of the battery are connected below the element forming layer 720 (the surface exposed by peeling the element forming layer 720 off the substrate 701).

In the case of providing the battery in this manner, in FIG. 17A, a second opening portion is formed in the insulating films 706 and 707, the gate insulating film 709, and the insulating film 712 at the same time as forming a first opening portion in the gate insulating film 709 and the insulating film 712 in order to expose the impurity region 711 of the thin film transistors 700a to 700c, and the conductive films 713 are provided so as to fill the first opening portion and the conductive films 731a and 731b are provided so as to fill the second opening portion. The first opening portion and the second opening portion can be formed at the same time; in the case of forming the first opening portion, the semiconductor films 708a to 708c function as stoppers; and in the case of forming the second opening portion, the release layer 703 functions as a stopper. After that, the element forming layer 720 is peeled off the substrate 701 after the conductive film 716 functioning as the antenna is formed as described above (see FIG. 20A).

After that, the conductive films 731a and 731b provided in an exposed surface of the element forming layer 720 which is peeled off the substrate 701 are connected to conductive films 733a and 733b which are connecting terminals of the battery provided over a substrate 732, respectively. Here, for the connection between the conductive film 731a and the conductive film 733a or the connection between the conductive film 731b and the conductive film 733b, the case is shown in which the conductive film 731a and the conductive film 733a or the conductive film 731b and the conductive film 733b are electrically connected by pressure bonding with a material having adhesive properties such as an ACF (Anisotropic Conductive Film) or an ACP (Anisotropic Conductive Paste). Here, an example is shown in which the conductive film 731a and the conductive film 733a or the conductive film 731b and the conductive film 733b are connected by using a conductive particle 735 included in a resin 734 having adhesive properties. In addition, the conductive film 731a and the conductive film 733a or the conductive film 731b and the conductive film 733b can be connected by using a conductive adhesive agent such as a silver paste, a copper paste, or a carbon paste, a solder junction, or the like.

Note that in this embodiment mode, a structure in which the conductive film 716 functioning as the battery and the antenna is provided below the thin film transistors 700a to 700c may be employed. FIGS. 21A and 21B show an example in which the conductive film 716 functioning as the battery and the antenna is provided below the thin film transistors 700a to 700c.

Here, an example is shown in which a conductive film 731c is provided so as to be electrically connected to the conductive films 713 which function as the source electrode or the drain electrode of the thin film transistor 700c and the conductive film 731c and a conductive film 716b functioning as the antenna are connected below the element forming layer 720 (the surface exposed by peeling the element forming layer 720 off the substrate 701). In addition, an example in which the battery is also provided similarly as FIGS. 20A and 20B is shown.

In the case of providing the battery in this manner, in FIG. 17A, the second opening portion is formed in the insulating films 706 and 707, the gate insulating film 709, and the insulating film 712 at the same time as forming the first opening portion in the gate insulating film 709 and the insulating film 712 in order to expose the impurity region 711 of the thin film transistors 700a to 700c, and the conductive films 713 are provided so as to fill the first opening portion and the conductive films 731a to 731c are provided so as to fill the second opening portion. The first opening portion and the second opening portion can be formed at the same time; in the case of forming the first opening portion, the semiconductor films 708a to 708c function as stoppers; and in the case of forming the second opening portion, the release layer 703 functions as a stopper. After that, the element forming layer 720 is peeled off the substrate 701 after the conductive film 716 functioning as the antenna is formed as described above (see FIG. 21A).

After that, the conductive films 731a and 731b provided in the exposed surface of the element forming layer 720 which is peeled off the substrate 701 are connected to conductive films 733a and 733b which are the connecting terminals of the battery provided over the substrate 732, respectively (see FIG. 21B). In addition, the conductive film 731c provided in the exposed surface of the element forming layer 720 which is peeled off the substrate 701 and the conductive film 716b functioning as the antenna which is provided over the substrate 736 are connected.

In the case where the battery or the antenna is larger than the elements in which the thin film transistors 700a to 700c are provided, the element forming layer 720 and the battery or the antenna may be provided to be attached together as shown in FIGS. 20A and 20B, and FIGS. 21A and 21B. In the case of using the battery or the antenna which is larger than the elements, a plurality of elements are formed over one substrate and the battery or the antenna and the elements are provided to be attached together after the elements are separated, and thus, the semiconductor device can be manufactured at lower cost.

Embodiment Mode 5

In this embodiment mode, a structure of a TFT in the case where a chip (for example, it corresponds to the chip in FIG. 6 of Embodiment Mode 1) is provided to a product such as an ID label which can be bent in one direction is described.

Figure 25:
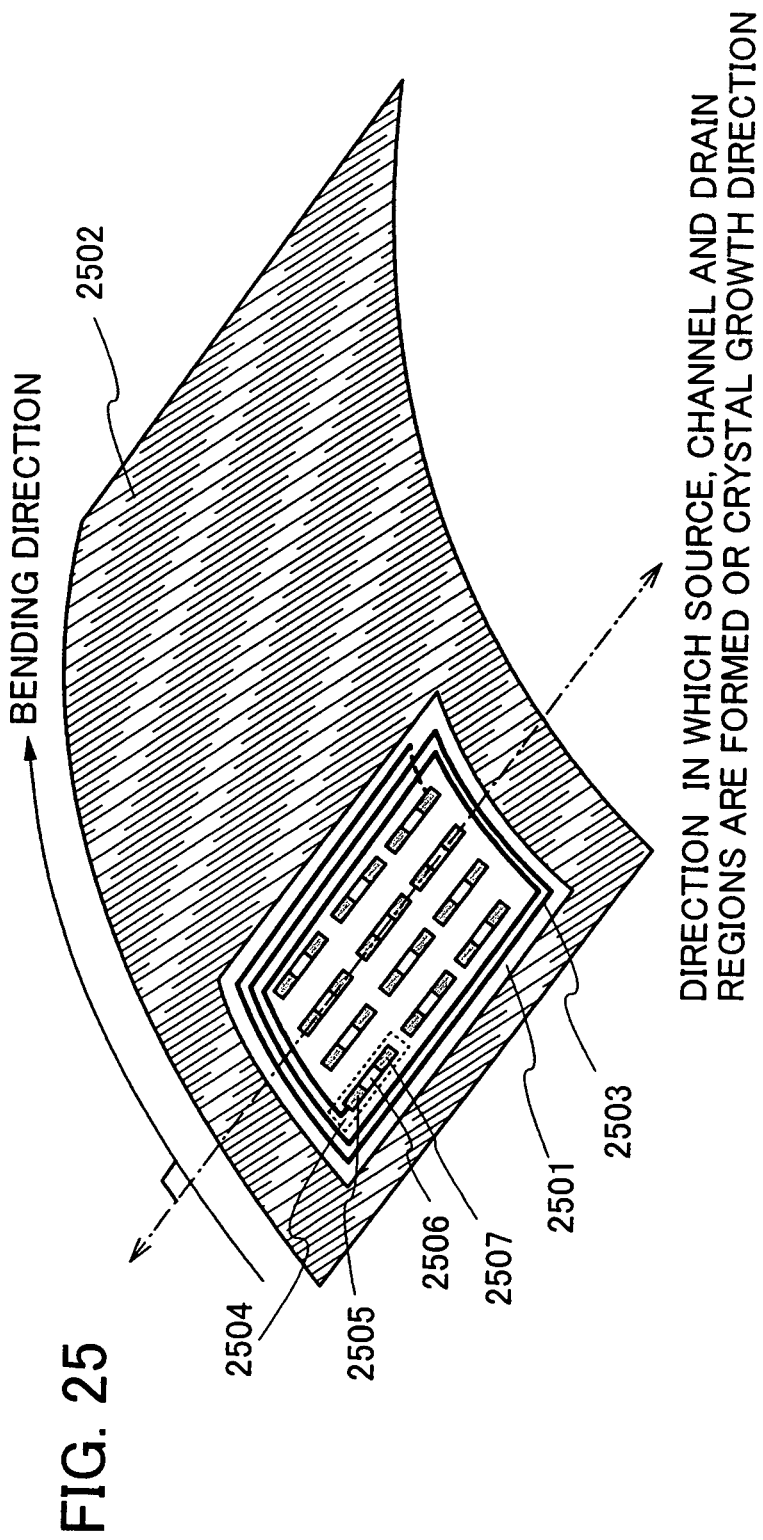
FIG. 25 is a diagram showing a relationship of a forming direction of a source region, a channel region, and a drain region of a TFT are formed and a direction in which a base substrate of a product is bent.

FIG. 25 shows a top plan view of a layer of an island-shaped semiconductor film 2504 in a TFT in a chip 2501 formed on an ID label 2502. In the island-shaped semiconductor film 2504, a source region 2505 and a drain region 2507 which are imparted with n-type or p-type impurity elements, and a channel region 2506 which is not imparted with impurity elements are formed. In addition, at least one of semiconductor regions of the TFT in the chip is connected to an antenna 2503.

Here, by setting a bending direction of the ID label or the like in a direction which is at an angle of about 90 degrees with respect to a direction in which source (S), channel (C), and drain (D) regions are formed or a crystal growth direction of the semiconductor film, generation of a crack in the island-shaped semiconductor film 2504 can be prevented when the ID label or the like is bent, and thus, the TFT can stably operate regardless of handling of the ID label.

Embodiment Mode 6

In this embodiment mode, applications of a semiconductor device (e.g., an ID label, an ID tag, or an ID card) in accordance with the invention and examples of a product to which the semiconductor device is applied are described with reference to FIGS. 26A to 26E, and FIGS. 27A to 27D.

Figure 26A:
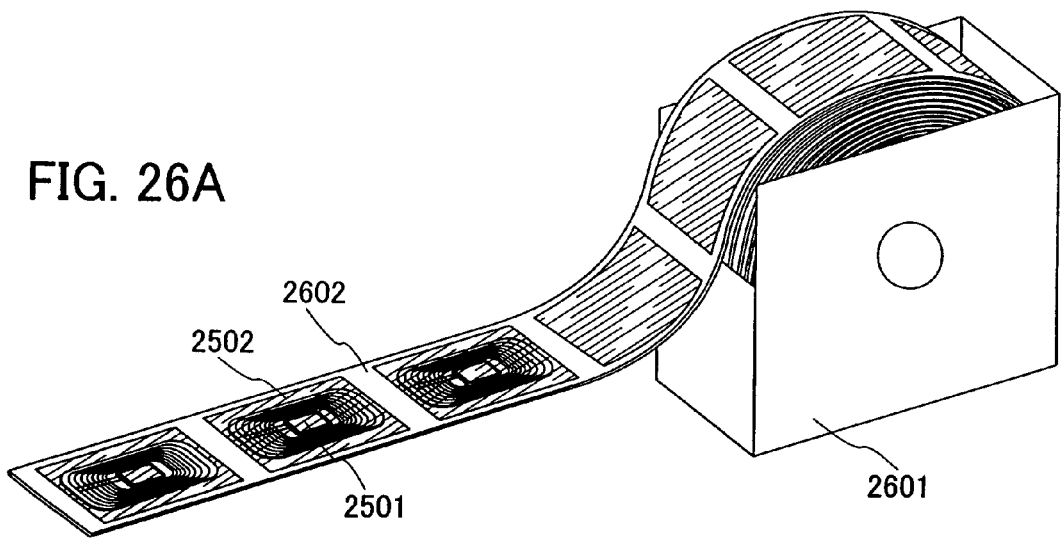
FIGS. 26A to 26E are diagrams showing examples of products in accordance with the invention.

FIG. 26A shows an example of a finished product of the ID label in accordance with the invention. A plurality of ID labels 2502 incorporating the chip 2501 are formed on a label board 2602 (a separate paper). The ID labels 2502 are put in a box 2601. In addition, information on the product and service (e.g., a product name, a brand name, a trademark, an owner of the trademark, a seller, or a manufacturer) are written on the ID labels 2502, while an ID number which is peculiar to the product (or a kind of the product) is designed to the incorporated ID chip, and thus, forgery, infringement of intellectual property rights such as trademark rights or patent rights, or inequitable conduct such as unfair competition can be easily known. Further, much information which cannot be written on a container or a label of the product such as an production area, a selling area, quality, a raw material, efficacy, a use application, quantity, the shape, price, a production method, usage, a production time, a usage time, an expiration date, an instruction of the product, or information on intellectual properties of the product can be input into the ID chip, and a trader and a consumer can access such information by a simple reader. Moreover, although information can also be rewritten, erased, or the like with the producer side, information cannot be rewritten, erased, or the like by the trader and the consumer sides.

Figure 26B:
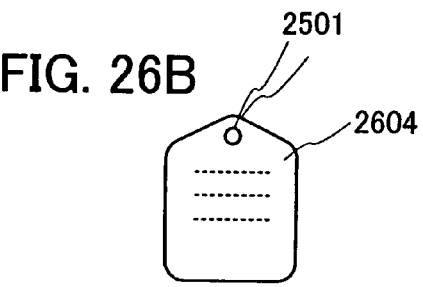

FIG. 26B shows an ID tag 2604 incorporating the chip. By providing the ID tag 2604 to a product, product management becomes easy. For example, when the product is stolen, the criminal can be quickly recognized by tracing a path of the product. By providing the ID tag 2604 in this manner, a product having excellent so-called traceability can be distributed.

Figure 26C:
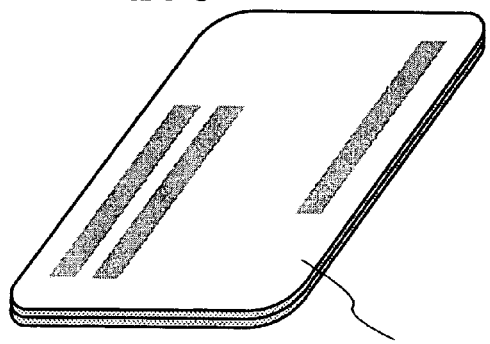

FIG. 26C shows an example of a finished product of an ID card 2605 in accordance with the invention. As the ID card 2605, any of cards such as a cash card, a credit card, a prepaid card, an electronic ticket, electronic money, a telephone card, and a membership card are given as examples.

Figure 26D:
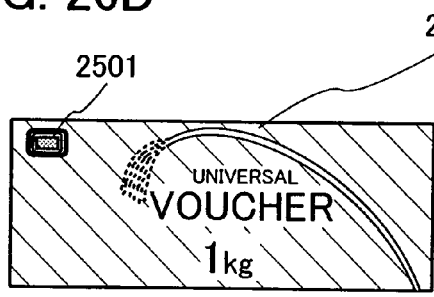

FIG. 26D shows a finished product of an unregistered bond 2606 which applies the invention. The IDF chip 2501 is embedded in the unregistered bond 2606, and the surroundings are molded with a resin to protect the chip. Here, a structure where filler is filled in the resin is employed. The unregistered bond 2606 can be formed similarly to the ID label, the ID tag, or the ID card in accordance with the invention. Note that although a stamp, a ticket, an admission ticket, a gift certificate, a book coupon, a stationary coupon, a beer coupon, a rice coupon, various kinds of gift coupons, various kinds of service ticket, and the like are included in the unregistered bond, needless to say, the invention is not limited to these.

Figure 26E:
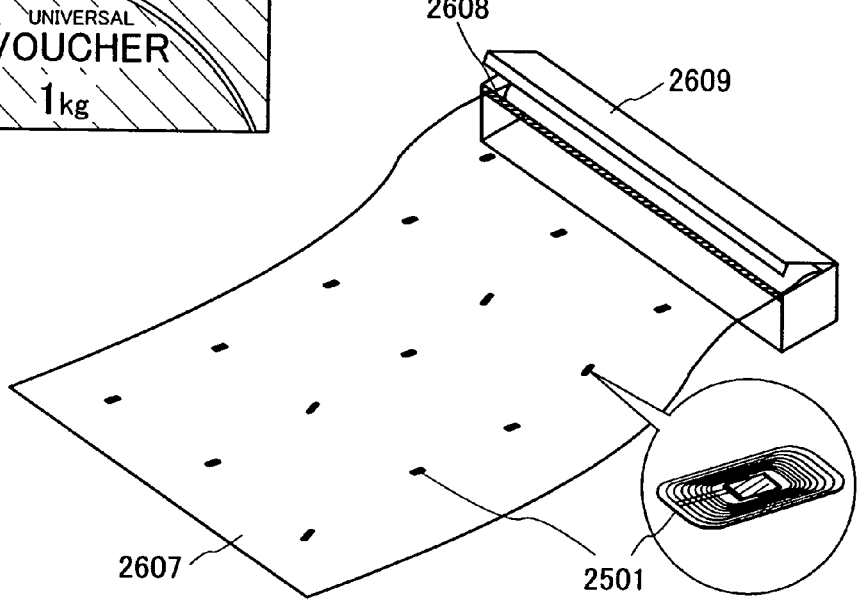

FIG. 26E shows a finished product of a packaging film 2607 or the like which applies the invention. The chip 2501 is embedded in the packaging film 2607 or the like, and the surroundings are molded with a resin to protect the chip. Here, a structure where filler is filled in the resin is employed. The packaging film or the like 2607 can be manufactured by arbitrary spreading the chips on a lower layer and covering it with an upper layer with a fill layer interposed therebetween. The packaging film or the like 2607 is put in a box 2609 and can be used by a desired amount by cutting it with a cutter 2608. Note that a material of the packaging film 2607 or the like is not particularly limited to a certain type. For example, a thin film resin, aluminum foil, paper, or the like can be used.

Figure 27A:
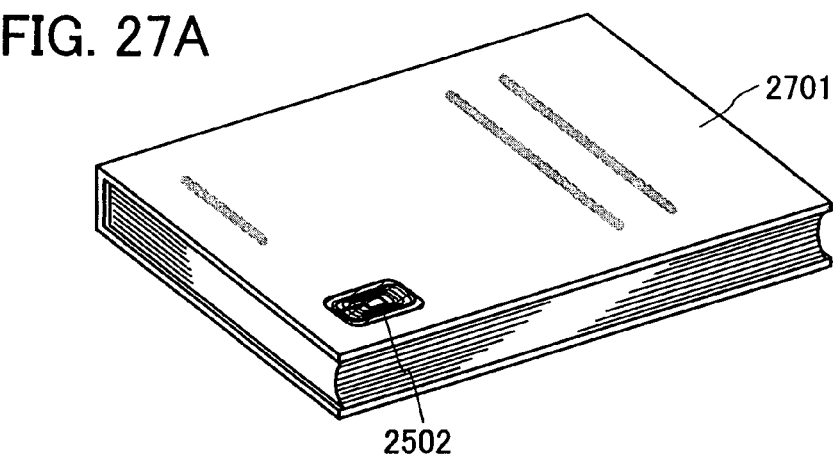
FIGS. 27A to 27D are diagrams showing examples of products to which are attached an ID label or the like in accordance with the invention.
Figure 27B:
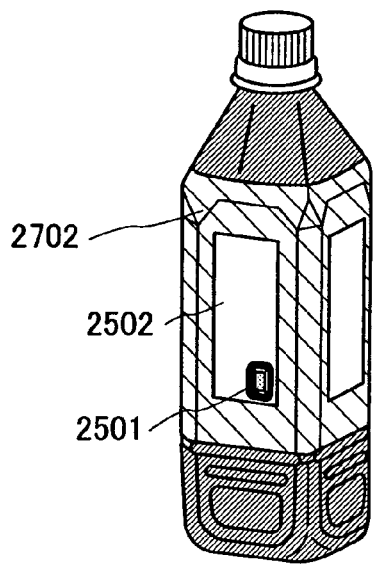

FIGS. 27A and 27B show a book 2701 and a plastic bottle 2702 to which the ID label 2502 in accordance with the invention is attached, respectively. Since the ID label used in the invention is extremely thin, a function and design are not spoiled even when an article such as the book is equipped with the ID label. In addition, in the case of a wireless thin film integrated circuit device, an antenna and the chip can be formed over the same substrate and the wireless thin film integrated circuit device can be directly transferred to a product having a curve surface easily.

Figure 27C:
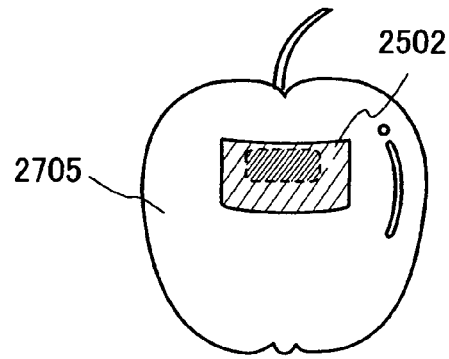
Figure 27D:
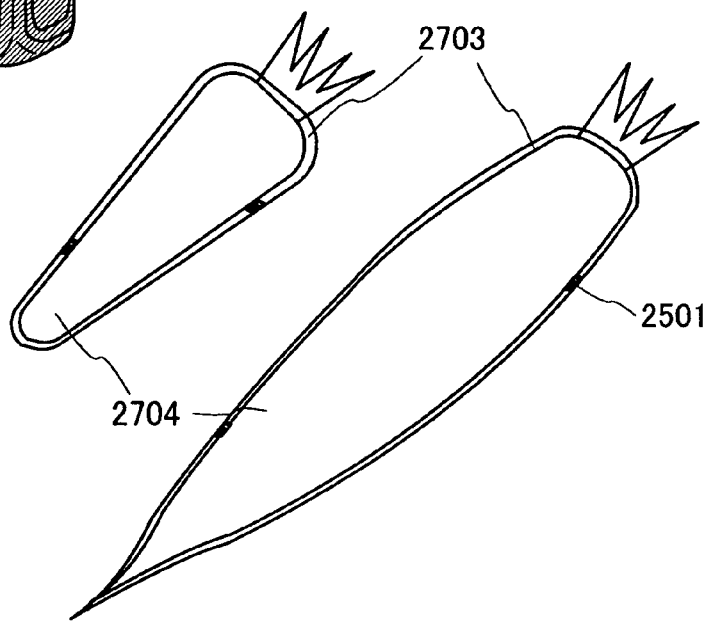

FIG. 27C shows a condition in which the ID label 2502 is directly attached to fruit 2705 or the like which is a fresh food. In addition, FIG. 27D shows an example in which vegetables 2704 or the like are wrapped with the packaging film or the like. Note that in the case of attaching the ID chip 2501 to the product, the ID chip 2501 might be taken off; however, in the case of wrapping the product with the packaging film 2703 or the like, it is difficult to take off the packaging film 2703 or the like so that some merits of anticrime measures exist. Note that the chip in accordance with the invention can be used for any of products in addition to the aforementioned products.

Embodiment Mode 7

In this embodiment mode, a management method and a flow of information of a product incorporating the semiconductor device (e.g., an ID label or an ID tag) in accordance with the invention are described with reference to FIGS. 28A and 28B, FIG. 29, and FIG. 30.

First, the case where a customer purchases a product inside of a store is described with reference to FIG. 28A. The ID label 2502 or the ID tag incorporating information such as information which is peculiar to a product or a production history is attached to a product 2801 which is displayed inside of the store. The customer can read out information incorporated in the ID label or the like by putting a R/W 2802 for customer which is prepared inside of the store or owned by the customer close to the product 2801 to communicate with the ID label or the like attached to the product through an antenna portion 2803 of the R/W.

It is preferable that the customer can freely read out information or select whether to purchase goods or not by using operating keys 2805. In addition, information which is read out is set to be displayed on a display portion 2804 provided in the R/W. As information, price, consumption tax, a country of origin, a producer, an origin of import, a production time, an expiration date of the product, usage of the product (a recipe or the like if the product is a food), and the like can be given. Further, it is convenient if the total amount of purchase at the time of shopping is also displayed on the display portion 2804.

Further, the R/W 2802 for customer is connected to a POS system 2806 (Point Of Sales; an information management system at the time of selling (the ID label, the Id tag, or the like attached to the product is read out by an automatic reader at the time in which the product is sold, and it is directly input into a computer to perform sales management, customer management, inventory control, or purchasing control), so that an operation of reading out a bar code in a cash register, which is conventional, is not needed.

In addition, by connecting the R/W 2802 or the POS system 2806 to an individual account 2807 of electronic money or the like and automatically withdrawing the amount purchased or the amount used, shopping becomes cashless and cash registerless so that the customer can efficiently purchase goods or the like. By communicating with the R/W by electronic money owned by an individual on the spot, adjustment of the account can also be performed. As such electronic money card, needless to say, the ID card in accordance with the invention can be employed. Further, by providing a gate for product management in a gateway inside of the store, a product which is not input into the R/W or the POS system (that is, which is not purchased) can be checked so that theft can be prevented.

By applying the semiconductor device of the invention, replacing of a battery is not needed because the battery which stores power is used. In addition, since power can be supplied from the battery to a signal processing circuit even when a signal received is weakened, communication can be performed by operating the semiconductor device. That is, since communication can be performed even with a weak signal, a communication distance can be increased and stable communication can be performed. Further, since power can be automatically stored in the battery when the signal received is strong, charging can be performed even if a user does not intentionally perform an operation of charging. Needless to say, when the power stored in the battery is decreased, the user can intentionally perform the operation of charging easily. Therefore, by applying the semiconductor device of the invention to the ID label 2502, a system in which a sensor and a memory are equipped and the condition of a product is stored in the memory to be managed can be easily realized. For example, a system in which temperature information of liquor is managed and the like are given as such a system.

Figure 28A:
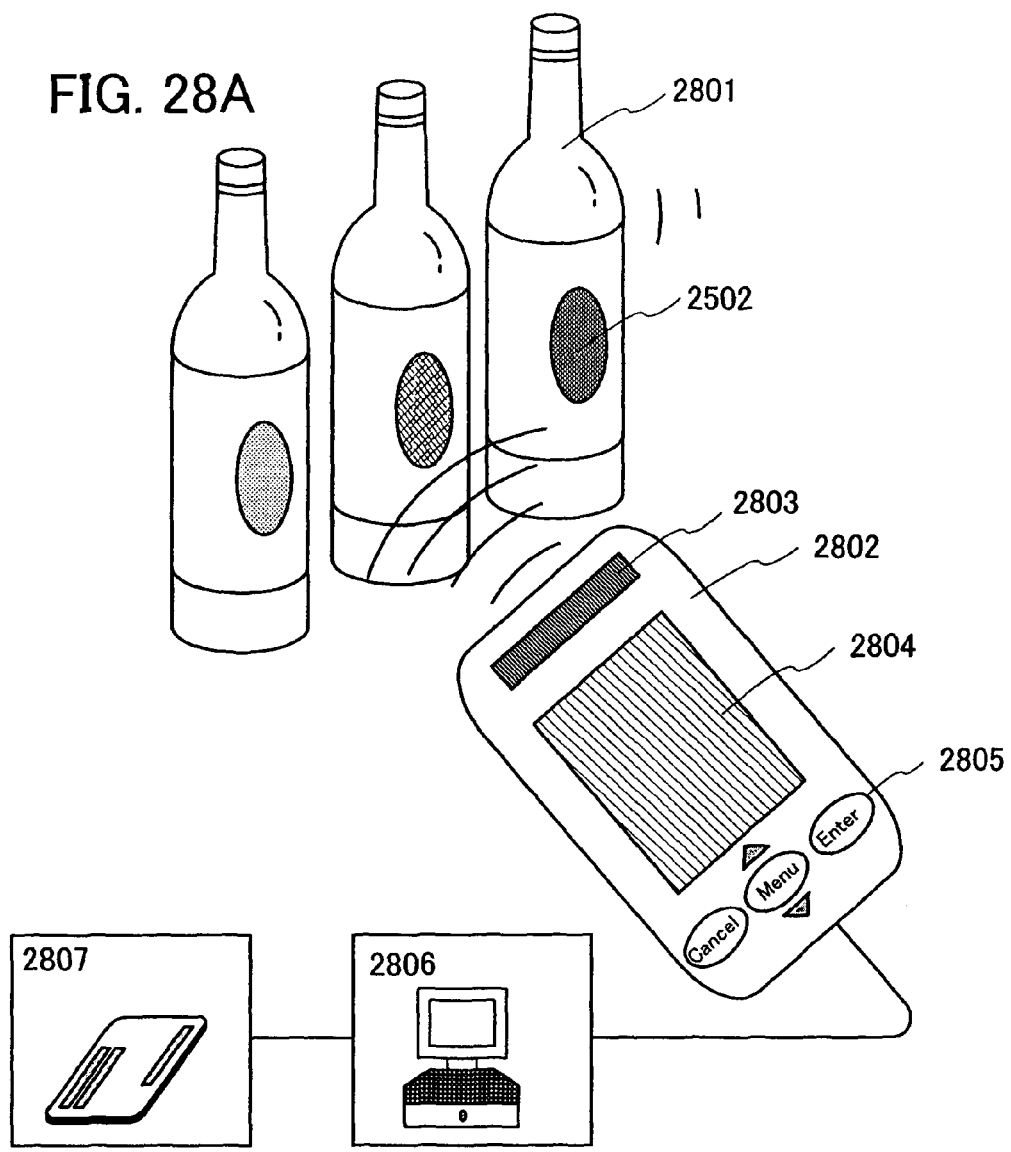
FIGS. 28A and 28B are diagrams showing examples of merchandise purchase inside of a store.
Figure 28B:
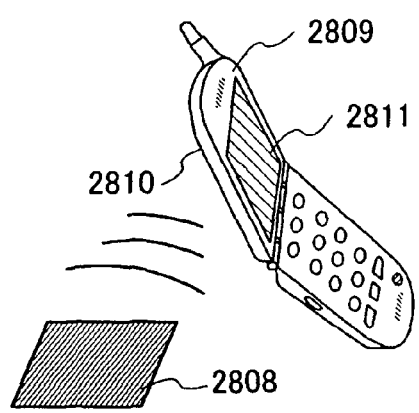

Note that as for the shape and the function of the R/W, the invention is not limited to the examples shown in FIG. 28A. For example, as shown in FIG. 28B, a personal digital assistant owned by an individual, for example, a main body of a mobile phone 2809 which incorporates a R/W function is used, and information of a product 2808 (incorporating an ID label or an ID tag) is displayed on a display portion 2811 through a sensor portion 2810. In this manner, the consumer can freely get abundant information on the product compared to information which is provided by a conventional wireless tag or the like.

Note that in the case where the product in accordance with the invention incorporates a wireless thin film integrated circuit device, the wireless thin film integrated circuit device is categorized as a close range type, a short range type, a neighborhood type, or a long range type depending on the distance between the product such as a card and the reader/writer and the frequency. The close range type is an electromagnetic induction type having communication distance of 0 to 2 mm and 4.92 GHz is used as communication frequency. The short range type is an electromagnetic induction type having a communication distance of about 10 cm and 13.56 MHz is used as communication frequency. The neighborhood type is an electromagnetic induction type having a communication distance of about 70 cm and 13.56 MHz is used as communication frequency. The close range type is a microwave type having a communication distance of about several m.

Note that a wireless IC is supplied with power by electromagnetic induction (an electromagnetic induction type), mutual induction (an electromagnetic coupling type), or electrostatic induction (an electrostatic coupling type) of an antenna which is wound in a coiled-shape, which is a characteristic of the wireless IC. By controlling the number of windings of this antenna, the number of the frequency received can be selected. For example, frequency is increased to shorten a wavelength so that the number of windings of the antenna can be decreased.

In addition, compared to a contact-type thin film integrated circuit device, since the wireless thin film integrated circuit device does not contact with the reader/writer and performs wireless power supply and information communication, it is not damaged and has high durability and there is no concern that an error would ocuur due to electrostatic or the like. Further, the structure of the reader/writer itself does not become complicated and it is only necessary to put the wireless thin film integrated circuit device close to the reader/writer, and thus, handling of the wireless thin film integrated circuit device is easy.

Figure 29:
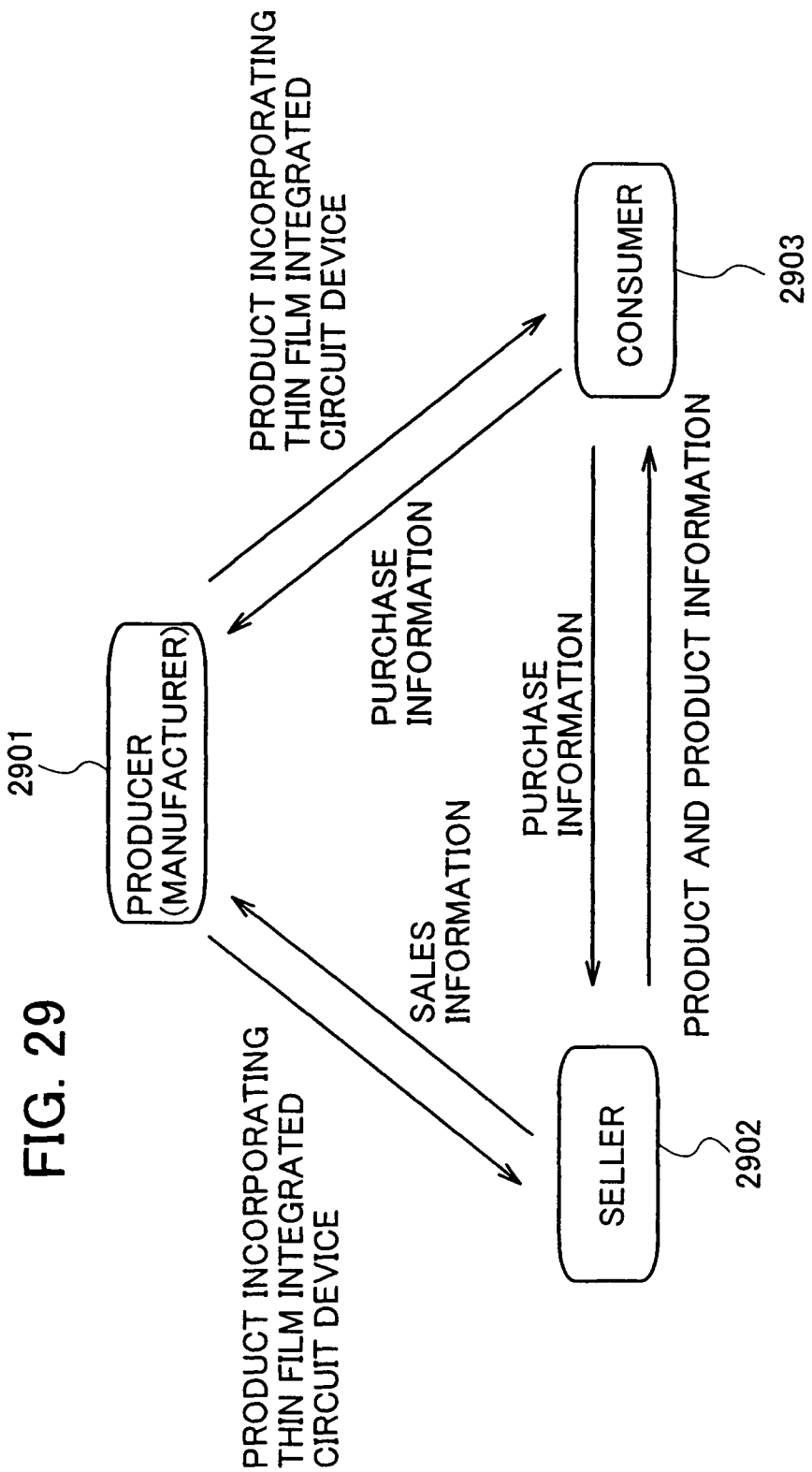
FIG. 29 is a chart showing a relationship among a producer (manufacturer), a seller, and a consumer.

Here, the flow of the product incorporating the ID label, the ID tag, or the like in accordance with the invention is briefly described. In FIG. 29, a producer (a manufacturer) 2901 provides a product incorporating a thin film integrated circuit device to a seller (a retailer or a wholesaler) 2902 or a consumer 2903. The seller 2902 can provide sales information such as toll information, the number of products sold, or purchase time to the producer 2901 at the time of adjustment of the account by the consumer 2903. On the other hand, the consumer 2903 can provide purchase information such as individual information. For example, the consumer 2903 can provide purchase information to the seller 2902 and the producer 2901 through the Internet or the like by a credit card incorporating the thin film integrated circuit device, an individual reader, or the like. In addition, the seller 2902 provides product information to the consumer 2903 by the thin film integrated circuit device and the seller 2902 can obtain purchase information from the consumer 2903. Such sales information and purchase information is valuable information and it is useful for a future marketing strategy.

As a method for providing various kinds of information, a method is given in which information which is read out from the thin film integrated circuit device by a reader owned by the seller 2902 or the consumer 2903 is disclosed to the producer 2901, the seller 2902, or the consumer 2903 through a computer or a network. Since a wide variety of information can be provided to a person who needs the information through the thin film integrated circuit device, the ID label or the ID tag in accordance with the invention is also useful for commodity trading or commodity management. Note that the system can also be applied to the case in which the product is distributed to a secondhand goods dealer from the consumer 2903.

Figure 30:
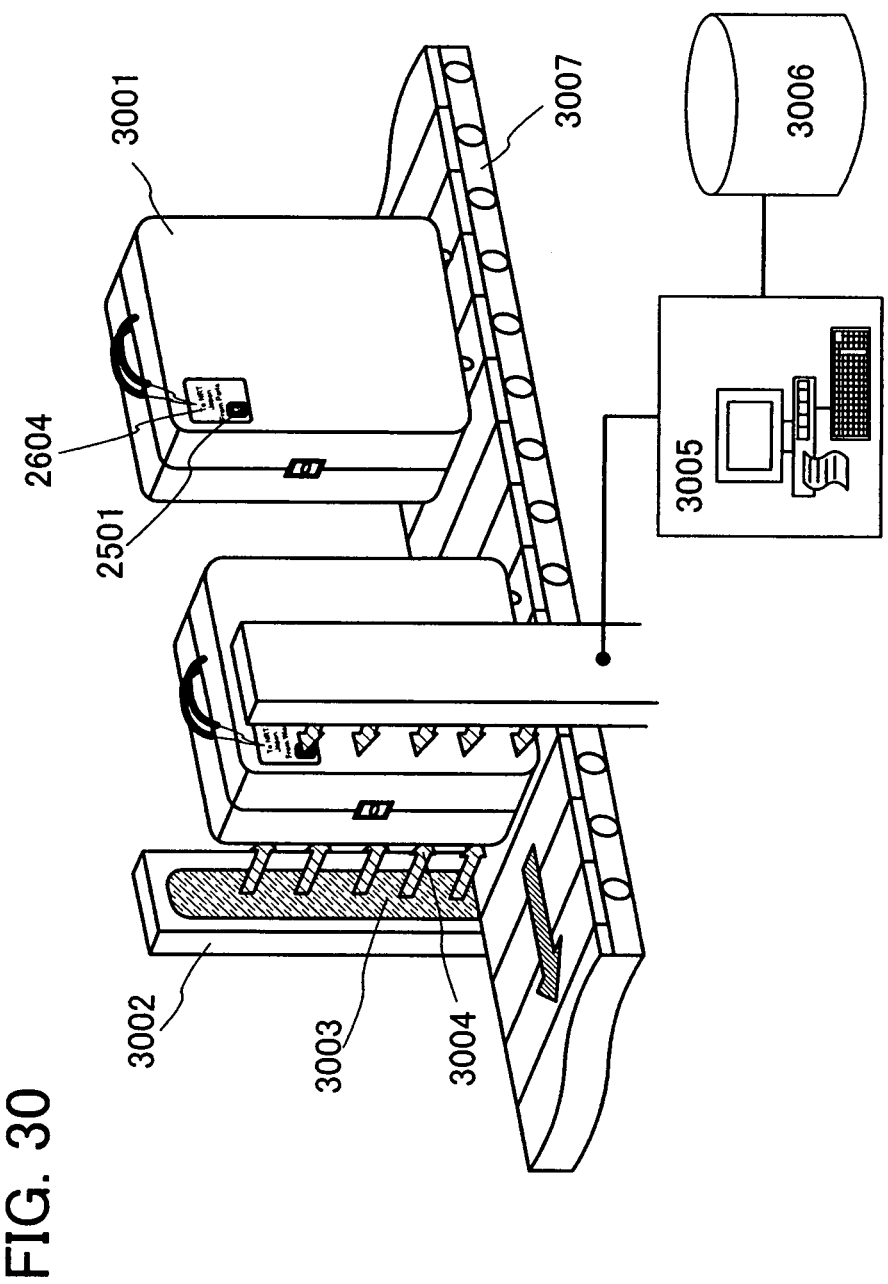
FIG. 30 is a diagram showing an inspection method of goods to which an ID tags are attached at the time of a security check.

Next, the case of a security check in an airport is described with reference to FIG. 30. A baggage 3001 is provided with the ID tag 2604 incorporating the chip 2501; the baggage 3001 is moved on a conveyer 3007 and passes through a reader/writer 3002, so that the chip 2501 is activated by an electromagnetic wave 3004 emitted from an antenna 3003; and information included in a memory is converted-into a signal to be sent back to the reader/writer 3002. Thus, information can be recognized by a computer 3005.

In addition, the ID label or the ID tag or the chip is attached to the computer 3005, and the computer 3005 is connected to a database 3006 in which information on only products which are appropriately (legally) distributed to a market (hereinafter described as real stuffs) is stored, and thus, information on a product included in the baggage 3001 can also be compared with the database 3006. Then, when a stuff except a real stuff is included in the baggage 3001, checking is performed, and if needed, attachment, cassation, disposal, or the like can be performed. Note that although in the case where dangerous goods, a gun, a sword, or the like which is prohibited from carrying into an airplane is included in the baggage 3001 even when it is the real stuff, it is detected by the computer; thus, software in the computer may be programmed so as not to make the baggage pass through a gate.

Needless to say, in the case where an article which composes inequitable conduct such as a forgery, counterfeit goods, or contraband goods are included in the baggage 3001 except the real stuff, the baggage cannot pass through the gate. Therefore, influx into inside of the country or outflux into overseas of the forgery can be prevented at the border. Further, by obliging the incorporation of an ID label or an ID tag advance at the time of manufacturing dangerous goods, a gun, a sword, or the like, the dangerous goods, the gun, the sword, or the like can be detected, so that the invention can take antiterrorism measures.

Embodiment Mode 8

This embodiment mode describes structures of a connection between a substrate over which an antenna for receiving a signal (in this embodiment mode, hereinafter described as an external antenna) is formed, a substrate over which a circuit for processing the signal, received is formed (in this embodiment mode, hereinafter described as a first chip), and a battery which stores power supplied, and a connection between a substrate over which an antenna for receiving a signal and a circuit for processing a signal is formed (in this embodiment mode, hereinafter described as a second chip), an antenna in which the frequency of a communication signal tunes to that of an antenna formed in the second chip (in this embodiment mode, hereinafter described as a chip antenna) and a communication distance is longer than that of the chip antenna (in this embodiment mode, hereinafter described as a booster antenna), and the battery which stores power supplied.

First, the connection between the first chip, the external antenna, and the battery is described.

Each of a first connection structure and a second connection structure of this embodiment mode includes electrodes on opposite sides of the first chip and the electrodes on opposite sides are connected to the battery and the external antenna.

In addition, the battery includes an electrode which is extended from a side surface of the first chip in the first connection structure, and the battery includes the electrode on one surface in the second connection structure.

Figure 31A:
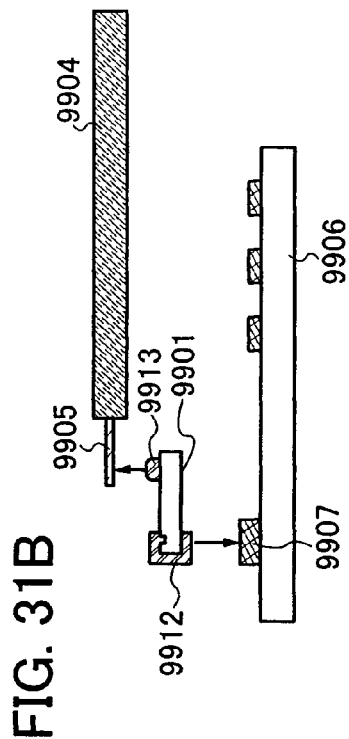
FIGS. 31A to 31F are diagrams each showing a connection between a chip, a substrate over which an antenna is formed, and a battery.

That is, in the first connection structure, as shown in FIG. 31A, a first electrode 9902 of a first chip 9901 is connected to an electrode 9905 which is extended from a side surface of a battery 9904, and a second electrode 9903 of the first chip 9901 is connected to an electrode 9907 of a substrate 9906 over which the external antenna is formed.

Figure 31B:
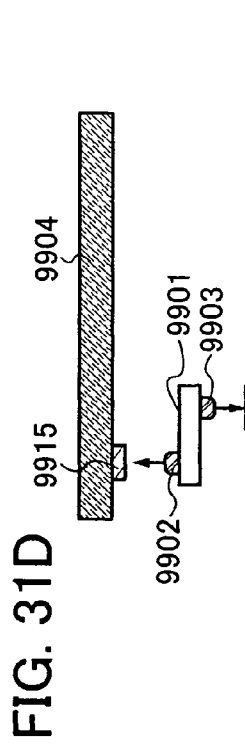
Figure 31C:
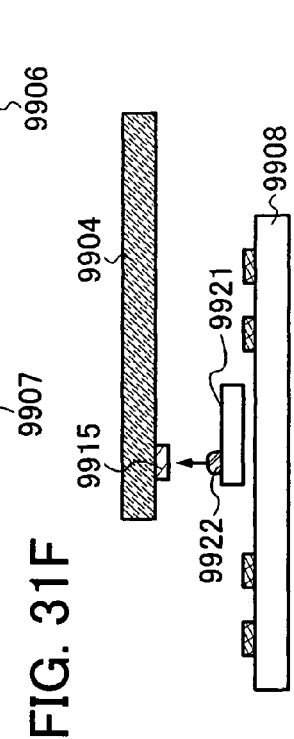
Figure 31D:
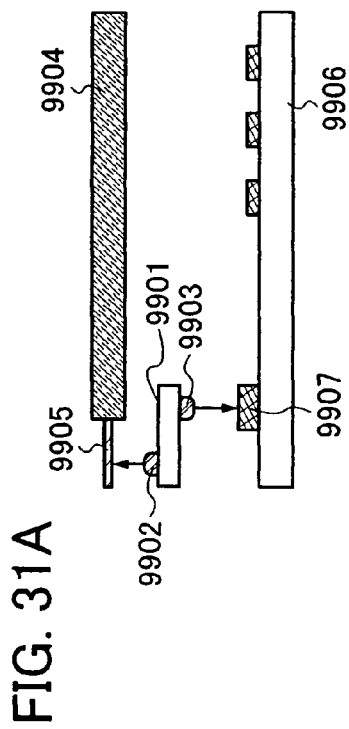

In the second connection structure, as shown in FIG. 31D, the first electrode 9902 of the first chip 9901 is connected to an electrode 9915 which is arranged on one surface of the battery 9904, and the second electrode 9903 of the first chip 9901 is connected to the electrode 9907 of the substrate 9906 over which the external antenna is formed.

In a third connection structure and a fourth connection structure of this embodiment mode, at least two electrodes connected to a circuit in the chip from one surface of the first chip 9901 are included, and one electrode is connected to the battery from one surface of the first chip 9901 and the other electrode is connected to the external antenna from the other surface of the first chip 9901.

That is, in the third connection structure, as shown in FIG. 31B, a first electrode 9913 of the first chip 9901 is connected to the electrode 9905 which is extended from the side surface of the battery 9904, and a second electrode 9912 of the first chip 9901 is connected to the electrode 9907 of the substrate 9906 over which the external antenna is formed.

Figure 31E:
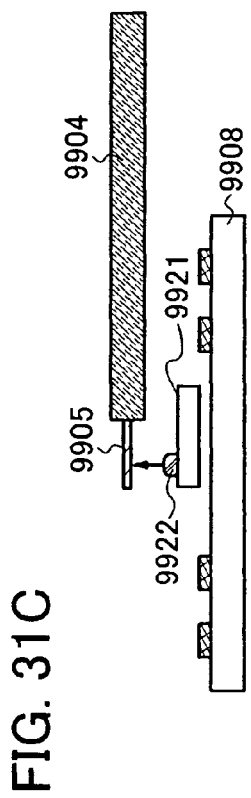

In the fourth structure, as shown in FIG. 31E, the first electrode 9913 of the first chip 9901 is connected to the electrode 9915 which is arranged on one surface of the battery 9904, and the second electrode 9912 of the first chip 9901 is connected to the electrode 9907 of the substrate 9906 over which the external antenna is formed.

Next, the connection between the second chip, the booster antenna, and the battery is described.

In a fifth connection structure of this embodiment mode, as shown in FIG. 31C, an electrode 9922 of the second chip 9921 is connected to the electrode 9905 which is extended over the side surface of the battery 9904, and the second chip 9921 is arranged over a substrate 9908 over which the booster antenna is formed.

Figure 31F:
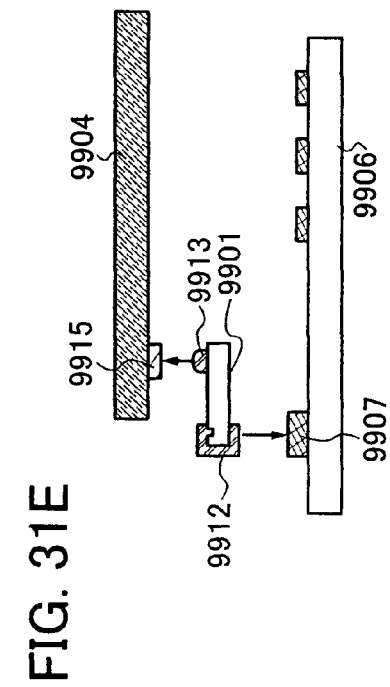

In a sixth connection structure of this embodiment mode, as shown in FIG. 31F, the electrode 9922 of the second chip 9921 is connected to the electrode 9915 which is arranged on one surface of the battery 9904, and the second chip 9921 is arranged over a substrate 9908 over which the booster antenna is formed.

Note that each of the first electrode 9902 and the second electrode 9903 of the first chip 9901, the electrode 9922 of the second chip 9921, the electrode 9905 which is extended from the side surface of the battery 9904, the electrode 9915 which is arranged on one surface of the battery 9904, and the electrode 9907 of the substrate 9906 over which the external antenna is formed may include a plurality of electrodes.

Note also that the first electrode 9902 and the second electrode 9903 of the first chip 9901 shown in this embodiment mode can be realized by combining the manufacturing method of Embodiment Mode 3 with the manufacturing method of Embodiment Mode 4. For example, the conductive film 634a or the conductive film 634b shown in FIGS. 14A and 14B, and FIGS. 15A and 15B may be used as the first electrode 9902 of the first chip 9901, and the conductive film 731a or the conductive film 731b shown in FIGS. 21A and 21B may be used as the second electrode 9903 of the first chip 9901. Alternatively, the conductive film 634a or the conductive film 634b shown in FIGS. 15A and 15B may be used as the second electrode 9903 of the first chip 9901, and the conductive film 731a or the conductive film 731b shown in FIGS. 21A and 21B may be used as the first electrode 9902 of the first chip 9901.

Therefore, in the first connection structure, the second connection structure, and the third connection structure, the electrodes of the battery 9904 can be formed easily so that a yield is improved.

In the fourth connection structure and the fifth connection structure, the area of the semiconductor device does not become large even when it incorporates a battery having the size almost the same as that of the substrate over which the external antenna is formed, so that the semiconductor device can incorporate a battery having high capacity and also the semiconductor device is made smaller. In addition, in the sixth connection structure, the area of the semiconductor device does not become large even when it incorporates a battery having a size almost the same as that of the substrate over which the booster antenna is formed, so that the semiconductor device can incorporate the battery having high capacity and also the semiconductor device is made smaller.

This application is based on Japanese Patent Application serial No. 2006-066811 filed in Japan Patent Office on Mar. 10, 2006, the entire contents of which are hereby incorporated by reference.

The invention claimed is:

1. A semiconductor device comprising:
    a battery; and
    a chip comprising:
        a first antenna circuit; and
        a signal processing circuit for processing a signal received by the first antenna circuit and generating a signal to be supplied to the first antenna circuit, the signal processing circuit comprising:
            a rectifying circuit for rectifying the signal received by the first antenna circuit;
            a power supply circuit; and
            a control circuit,
    wherein the chip comprises:
        a first semiconductor film over a first insulating film;
        a second semiconductor film over the first insulating film;
        a second insulating film over the first semiconductor film and the second semiconductor film;
        a first gate electrode over the second insulating film, the first gate electrode overlapping the first semiconductor film;
        a second gate electrode over the second insulating film, the second gate electrode overlapping the second semiconductor film;
        a third insulating film over the first gate electrode and the second gate electrode;
        a first conductive film over the third insulating film, the first conductive film being electrically connected to the first semiconductor film;
        a second conductive film over the third insulating film, the second conductive film being electrically connected to the second semiconductor film;
        a fourth insulating film over the first conductive film and the second conductive film;
        a third conductive film over the fourth insulating film, the third conductive film being electrically connected to the first conductive film; and a fourth conductive film over the third conductive film, the fourth conductive film being electrically connected to the third conductive film, wherein the first antenna circuit comprises the fourth conductive film, wherein the second conductive film is electrically connected via an opening formed in the first insulating film, the second insulating film and the third insulating film to a fifth conductive film under the first insulating film, and wherein the control circuit is configured to supply an output voltage of the rectifying circuit to the battery when the output voltage of the rectifying circuit is larger than an output voltage of the battery and to supply the output voltage of the battery to the power supply circuit when the output voltage of the rectifying circuit is smaller than the output voltage of the battery.

2. A semiconductor device according to claim 1, further comprising a second antenna circuit,
wherein the second antenna circuit is mutually inducted with the first antenna circuit.

3. A semiconductor device according to claim 2, wherein a carrier frequency of the second antenna circuit tunes to a carrier frequency of the first antenna circuit.

4. A semiconductor device according to claim 2, wherein the first antenna circuit includes a first antenna and a first capacitor and the second antenna circuit includes a second antenna and a second capacitor.

5. A semiconductor device according to claim 4, wherein each of the first antenna and the second antenna is a coil obtained by winding a conductive wiring.

6. A semiconductor device according to claim 5, wherein a diameter of the coil of the second antenna is longer than a diameter of the coil of the first antenna.

7. A semiconductor device according to claim 5,
wherein the control circuit comprises a first rectifying element, a second rectifying element, a first switch, a second switch and a voltage comparator,
wherein the rectifying circuit is electrically connected to the battery via the first rectifying element and the first switch,
wherein the power supply circuit is electrically connected to the battery via the second rectifying element and the second switch,
wherein the voltage comparator is configured to control the first switch and the second switch,
wherein a first voltage which is generated by dividing an output voltage of the battery by resistors is inputted into a first input terminal of the voltage comparator, and
wherein a second voltage which is generated by dividing an output voltage of the rectifying circuit by resistors is inputted into a second input terminal of the voltage comparator.

8. A semiconductor device according to claim 1,
wherein the chip further comprises a first electrode and a second electrode, and
wherein the first electrode of the chip is electrically connected to the battery.

9. A semiconductor device according to claim 8,
wherein an electrode extending from a side surface of the battery is in contact with the first electrode of the chip.

10. A semiconductor device comprising:
a battery; and
a chip comprising:
a first antenna circuit; and
a signal processing circuit for processing the signal received by the first antenna circuit and generating a signal to be supplied to the first antenna circuit, the signal processing circuit comprising:
a rectifying circuit;
a control circuit; and
a power supply circuit,
wherein the chip comprises:
a first semiconductor film over a first insulating film;
a second semiconductor film over the first insulating film;
a second insulating film over the first semiconductor film and the second semiconductor film;
a first gate electrode over the second insulating film, the first gate electrode overlapping the first semiconductor film;
a second gate electrode over the second insulating film, the second gate electrode overlapping the second semiconductor film;
a third insulating film over the first gate electrode and the second gate electrode;
a first conductive film over the third insulating film, the first conductive film being electrically connected to the first semiconductor film;
a second conductive film over the third insulating film, the second conductive film being electrically connected to the second semiconductor film;
a fourth insulating film over the first conductive film and the second conductive film;
a third conductive film over the fourth insulating film, the third conductive film being electrically connected to the first conductive film; and
a fourth conductive film over the third conductive film, the fourth conductive film being electrically connected to the third conductive film,
wherein the first antenna circuit comprises the fourth conductive film,
wherein the second conductive film is electrically connected via an opening formed in the first insulating film, the second insulating film and the third insulating film to a fifth conductive film under the first insulating film,
wherein the first antenna circuit is electrically connected to the rectifying circuit,
wherein the rectifying circuit is electrically connected to the power supply circuit,
wherein the battery is electrically connected to the rectifying circuit via the control circuit,
wherein the battery is electrically connected to the power supply circuit via the control circuit, and
wherein the control circuit is configured to supply an output voltage of the rectifying circuit to the battery when the output voltage of the rectifying circuit is larger than an output voltage of the battery and to supply the output voltage of the battery to the power supply circuit when the output voltage of the rectifying circuit is smaller than the output voltage of the battery.

11. A semiconductor device according to claim 10, further comprising a second antenna circuit,
wherein the second antenna circuit is mutually inducted with the first antenna circuit.

12. A semiconductor device according to claim 11, wherein a carrier frequency of the second antenna circuit tunes to a carrier frequency of the first antenna circuit.

13. A semiconductor device according to claim 11, wherein the first antenna circuit includes a first antenna and a first capacitor and the second antenna circuit includes a second antenna and a second capacitor.

14. A semiconductor device according to claim 13, wherein each of the first antenna and the second antenna is a coil obtained by winding a conductive wiring.

15. A semiconductor device according to claim 14, wherein a diameter of the coil of the second antenna is longer than a diameter of the coil of the first antenna.

16. A semiconductor device according to claim 10,
wherein the control circuit comprises a first rectifying element, a second rectifying element, a first switch, a second switch and a voltage comparator,
wherein the rectifying circuit is electrically connected to the battery via the first rectifying element and the first switch,
wherein the power supply circuit is electrically connected to the battery via the second rectifying element and the second switch,
wherein the voltage comparator is configured to control the first switch and the second switch,
wherein a first voltage which is generated by dividing an output voltage of the battery by resistors is inputted into a first input terminal of the voltage comparator, and
wherein a second voltage which is generated by dividing an output voltage of the rectifying circuit by resistors is inputted into a second input terminal of the voltage comparator.

17. A semiconductor device according to claim 10,
wherein the chip further comprises a first electrode and a second electrode, and
wherein the first electrode of the chip is electrically connected to the battery.

18. A semiconductor device according to claim 17,
wherein an electrode extending from a side surface of the battery is in contact with the first electrode of the chip.

19. A method for operating a semiconductor device which comprises,
a battery, and
a chip comprising:
  a first antenna circuit; and
  a signal processing circuit for processing the signal received by the first antenna circuit and generating a signal to be supplied to the first antenna circuit, the signal processing circuit comprising:
    a rectifying circuit;
    a power supply circuit; and
    a control circuit,
  wherein the chip comprises:
    a first semiconductor film over a first insulating film;
    a second semiconductor film over the first insulating film;
    a second insulating film over the first semiconductor film and the second semiconductor film;
    a first gate electrode over the second insulating film, the first gate electrode overlapping the first semiconductor film;
    a second gate electrode over the second insulating film, the second gate electrode overlapping the second semiconductor film;
    a third insulating film over the first gate electrode and the second gate electrode;
    a first conductive film over the third insulating film, the first conductive film being electrically connected to the first semiconductor film;
    a second conductive film over the third insulating film, the second conductive film being electrically connected to the second semiconductor film;
    a fourth insulating film over the first conductive film and the second conductive film;
    a third conductive film over the fourth insulating film, the third conductive film being electrically connected to the first conductive film; and
    a fourth conductive film over the third conductive film, the fourth conductive film being electrically connected to the third conductive film,
  wherein the first antenna circuit comprises the fourth conductive film, and
  wherein the second conductive film is electrically connected via an opening formed in the first insulating film, the second insulating film and the third insulating film to a fifth conductive film under the first insulating film,
the method comprising:
supplying an output voltage of the rectifying circuit to the power supply circuit;
comparing an output voltage of the battery with the output voltage of the rectifying circuit;
supplying the output voltage of the rectifying circuit to the battery when the output voltage of the rectifying circuit is larger than an output voltage of the battery; and
supplying the output voltage of the battery to the power supply circuit when the output voltage of the rectifying circuit is smaller than the output voltage of the battery.

20. A method for operating a semiconductor device according to claim 19,
wherein the control circuit comprises a first rectifying element, a second rectifying element, a first switch, a second switch and a voltage comparator,
wherein the rectifying circuit is electrically connected to the battery via the first rectifying element and the first switch,
wherein the power supply circuit is electrically connected to the battery via the second rectifying element and the second switch,
wherein the voltage comparator is configured to control the first switch and the second switch,
wherein a first voltage which is generated by dividing an output voltage of the battery by resistors is inputted into a first input terminal of the voltage comparator, and
wherein a second voltage which is generated by dividing an output voltage of the rectifying circuit by resistors is inputted into a second input terminal of the voltage comparator.

21. A semiconductor device according to claim 19,
wherein the chip further comprises a first electrode and a second electrode, and
wherein the first electrode of the chip is electrically connected to the battery.

22. A semiconductor device according to claim 21, wherein an electrode extending from a side surface of the battery is in contact with the first electrode of the chip.

* * * * *

UNITED STATES PATENT AND TRADEMARK OFFICE
CERTIFICATE OF CORRECTION

PATENT NO. : 8,854,191 B2
APPLICATION NO. : 11/716042
DATED : October 7, 2014
INVENTOR(S) : Shunpei Yamazaki et al.

Page 1 of 1

It is certified that error appears in the above-identified patent and that said Letters Patent is hereby corrected as shown below:

In the Specification

At column 16, line 48, "(TFF)" should be --(TFT)--;

At column 25, line 62, "(ClF$_3$)" should be --(ClF$_3$)--;

At column 38, line 14, "converted-into" should be --converted into--;

At column 38, line 50, "signal, received" should be --signal received--;

In the Claims

In claim 7, at column 41, line 34, "5," should be --1,--.

Signed and Sealed this
Seventeenth Day of March, 2015

Michelle K. Lee
*Director of the United States Patent and Trademark Office*